US010721496B2

(12) United States Patent
Helle et al.

(10) Patent No.: US 10,721,496 B2
(45) Date of Patent: Jul. 21, 2020

(54) INHERITANCE IN SAMPLE ARRAY MULTITREE SUBDIVISION

(71) Applicant: GE VIDEO COMPRESSION, LLC, Albany, NY (US)

(72) Inventors: Philipp Helle, Berlin (DE); Detlev Marpe, Berllin (DE); Simon Oudin, Berlin (DE); Thomas Wiegand, Berlin (DE)

(73) Assignee: GE VIDEO COMPRESSION, LLC, Albany, NY (US)

( * ) Notice: Subject to any disclaimer, the term of this patent is extended or adjusted under 35 U.S.C. 154(b) by 0 days.

(21) Appl. No.: 16/578,620

(22) Filed: Sep. 23, 2019

(65) Prior Publication Data

US 2020/0021857 A1    Jan. 16, 2020

Related U.S. Application Data

(63) Continuation of application No. 15/197,406, filed on Jun. 29, 2016, which is a continuation of application
(Continued)

(30) Foreign Application Priority Data

Apr. 13, 2010  (EP) ..................................... 10159782
Apr. 13, 2010  (WO) .................. PCT/EP2010/054827

(51) Int. Cl.
*H04N 19/96*    (2014.01)
*H04N 19/52*    (2014.01)
(Continued)

(52) U.S. Cl.
CPC ........... *H04N 19/96* (2014.11); *H04N 19/124* (2014.11); *H04N 19/129* (2014.11); *H04N 19/13* (2014.11);
(Continued)

(58) Field of Classification Search
CPC ...... H04N 19/61; H04N 19/176; H04N 19/70; H04N 19/46; H04N 19/44; H04N 19/82;
(Continued)

(56) References Cited

U.S. PATENT DOCUMENTS 4,980,764 A    12/1990  Henot
5,603,012 A *  2/1997  Sotheran ............... G06F 9/3867
                                                 712/208
(Continued)

FOREIGN PATENT DOCUMENTS

AU    2007205337    4/2010
CN    1168054 A     12/1997
(Continued)

OTHER PUBLICATIONS

Bozinovic, N., et al., "Modeling Motion for Spatial Scalability", Acoustics, Speech and Signal Processing, 2006, ICASSP 2006 Proceedings, 2006 IEEE International Conference on Toulouse, France May 14-19, 2006, pp. 29-II, XP031386333, ISBN: 978-1-4244-0439-8, 4 pages.
(Continued)

*Primary Examiner* — Farhan Mahmud
(74) *Attorney, Agent, or Firm* — Pillsbury Winthrop Shaw Pittman LLP

(57) ABSTRACT

A better compromise between encoding complexity and achievable rate distortion ratio, and/or to achieve a better rate distortion ratio is achieved by using multitree subdivisioning not only in order to subdivide a continuous area, namely the sample array, into leaf regions, but using the intermediate regions also to share coding parameters among the corresponding collocated leaf blocks. By this measure, coding procedures performed in tiles—leaf regions—locally, may be associated with coding parameters individually without having to, however, explicitly transmit the
(Continued)

whole coding parameters for each leaf region separately. Rather, similarities may effectively exploited by using the multitree subdivision.

30 Claims, 14 Drawing Sheets

Related U.S. Application Data

No. 13/649,233, filed on Oct. 11, 2012, now Pat. No. 10,038,920, which is a continuation of application No. PCT/EP2011/055794, filed on Apr. 13, 2011.

(51) Int. Cl.

| | | |
|---|---|---|
| *H04N 19/42* | (2014.01) | |
| *H04N 19/13* | (2014.01) | |
| *H04N 19/129* | (2014.01) | |
| *H04N 19/124* | (2014.01) | |
| *H04N 19/44* | (2014.01) | |
| *H04N 19/30* | (2014.01) | |
| *H04N 19/70* | (2014.01) | |
| *H04N 19/176* | (2014.01) | |
| *H04N 19/159* | (2014.01) | |
| *H04N 19/463* | (2014.01) | |
| *H04N 19/593* | (2014.01) | |
| *H04N 19/53* | (2014.01) | |
| *H04N 19/513* | (2014.01) | |

(52) U.S. Cl.
CPC ......... *H04N 19/159* (2014.11); *H04N 19/176* (2014.11); *H04N 19/30* (2014.11); *H04N 19/439* (2014.11); *H04N 19/44* (2014.11); *H04N 19/463* (2014.11); *H04N 19/513* (2014.11); *H04N 19/52* (2014.11); *H04N 19/53* (2014.11); *H04N 19/593* (2014.11); *H04N 19/70* (2014.11)

(58) Field of Classification Search
CPC .... H04N 19/523; H04N 19/30; H04N 19/187; H04N 19/436
See application file for complete search history.

(56) References Cited

U.S. PATENT DOCUMENTS

| | | | |
|---|---|---|---|
| 5,724,537 A * | 3/1998 | Jones | G06F 12/0207 |
| | | | 375/E7.094 |
| 5,809,270 A * | 9/1998 | Robbins | G06F 9/3867 |
| | | | 712/200 |
| 6,005,981 A | 12/1999 | Ng | |
| 6,057,884 A | 5/2000 | Chen | |
| 6,067,574 A | 5/2000 | Tzeng | |
| 6,269,175 B1 | 7/2001 | Hanna | |
| 6,269,192 B1 | 7/2001 | Sodagar et al. | |
| 6,408,097 B1 | 6/2002 | Kondo | |
| 7,254,533 B1 | 8/2007 | Jabri | |
| 10,248,966 B2 | 4/2019 | Helle et al. | |
| 10,460,344 B2 | 10/2019 | Helle et al. | |
| 2001/0004404 A1 | 6/2001 | Itokawa | |
| 2001/0039487 A1 | 11/2001 | Hammersley | |
| 2002/0009233 A1 | 1/2002 | Pesquet-Popescu | |
| 2002/0064231 A1 | 5/2002 | Felts | |
| 2002/0106019 A1 | 8/2002 | Chaddha | |
| 2002/0181745 A1 | 12/2002 | Hu | |
| 2003/0021485 A1 | 1/2003 | Raveendran et al. | |
| 2003/0076881 A1 | 4/2003 | Akiyoshi | |
| 2003/0123545 A1 * | 7/2003 | Prakash | H04N 19/00 |
| | | | 375/240.08 |
| 2003/0156652 A1 * | 8/2003 | Wise | G06F 9/3867 |
| | | | 375/240.26 |
| 2003/0179940 A1 | 9/2003 | Lin et al. | |
| 2003/0198290 A1 | 10/2003 | Millin | |
| 2003/0202596 A1 | 10/2003 | Lainema et al. | |
| 2004/0062445 A1 | 1/2004 | Kim | |
| 2004/0028049 A1 | 2/2004 | Wan | |
| 2004/0028282 A1 * | 2/2004 | Kato | H04N 19/176 |
| | | | 382/236 |
| 2004/0047418 A1 | 3/2004 | Tourapis et al. | |
| 2004/0061883 A1 | 4/2004 | Kanatsu | |
| 2004/0131269 A1 | 7/2004 | Kobayashi | |
| 2004/0184662 A1 | 9/2004 | Kravec et al. | |
| 2004/0194008 A1 | 9/2004 | Garudadri et al. | |
| 2004/0213469 A1 | 10/2004 | Apostolopoulos et al. | |
| 2004/0234143 A1 | 11/2004 | Hagai | |
| 2005/0013370 A1 | 1/2005 | Kim | |
| 2005/0013376 A1 | 1/2005 | Dattani et al. | |
| 2005/0018770 A1 | 1/2005 | Adolph | |
| 2005/0114093 A1 | 5/2005 | Cha | |
| 2005/0114298 A1 | 5/2005 | Fan et al. | |
| 2005/0123042 A1 | 6/2005 | Park | |
| 2005/0200630 A1 | 9/2005 | Evans | |
| 2005/0213655 A1 | 9/2005 | Thoreau et al. | |
| 2005/0286759 A1 | 12/2005 | Zitnick, III et al. | |
| 2006/0002474 A1 | 1/2006 | Au | |
| 2006/0013308 A1 | 1/2006 | Kim | |
| 2006/0083309 A1 | 4/2006 | Schwarz | |
| 2006/0089832 A1 | 4/2006 | Ojanpera | |
| 2006/0120448 A1 | 6/2006 | Han et al. | |
| 2006/0120454 A1 | 6/2006 | Park | |
| 2006/0126962 A1 | 6/2006 | Sun | |
| 2006/0153295 A1 | 7/2006 | Wang | |
| 2006/0153300 A1 | 7/2006 | Wang et al. | |
| 2006/0198444 A1 | 9/2006 | Wada | |
| 2006/0203911 A1 | 9/2006 | Zhou | |
| 2006/0209959 A1 | 9/2006 | Sun | |
| 2006/0233251 A1 | 10/2006 | Kim | |
| 2006/0233254 A1 | 10/2006 | Lee | |
| 2006/0233262 A1 | 10/2006 | Ridge et al. | |
| 2006/0262216 A1 | 11/2006 | Zhai | |
| 2006/0268988 A1 | 11/2006 | Sun et al. | |
| 2007/0005795 A1 | 1/2007 | Gonzalez | |
| 2007/0018994 A1 | 1/2007 | Sekine | |
| 2007/0036215 A1 | 2/2007 | Pan et al. | |
| 2007/0053441 A1 | 3/2007 | Wang et al. | |
| 2007/0074266 A1 * | 3/2007 | Raveendran | H04N 5/144 |
| | | | 725/135 |
| 2007/0086516 A1 | 4/2007 | Lee et al. | |
| 2007/0110153 A1 | 5/2007 | Cho et al. | |
| 2007/0115154 A1 | 5/2007 | Park et al. | |
| 2007/0160133 A1 | 7/2007 | Bao et al. | |
| 2007/0177667 A1 * | 8/2007 | Subramania | H04N 19/895 |
| | | | 375/240.12 |
| 2007/0223582 A1 | 9/2007 | Borer et al. | |
| 2007/0230574 A1 | 10/2007 | Valente | |
| 2007/0237224 A1 | 10/2007 | Krishnan | |
| 2007/0248274 A1 | 10/2007 | Govindaswamy et al. | |
| 2008/0069203 A1 | 3/2008 | Karczewicz | |
| 2008/0086545 A1 | 4/2008 | Fatt et al. | |
| 2008/0089417 A1 | 4/2008 | Bao | |
| 2008/0095238 A1 | 4/2008 | Wu | |
| 2008/0165855 A1 | 7/2008 | Wang | |
| 2008/0247657 A1 | 10/2008 | Kalevo et al. | |
| 2008/0267291 A1 | 10/2008 | Vieron et al. | |
| 2008/0298694 A1 | 12/2008 | Kim et al. | |
| 2008/0310504 A1 | 12/2008 | Ye et al. | |
| 2009/0003441 A1 | 1/2009 | Sekiguchi | |
| 2009/0003448 A1 | 1/2009 | Sekiguchi et al. | |
| 2009/0003457 A1 | 1/2009 | Liu et al. | |
| 2009/0003717 A1 | 1/2009 | Sekiguchi et al. | |
| 2009/0028245 A1 | 1/2009 | Vieron et al. | |
| 2009/0037791 A1 | 2/2009 | Pavlov et al. | |
| 2009/0055749 A1 | 2/2009 | Chatterjee et al. | |
| 2009/0080521 A1 | 3/2009 | Marpe | |
| 2009/0080535 A1 | 3/2009 | Yin | |
| 2009/0080536 A1 | 3/2009 | Lee et al. | |
| 2009/0092188 A1 | 4/2009 | Lee et al. | |
| 2009/0096643 A1 | 4/2009 | Chang | |
| 2009/0103602 A1 | 4/2009 | Xiong et al. | |
| 2009/0129465 A1 | 5/2009 | Lai et al. | |

(56) References Cited

U.S. PATENT DOCUMENTS

| | | | |
|---|---|---|---|
| 2009/0147866 A1 | 6/2009 | She et al. |
| 2009/0152357 A1 | 6/2009 | Lei et al. |
| 2009/0154567 A1 | 6/2009 | Lei et al. |
| 2009/0165041 A1 | 6/2009 | Penberthy et al. |
| 2009/0175333 A1 | 7/2009 | Hsiang |
| 2009/0180552 A1 | 7/2009 | Visharam et al. |
| 2009/0196342 A1 | 8/2009 | Divorra Escoda et al. |
| 2009/0196517 A1 | 8/2009 | Divorra Escoda et al. |
| 2009/0225846 A1 | 9/2009 | Francois et al. |
| 2009/0238279 A1 | 9/2009 | Tu et al. |
| 2009/0273706 A1 | 11/2009 | Tu |
| 2009/0296017 A1 | 12/2009 | Itoh |
| 2009/0304090 A1 | 12/2009 | Cordara et al. |
| 2010/0046626 A1 | 2/2010 | Tu |
| 2010/0061450 A1 | 3/2010 | Sato et al. |
| 2010/0086029 A1 | 4/2010 | Chen |
| 2010/0086031 A1 | 4/2010 | Chen |
| 2010/0086032 A1 | 4/2010 | Chen |
| 2010/0124273 A1 | 5/2010 | Divorra Escoda et al. |
| 2010/0135387 A1 | 6/2010 | Divorra Escoda et al. |
| 2010/0150394 A1 | 6/2010 | Bloom |
| 2010/0158110 A1 | 6/2010 | Pandit et al. |
| 2010/0165077 A1 | 7/2010 | Yin |
| 2010/0202512 A1 | 8/2010 | Choi |
| 2010/0208818 A1 | 8/2010 | Yin et al. |
| 2010/0208827 A1 | 8/2010 | Divorra Escoda et al. |
| 2010/0220469 A1 | 9/2010 | Ivey |
| 2010/0226569 A1 | 9/2010 | Mokrushin |
| 2010/0284466 A1 | 11/2010 | Pandit et al. |
| 2010/0299454 A1 | 11/2010 | Lyashevsky |
| 2011/0019096 A1 | 1/2011 | Lee |
| 2011/0110428 A1 | 5/2011 | Chang et al. |
| 2011/0122225 A1 | 5/2011 | Kim et al. |
| 2011/0142133 A1 | 6/2011 | Takahashi et al. |
| 2011/0170595 A1 | 7/2011 | Shi |
| 2011/0170608 A1 | 7/2011 | Shi et al. |
| 2011/0243233 A1 | 10/2011 | Alshina |
| 2011/0243249 A1 | 10/2011 | Lee |
| 2011/0249743 A1 | 10/2011 | Zhao et al. |
| 2011/0299788 A1 | 12/2011 | Suzuki et al. |
| 2012/0147957 A1 | 6/2012 | Alshina |
| 2012/0170648 A1 | 7/2012 | Chen |
| 2012/0177106 A1 | 7/2012 | Divorra Escoda et al. |
| 2013/0034157 A1 | 2/2013 | Helle |
| 2013/0034171 A1 | 2/2013 | Winken |
| 2013/0039422 A1 | 2/2013 | Kirchhoffer |
| 2013/0039423 A1 | 2/2013 | Helle |
| 2013/0279577 A1 | 10/2013 | Schwarz |
| 2013/0287116 A1 | 10/2013 | Helle |
| 2014/0112387 A1 | 4/2014 | Ye et al. |
| 2015/0016525 A1 | 1/2015 | Alshin et al. |
| 2017/0197579 A1 | 7/2017 | Helle et al. |
| 2018/0218397 A1 | 8/2018 | Helle |
| 2019/0087857 A1 | 3/2019 | Helle et al. |
| 2019/0164188 A1 | 5/2019 | Helle et al. |
| 2019/0394497 A1 | 12/2019 | Kirchhoffer et al. |
| 2020/0007897 A1 | 1/2020 | Kirchhoffer et al. |

FOREIGN PATENT DOCUMENTS

| | | |
|---|---|---|
| CN | 1418436 A | 5/2003 |
| CN | 1418437 A | 5/2003 |
| CN | 1549206 A | 11/2004 |
| CN | 1549988 A | 11/2004 |
| CN | 1551636 A | 12/2004 |
| CN | 1581977 | 2/2005 |
| CN | 1595990 A | 3/2005 |
| CN | 1637782 A | 7/2005 |
| CN | 1672177 A | 9/2005 |
| CN | 1691087 A | 11/2005 |
| CN | 1717047 A | 1/2006 |
| CN | 1728833 A | 2/2006 |
| CN | 1766990 A | 5/2006 |
| CN | 1780278 A | 5/2006 |
| CN | 1795680 A | 6/2006 |
| CN | 1812579 A | 8/2006 |
| CN | 1882093 A | 12/2006 |
| CN | 197647 A | 2/2007 |
| CN | 1917647 A | 2/2007 |
| CN | 1933600 A | 3/2007 |
| CN | 1957617 A | 5/2007 |
| CN | 1960491 A | 5/2007 |
| CN | 1976458 A | 6/2007 |
| CN | 101018333 A | 8/2007 |
| CN | 101047733 A | 10/2007 |
| CN | 101068362 A | 11/2007 |
| CN | 101068366 A | 11/2007 |
| CN | 101073265 A | 11/2007 |
| CN | 101106711 A | 1/2008 |
| CN | 101119493 A | 2/2008 |
| CN | 101120584 A | 2/2008 |
| CN | 101124589 A | 2/2008 |
| CN | 101127899 A | 2/2008 |
| CN | 101189641 A | 5/2008 |
| CN | 101189876 A | 5/2008 |
| CN | 101213840 A | 7/2008 |
| CN | 101213842 A | 7/2008 |
| CN | 101366283 A | 2/2009 |
| CN | 101385350 A | 3/2009 |
| CN | 101385351 | 3/2009 |
| CN | 101395922 A | 3/2009 |
| CN | 101404774 A | 4/2009 |
| CN | 101406056 A | 4/2009 |
| CN | 101416149 A | 4/2009 |
| CN | 101416399 A | 4/2009 |
| CN | 101459847 A | 6/2009 |
| CN | 101493890 A | 7/2009 |
| CN | 101502119 A | 8/2009 |
| CN | 101502120 | 8/2009 |
| CN | 101507280 | 8/2009 |
| CN | 101510865 A | 8/2009 |
| CN | 101617538 A | 12/2009 |
| CN | 101682763 | 3/2010 |
| CN | 101682769 | 3/2010 |
| CN | 101682770 | 3/2010 |
| CN | 101854550 A | 10/2010 |
| CN | 101889449 A | 11/2010 |
| CN | 1589022 A | 12/2015 |
| CN | 103733622 B | 6/2017 |
| EP | 1158773 A2 | 11/2001 |
| EP | 1507415 | 6/2005 |
| EP | 1696674 A2 | 8/2006 |
| EP | 1806931 A2 | 11/2007 |
| EP | 2485490 | 8/2012 |
| EP | 2545710 | 1/2013 |
| FR | 2633468 A1 | 12/1989 |
| JP | 09-507347 A | 7/1997 |
| JP | 2000-350207 A | 12/2000 |
| JP | 2004-129260 | 4/2004 |
| JP | 2004-135252 A | 4/2004 |
| JP | 2005-039842 | 2/2005 |
| JP | 2005039841 | 2/2005 |
| JP | 2007-503784 A | 2/2007 |
| JP | 2008537402 | 9/2008 |
| JP | 2008-311781 A | 12/2008 |
| JP | 2009-010943 A | 1/2009 |
| JP | 2010502102 | 1/2010 |
| JP | 2010502102 A | 1/2010 |
| JP | 2010-045853 A | 2/2010 |
| JP | 2010-081465 A | 4/2010 |
| JP | 2011509631 | 3/2011 |
| JP | 2011526770 | 10/2011 |
| JP | 2012504910 | 2/2012 |
| JP | 2013509080 | 3/2013 |
| KR | 2003-0065606 A | 8/2003 |
| KR | 10-2006-0079051 A | 7/2006 |
| KR | 2009-0057225 A | 6/2009 |
| KR | 1020090057225 A | 6/2009 |
| KR | 1020110017783 A | 2/2011 |
| KR | 1020110135471 A | 12/2011 |
| KR | 1020130007654 A | 1/2013 |
| KR | 1020130020890 A | 3/2013 |
| KR | 1020140071506 A | 6/2014 |
| KR | 1020130027504 A | 12/2015 |

(56) References Cited

FOREIGN PATENT DOCUMENTS

| KR | 1020130084314 A | 12/2015 |
| --- | --- | --- |
| KR | 1020130095292 A | 12/2015 |
| TW | I311870 A | 1/2005 |
| TW | 200723886 A | 6/2007 |
| TW | 200952461 A | 12/2009 |
| WO | 95/14349 A1 | 5/1995 |
| WO | 97/15146 A1 | 4/1997 |
| WO | 97/17797 | 5/1997 |
| WO | 03/034743 A1 | 4/2003 |
| WO | 2004086302 A1 | 10/2004 |
| WO | 2005041420 | 5/2005 |
| WO | 2008071542 | 6/2005 |
| WO | 2008/030067 A1 | 3/2008 |
| WO | 2008027192 | 3/2008 |
| WO | 2008127072 A1 | 10/2008 |
| WO | 2008127597 | 10/2008 |
| WO | 2008128898 | 10/2008 |
| WO | 2008/156548 | 12/2008 |
| WO | 2008156548 A | 12/2008 |
| WO | 2009001864 A1 | 12/2008 |
| WO | 2009041843 A1 | 4/2009 |
| WO | 2009051719 | 4/2009 |
| WO | 2009092454 | 7/2009 |
| WO | 2009092455 | 7/2009 |
| WO | 2010002214 A2 | 1/2010 |
| WO | 2010/039731 A2 | 4/2010 |
| WO | 2010039733 A2 | 4/2010 |
| WO | 2011049396 | 4/2011 |
| WO | 2011/128365 A1 | 10/2011 |

OTHER PUBLICATIONS

Decision to Grant Patent, dated Apr. 28, 2015, issued in corresponding Japanese Patent Application No. 2013-504257, with English translation, 6 pages.

Decision to Grant a Patent, dated Oct. 13, 2015, issued in corresponding Japanese Patent Application No. 2014-096318, with Englis translation, 6 pages.

Decision to Grant dated Nov. 2, 2015, from corresponding Korean Patent Application No. 10-2012-7029512, 2 pages.

Decision to Grant dated Nov. 2, 2015, from corresponding Korean Patent Application No. 10-2014-7014050, 2 pages.

Decision to Grant a Patent, dated Nov. 10, 2015, issued in corresponding Japanese Patent Application No. 2013-504211, with English translation, 6 pages.

Decision to Grant dated Nov. 25, 2015, in corresponding Korean Patent Application No. 10-2014-7027407, with English translation, 8 pages.

Decision to Grant dated Oct. 20, 2015, with English translation, from corresponding Japanese Application No. 2013-504130, 8 pages.

Deforni, Raffaele et al., "On the Benefits of Leaf Merging in Quad-Tree Motion Models", IEEE, Apr. 20, 2010.

Extended European Search Report dated Jan. 28, 2016, 12 pages.

Extended European Search Report dated Oct. 27, 2015 from corresponding European Patent Application No. 15174132.9, 11 pages.

Final Rejection dated Jan. 29, 2016 in parallel U.S. Appl. No. 13/649,251, 29 pages.

Grewatsch, S., et al., "Sharing of Motion Vectors in 3D Video Coding", Proc. of the 2004 Int. Conf. on Image Processing (ICIP '04), Oct. 27, 2004, vol. 5, p. 3271-3274, ISBN: 0-7803-8554-3, 4 pages.

Horowitz, et al., "Picture Segmentation by a Tree Traversal Algorithm", Journal of the Association of Computing Machinery, vol. 23, No. 2, Jan. 1976, 22 pages.

Hsiang, et al., "Embedded Image Coding Using Zeroblocks of SBUBBAND/Wavelet Coefficients and Context Modeling", Proceeding Int'l Symposium on Circuits and Systems (ISCAS), Geneva, May 2000, 111-662-111-665.

Kamolrat, B., et al., "3D Motion Estimation for Depth Image Coding in 3D Video Coding", IEEE Transactions on Consumer Electronics, May 2009, vol. 55, No. 2, p. 824-830, ISSN: 0098-3063, 7 pages.

Kim, J.W., et al., "Video Coding with R-D Constrained Hierarchical Variable Block Size (VBS) Motion Estimation", Journal of Visual Communication and Image Representation, Academic Press, Inc., US, vol. 9, No. 3, Jan. 1, 1998, pp. 243-254, XP000914354, ISSN: 1047-3203, DOI: 10.1006/JVCI., 1998, 12 pages.

Kim, Jaeil, et al., "Enlarging MB size for High Fidelity Video Coding Beyond HD", ITU—Telecommunications Standardization Sector Study Group 16 Question 6 Video Coding Experts Group, 36th Meeting: San Diego, USA, Dec. 2008, VCEG-AJ21, pp. 1-6, 7 pages.

Kim, Yong-Hwan, et al., "Efficient RGB Video Coding Using Adaptive Inter-Plane Residual Prediction", Digest of Technical Papers of IEEE Int. Conf. on Consumer Electronics 2008 (ICCE 2008), Jan. 13, 2008, p. 1-2, ISBN: 978-1-4244-1458-1, 2 pages.

Kimata, Hideaki, "The standardized trend about the three-dimensional picture—MPEG standardization of 3 dimension and a multiaspect picture", Technical report of the institute of Image and Information and Television Engineers, Japan, The institute of Image and Information and Television Engineers, Nov. 8, 2007, vol. 31, No. 52, p. 7-12, ISSN: 1342-6893.

Lange, R et al., "Extended Inter-Layer Motion Vectors Prediction in Scalable Video Coding—Case Study and Improvement Proposal", ISO/IED JTC1 SC291WG11 Coding of Moving Pictures and Audio. Bangkok, Thailand., Jan. 2006, 17 pages.

Marpe, D., et al., "Context-based adaptive binary arithmetic coding in the H.264/AVC video compression standard", IEEE Transactions on Circuits and Systems for Video Technology, vol. 13, No. 7, Jul. 1, 2003, pp. 620-636, XP055120073, ISSN: 1051-8215, DOI: 10.1109/TCSVT.2003.815173, 18 pages.

Merkle, P., et al., "The effects of multiview depth video compression on multiview rendering", Signal Processing: Image Communication, Jan. 2009, vol. 24, No. 1-2, p. 73-88, ISSN: 0923-5965, [online][search on Apr. 17, 2015]. Internet, URL, http://iphome.hhi.de/wiegand/assets/pdfs/multiview_depth_video_compression.pdf, 16 pages.

Merkle, Philipp, et al., "Multi-View Video Plus Depth Representation and Coding", Image Processing, 2007, ICIP 2007, IEEE International Conference on, IEEE, PI, Sep. 1, 2007, XP031157713, 4 pages.

Office Action dated Dec. 17, 2015, in parallel Taiwanese Patent Application No. 103137606, with English translation, 10 pages.

Office Action dated Jan. 5, 2016, in parallel Japanese Patent Application No. 2015-061416, with English translation, 9 pages.

Office Action dated May 13, 2016 issued in parallel U.S. Appl. No. 13/649,233, 20 pages.

Office Action dated Oct. 30, 2015, with English translation, from corresponding Taiwanese Patent Application No. 100112640, 14 pages.

Office Action issued in parallel Taiwanese Patent Application No. 104123545, dated Nov. 26, 2015, 7 pages.

Office Action issued in parallel U.S. Appl. No. 13/649,233 dated Dec. 22, 2015, 23 pages.

Office Action, dated May 31, 2016, in parallel Korean Patent Application No. 10-2012-7029634, with English translation, 15 pages.

Oh, Han, et al., "H.264-Based Depth Map Sequence Coding Using Motion Information of Corresponding Texture Video", Proceedings of the PSIVT 2006, 2006, p. 898-907, [online], [search on Jun. 25, 2014], Internet, URL, http://vclab.gist.ac.kr/papers/01/2006/1_2006_HOH_H.264-based_Depth_Map_Sequence_Coding_Using_Motion_Information_of_Corresponding_Texture_Video.pdf, 10 pages.

Quadtree-based adaptive loop filter, Toshiba Corporation; Telecommunication Standardization Sector; Jan. 2009.

Result of Consultation dated Nov. 12, 2015, from corresponding European Patent Application No. 11 714 653.0, 4 pages.

Richardson, I.E.G., "H.264 and MPEG-4 Video Compression, video coding for next-generation multimedia, passage", Jan. 1, 2003, H.264 and MPEG-4 Video Compression: Video Coding for Next

(56) References Cited

OTHER PUBLICATIONS

Generation Multimedia, Hoboken, NJ: John Wiley & Sons, US, pp. 175-176, 210, XP002367662, ISBN: 978-0-470-84837-1, 3 pages.
Richardson, I.E.G., "H264/MPEG-4, Part 10, White Paper—Prediction of Intra Macroblocks", Internet Citation, Apr. 30, 2003, XP002281494, URL: http://www.vcodex.com/h264.html/h264_intrapred.pdf, retrieved May 24, 2004, 6 pages.
Santillana-Rivero, "Hierarchical Motion-Based Image Segmentation Applied to HDTV", Proceedings of the Int'l Workshop on Signal Processing of HDTV; Amsterdam, Feb.-Mar. 1988, pp. 367-374.
Schwarz, H et al., "Tree-Structured Macroblock Partition", ITU-Telecommunications Standardization Sector Study Group 16—Video Coding Experts Group (VCEG) 15th Meeting. Pattaya, Thailand., Dec. 2001, 1-6.
Sekiguchi, S et al., "Results of CE on Separate Prediction Modes for 4:4:4 Coding (CE9)", Joint Video Team (JVT) of ISO/IEC MPEG & ITU-T VCEG (ISOIIEC JTC1/SC291WG11 and ITU-T SG16 0.6) 18th Meeting. Bangkok, TH., Jan. 2006, 28 Pages.
Sullivan, G et al., "New Standardized Extensions of MPEG4-AVC/H.264 for Professional-Quality Video Applications", IEEE. ICIP 2007., Sep. 1, 2007, 4 Pages.
Text of ISO/IEC 14496-10 FCD Advanced Video Coding, 61, MPEG Meeting, Jul. 22-26, 2002, Klagenfurt, (Motion Picture Expert Group or ISO/IEC JTC1/SC29/WG11, No. N4920, Aug. 11, 2002, XP030012343, ISSN: 0000-0365, 208 pages.
Extended European Search Report dated Aug. 23, 2016 in European Application 16173177.3.
Joel Jung et al: Competition-Based Scheme for Motion Vector Selection and Coding, 29. VCEG Meeting; 77. MPEG Meeting; Jul. 17, 2006-Jul. 17, 2006; Klagenfurt, AT; (Video Coding Experts Group of ITU-T SG.16), No. VCEG-AC06rl, Aug. 2, 2006 (Aug. 2, 2006), XP030003490.
Yang W et al: Efficient Motion Vector Coding Algorithms Based on Adaptive Template Matching Techniques 39. VCEG Meeting; Jan. 16, 2010-Jan. 22, 2010; Kyoto; (Video Coding Expertsgroup of ITU-T SG.16) URL: http://wftp3.itu.int/av-arch/video-site/, No. VCEG-AM16, Jan. 16, 2010 (Jan. 16, 2010), XP030003736.
Non-Final Office Action issued in parallel U.S. Appl. No. 13/649,233 dated May 13, 2016, 20 pages.
Office Action dated Feb. 24, 2016 in parallel U.S. Appl. No. 13/649,291, 24 pages.
Office Action dated Sep. 13, 2016 in parallel U.S. Appl. No. 13/649,251, 37 pages.
Office Action dated Sep. 14, 2016 in parallel U.S. Appl. No. 13/649,291, 46 pages.
Office Action dated Sep. 23, 2016 in U.S. Appl. No. 13/650,635.
Office Action dated Nov. 3, 2016 in U.S. Appl. No. 15/197,189.
Notice of Allowance dated Oct. 28, 2016 in U.S. Appl. No. 15/195,067.
Office Action dated Nov. 9, 2016 in U.S. Appl. No. 15/196,890.
Notice of Allowance dated Nov. 14, 2016 in U.S. Appl. No. 15/195,407.
Office Action dated Nov. 10, 2016 in U.S. Appl. No. 15/196,113.
Office Action dated Nov. 23, 2016 in U.S. Appl. No. 15/196,342.
Office Action dated Nov. 23, 2016 in U.S. Appl. No. 15/195,266.
Office Action dated Dec. 2, 2016 in U.S. Appl. No. 15/197,406.
Notice of Allowance dated Jan. 20, 2017 in Taiwanese Application 105124461.
Office Action dated Jan. 9, 2017 in U.S. Appl. No. 13/649,233.
Office Action dated Feb. 21, 2017 in U.S. Appl. No. 13/649,291.
Office Action dated Feb. 23, 2017 in U.S. Appl. No. 13/650,635.
Office Action dated Mar. 16, 2017 in U.S. Appl. No. 13/649,251.
Office Action dated Mar. 28, 2017 in U.S. Appl. No. 15/413,852.
Office Action dated Apr. 3, 2017 in U.S. Appl. No. 15/413,590.
Office Action dated May 26, 2017 in U.S. Appl. No. 15/196,890.
Office Action dated Jun. 8, 2017 in U.S. Appl. No. 15/196,113.
Office Action dated Jun. 8, 2017 in U.S. Appl. No. 15/196,342.
Office Action dated Jun. 9, 2017 in U.S. Appl. No. 15/197,406.

Notice of Allowance dated Jun. 16, 2017 in U.S. Appl. No. 15/197,189.
Touradj Ebrahimi, A new technique for motion field segmentation and coding for very low bitrate video coding applications, 1994, AT&T Bell Lab, IEEE, pp. 1-5.
Decision of Grant dated Jul. 28, 2017 in Korean Application 10-2016-7035916.
Decision of Grant dated Jul. 28, 2017 in Korean Application 10-2016-7035919.
Office Action dated Aug. 22, 2017 in European Application 15174132.9.
Guido M. Schuster et al., "A Video Compression Scheme with Optimal Bit Allocation Among Segmentation, Motion, and Residual Error", IEEE Transactions on Image Processing, IEEE Service Center, Piscataway, NJ, US, vol. 6, No. 11, Nov. 1, 1997.
Office Action dated Aug. 10, 2017 in U.S. Appl. No. 15/195,266.
Office Action dated Sep. 29, 2017 in European Application 10716518.5.
"Joint Scalable Video Model (JSVM) 7", 77. MPEG Meeting; Jul. 17, 2006-Jul. 21, 2006; Klagenfurt; (Motion Picture Expert Group or ISO/IEC JTC1/SC29/ WG11), No. N8242, Oct. 27, 2006 (Oct. 27, 2006), XP030014734.
Office Action dated Aug. 24, 2017 in Chinese Application 2015104728008.
Office Action dated Oct. 3, 2017 in U.S. Appl. No. 15/413,852.
Office Action dated Oct. 3, 2017 in U.S. Appl. No. 15/413,590.
Office Action dated Oct. 12, 2017 in U.S. Appl. No. 15/197,406.
Office Action dated Oct. 25, 2017 in U.S. Appl. No. 13/649,251.
Office Action dated Nov. 6, 2017 in U.S. Appl. No. 15/196,342.
Office Action dated Nov. 17, 2017 in U.S. Appl. No. 13/649,291.
Office Action dated Nov. 20, 2017 in U.S. Appl. No. 13/650,635.
Notice of Allowance dated Jan. 17, 2018 in U.S. Appl. No. 15/196,890.
Office Action dated Feb. 8, 2018 in U.S. Appl. No. 15/195,266.
Extended European Search Report EP Application No. 17201697.4 dated Feb. 16, 2018.
Office Action dated Mar. 13, 2018 in U.S. Appl. No. 15/707,467.
Office Action dated Mar. 8, 2018 in U.S. Appl. No. 13/649,291.
Notice of Allowance dated Mar. 26, 2018 in U.S. Appl. No. 13/649,233.
Notice of Allowance dated Apr. 12, 2018 in U.S. Appl. No. 15/196,113.
Office Action dated Mar. 20, 2018 in Indian Patent Application No. 3089/KOLNP/2012.
Final Office Action U.S. Appl. No. 15/196,342 dated May 25, 2018.
Final Office Action U.S. Appl. No. 13/650,635 dated May 29, 2018.
Final Office Action U.S. Appl. No. 15/195,266 dated Jun. 6, 2018.
Non-final office action U.S. Appl. No. 15/940,879 dated Jun. 18, 2018.
Non-final office Action U.S. Appl. No. 15/954,991 dated Jun. 12, 2018.
Non-final office action U.S. Appl. No. 15/940,839 dated May 29, 2018.
Office Action Chinese Patent Application No. 2016104108885 dated May 3, 2018.
Office Action Chinese Patent Application No. 201610422931X dated May 4, 2018.
Non-final Office Action U.S. Appl. No. 15/197,406 dated Jun. 29, 2018.
Notice of Allowance U.S. Appl. No. 15/413,852 dated Jul. 5, 2018.
Office Action Chinese Patent Application No. 2016104128342 dated May 18, 2018.
Notice of Allowance Taiwanese Patent Application No. 106102724 dated Jun. 6, 2018.
Notification of First Office Action Taiwanese Patent Application No. 2016104213275 dated Jun. 4, 2018.
Notification of First Office Action Chinese Patent Application No. 2016104110565 dated May 30, 2018.
Sekiguchi et al., Joint Video Team (JVT) of ISO/IEC MPEG & ITU-T VCEG (ISO/IEC JTC1/SC29/WG11 and ITU-T SG16 Q. 6) 18th Meeting, Jan. 14-20, 2006, 31 pgs.
Final Office Action U.S. Appl. No. 13/649,251 dated Jul. 10, 2018.

(56) References Cited

OTHER PUBLICATIONS

HM Software Manual—HEVC—https://hevc.hhi.fraunhofer.de/trac/heyc/export/HEAD/trunk/ . . . /software-mauel.tex, Feb. 12, 2010 (Year: 2010).
Non-final office action U.S. Appl. No. 13/649,291 dated Aug. 7, 2018.
Notification of the First Office Action Chinese Patent Application No. 20166104209015 dated Jun. 8, 2018.
Notification of the First Office Action Chinese Patent Application No. 2016104128323 dated Jun. 4, 2018.
Notification of the First Office Action Chinese Patent Application No. 2016104209369 dated Jun. 27, 2018.
Notification of the First Office Action Chinese Patent Application No. 2016104229593 dated Jul. 3, 2018.
Notification of the First Office Action Chinese Patent Application No. 2016104153556 dated Jul. 2, 2018.
Notification of the First Office Action Chinese Patent Application No. 201610422988 dated Jul. 25, 2018.
Notification of the First Office Action Chinese Patent Application No. 2016106715736 dated Jul. 27, 2018.
Notification of the First Office Action Chinese Patent Application No. 2016107307594 dated Jul. 31, 2018.
Notification of the First Office Action Chinese Patent Application No. 2016106709805 dated Jul. 31, 2018.
Notification of the First Office Action Chinese Patent Application No. 2016107392101 dated Aug. 2, 2018.
Notification of the First Office Action Chinese Patent Application No. 2016104109163 dated Jul. 31, 2018.
Notification of the First Office Action Chinese Patent Application No. 2016107368456 dated Aug. 2, 2018.
Notification of the First Office Action Chinese Patent Application No. 2016104212535 dated Aug. 10, 2018.
Notification of the First Office Action Chinese Patent Application No. 2016106711237 dated Aug. 15, 2018.
Notification of the First Office Action Chinese Patent Application No. 2016104152074 dated Aug. 23, 2018.
Notification of the First Office Action Chinese Patent Application No. 201610534834X dated Aug. 29, 2018.
Non-final Office Action U.S. Appl. No. 16/000,534 dated Sep. 28, 2018.
Non-final Office Action U.S. Appl. No. 16/017,453 dated Sep. 21, 2018.
Notice of Allowance U.S. Appl. No. 15/954,991 dated Oct. 29, 2018.
Notification of the First Office Action Chinese Patent Application No. 2016104151283 dated Sep. 3, 2018.
Notification of the First Office Action Chinese Patent Application No. 2016105347667 dated Sep. 4, 2018.
Notification of the First Office Action Chinese Patent Application No. 2016106710200 dated Sep. 6, 2018.
Notification of the first Office Action Chinese Patent Application No. 2016106716086 dated Aug. 31, 2018.
Notification of the First Office Action Chinese Patent Application No. 2016107368691 dated Sep. 10, 2018.
Notification of the First Office Action Chinese Patent Application No. 2016107392900 dated Sep. 14, 2018.
Notification of the First Office Action Chinese Patent Application No. 2016106700834 dated Sep. 12, 2018.
Office Action Taiwanese Patent Application No. 106105964 dated Oct. 2, 2018.
Notification of the first Office Action Chinese Patent Application No. 2016107307700 dated Sep. 25, 2018.
Notice of Allowance U.S. Appl. No. 13/650,635 dated Oct. 30, 2018.
Notification of the First Office Action Chinese Patent Application No. 2016106700995 dated Sep. 26, 2018.
First Office Action Chinese Patent Application No. 201610736938.9 dated Oct. 29, 2018.
Notification of the First Office Action Chinese Patent Application No. 2016105337769 dated Sep. 28, 2018.
Notification of the First Office Action Chinese Patent Application No. 2016105336376 dated Oct. 8, 2018.
Notification of the First Office Action Chinese Patent Application No. 2016105318522 dated Sep. 27, 2018.
Notification of the First Office Action Chinese Patent Application No. 2016105341410 dated Sep. 27, 2018.
Notification of the First Office Action Chinese Patent Application No. 2016105343929 dated Sep. 28, 2018.
Notification of the First Office Action Chinese Patent Application No. 2016104149480 dated Sep. 30, 2018.
Notification of the First Office Action Chinese Patent Application No. 2016107368973 dated Sep. 28, 2018.
Jong Won Kim et al., "Video Coding with R-D Constrained Hierarchical Variable Block Size (VBS) Motion Estimation" Journal of Visual Communication and Image Representation vol. 9, No. 3, Sep. 1998, pp. 243-254.
Notification of the First Office Action Chinese Patent Application No. 2016107392205 dated Oct. 9, 2018.
Notification of the First Office Action Chinese Patent Application No. 201610736815.5 dated Oct. 18, 2018.
Notification of the First Office Action Chinese Patent Application No. 2016105336874 dated Oct. 8, 2018.
Notification of the First Office Action Chinese Patent Application No. 2016104150577 dated Oct. 12, 2018.
Notification of the First Office Action Chinese Patent Application No. 2016106710785 dated Oct. 9, 2018.
Notification of the First Office Action Chinese Patent Application No. 2016105337082 dated Oct. 8, 2018.
Notification of the First Office Action Chinese Patent Application No. 201610410920X dated Oct. 17, 2018.
Notice of Allowance U.S. Appl. No. 15/940,839 dated Nov. 6, 2018.
Notification of the First Office Action Chinese Patent Application No. 2016107307382 dated Oct. 23, 2018.
Notification of the First Office Action Chinese Patent Application No. 2016107392084 dated Oct. 10, 2018.
Notification of the First Office Action Chinese Patent Application No. 2016105337627 dated Oct. 12, 2018.
Notification of the First Office Action Chinese Patent Application No. 2016105310840 dated Oct. 16, 2018.
Notification of the First Office Action Chinese Patent Application No. 2016105323215 dated Nov. 8, 2018.
First Office Action Chinese Patent Application No. 2016107393176 dated Nov. 5, 2018.
Notice of Allowance U.S. Appl. No. 16/033345 dated Nov. 8, 2018.
Office Action Chinese Patent Application No. 201610533982.X dated Nov. 21, 2018.
Office Action Taiwanese Patent Application No. 10721027110 dated Nov. 5, 2018.
Office Action Taiwanese Patent Application No. 10721027120 dated Nov. 5, 2018.
Non-final Office Action U.S. Appl. No. 13/649,251 dated Nov. 26, 2018.
Final Office Action U.S. Appl. No. 15/707,467 dated Nov. 27, 2018.
Notification of the First Office Action Chinese Patent Application No. 2016105339355 filed Nov. 21, 2018.
Final Office Action U.S. Appl. No. 15/940,879 dated Nov. 27, 2018.
Grant of Patent Korean Patent Application No. 10-2017-7031115 dated Dec. 10, 2018.
Non-final Office Action U.S. Appl. No. 16/148,417 dated Dec. 10, 2018.
Non-final Office Action U.S. Appl. No. 15/195,266 dated Dec. 21, 2018.
Final Office Action U.S. Appl. No. 13/649,251 dated Dec. 26, 2018.
Notice of Allowance U.S. Appl. No. 15/196,342 dated Jan. 8, 2019.
Muller, J.H., "Descriptions of sprite and prediction core experiments on coding efficiency in MPEG-4 Video", 39. MPEG Meeting, Apr. 7-11, 1997, Bristol, No. M2139 pp. 1-136.
Extended European Search Report EP Application No. 18195953.7 dated Jan. 16, 2019.
Non-final Office Action U.S. Appl. No. 16/155,281 dated Jan. 24, 2019.
Non-final Office Action U.S. Appl. No. 16/197,210 dated Jan. 30, 2019.

(56) References Cited

OTHER PUBLICATIONS

Notice of Allowance U.S. Appl. No. 16/017,453 dated Feb. 13, 2019.
Non-final Office Action U.S. Appl. No. 16/197,154 dated Feb. 11, 2019.
Non-final Office Action U.S. Appl. No. 16/197,232 dated Feb. 28, 2019.
Non-final Office Action U.S. Appl. No. 16/261,823 dated Mar. 14, 2019.
Notice of Allowance U.S. Appl. No. 15/197,406 dated Feb. 11, 2019.
Notice of Allowance U.S. Appl. No. 13/649,251 dated Mar. 14, 2019.
Non-final Office Action U.S. Appl. No. 16/271,094 dated Mar. 22, 2019.
Extended European Search Report EP Application No. 18195956.0 dated Mar. 19, 2019.
Decision to Grant a Patent Korean Patent Application No. 10-2018-7017801 dated Mar. 22, 2019.
Second Office Action Chinese Patent Application No. 201610534733.2 dated Mar. 29, 2019.
Notice of Allowance U.S. Appl. No. 16/148,417 dated Apr. 2, 2019.
Notice of Allowance U.S. Appl. No. 16/155,281 dated Apr. 10, 2019.
Non-final Office Action dated Apr. 15, 2019 issued in corresponding U.S. Appl. No. 16/268,136.
Non-final Office Action U.S. Appl. No. 16/259,592 dated Mar. 22, 2019.
Grant of Patent Korean Patent Application No. 10-2018-7011962 dated Apr. 22, 2019.
Notification of Reasons for Refusal dated Jul. 4, 2018 issued in corresponding Korean Patent Application No. 10-2018-7011962.
Second Office Action dated Mar. 14, 2019 issued in corresponding Chinese Patent Application No. 2016106715736.
Final Office Action U.S. Appl. No. 15/195,266 dated Apr. 19, 2019.
Non-final Office Action U.S. Appl. No. 13/649,291 dated Apr. 22, 2019.
Final Office Action U.S. Appl. No. 16/000,534 dated Apr. 24, 2019.
Office Action Chinese Patent Application No. 201610535021.2 dated Apr. 30, 2019.
Notice of Allowance U.S. Appl. No. 15/707,467 dated May 22, 2019.
Notice of Allowance U.S. Appl. No. 16/155,281 dated Jun. 5, 2019.
Notice of Allowance U.S. Appl. No. 16/017,453 dated Jun. 6, 2019.
Notice of Allowance U.S. Appl. No. 16/197,210 dated Jun. 5, 2019.
Non-final Office Action U.S. Appl. No. 15/940,879 dated Jun. 6, 2019.
Notification of the Second Office Action Chinese Patent Application No. 2016106710785 dated May 21, 2019.
Notification of the Second Office Action Chinese Patent Application No. 2016105347667 dated May 17, 2019.
Second Office Action dated Jun. 6, 2019 Chinese Patent Application No. 201610736897.3.
Third Office Action dated Jun. 12, 2019 Chinese Patent Application No. 201610671573.6.
Notice of Allowance U.S. Appl. No. 15/197,406 dated Jun. 21, 2019.
Notice of Allowance U.S. Appl. No. 16/261,823 dated Jun. 21, 2019.
Second Office Action dated May 30, 2019 Chinese Patent Application No. 201610414948.0.
Office Action Korean Patent Application No. 10-2019-7006877 dated Jun. 3, 2019.
Notification of Grant Chinese Patent Application No. 201610422988.X dated Jun. 11, 2019.
Second Office Action Chinese Patent Application No. 201610531084.0 dated Jun. 17, 2019.
Final Office Action U.S. Appl. No. 16/197,232 dated Jun. 21, 2019.
Non-final Office Action U.S. Appl. No. 16/376,671 dated Jun. 28, 2019.
Grant of Patent Chinese Patent Application No. 201610533776.9 dated Jun. 26, 2019.
Notification of the Second Office Action Chinese Patent Application No. 201610730738.2 dated Jun. 11, 2019.
Second Office Action Chinese Patent Application No. 201610410920.X dated Jun. 26, 2019.
Grant of Patent Korean Patent Application No. 10-2018-7027551 dated Jul. 3, 2019.
Grant of Patent Chinese Patent Application No. 201610415057.7 dated Jul. 4, 2019.
First Office Action Chinese Patent Application No. 201610730770.0 dated Jul. 11, 2019.
Office Action Chinese Patent Application No. 201610534392.9 dated Jul. 10, 2019.
Office Action Chinese Patent Application No. 201610534141.0 dated Jul. 10, 2019.
Office Action Korean Patent Application No. 10-2018-7026913 dated Jul. 3, 2019.
Notice of Issuance Chinese Patent Application No. 201610533986.8 dated Jul. 9, 2019.
Second Office Action Chinese Patent Application No. 201610671079.X dated Jul. 10, 2019.
Grant of Patent Chinese Patent Application No. 201610533708.2 dated Jul. 3, 2019.
Grant of Patent Chinese Patent Application No. 201610533687.4 dated Jul. 3, 2019.
Second Office Action Chinese Patent Application No. 201610671123.7 dated Jul. 15, 2019.
Second Office Action Chinese Patent Application No. 201610670083.4 dated Jul. 3, 2019.
Notification of the Second Office Action Chinese Patent Application No. 2016105343929 dated Jul. 10, 2019.
Notice of Allowance Chinese Patent Application No. 201610415355.6 dated Jul. 16, 2019.
Notification of the Second Office Action Chinese Patent Application No. 2016107392084 dated Aug. 5, 2019.
Second Office Action Chinese Patent Application No. 201610739220.5 dated Aug. 5, 2019.
Notice of Issuance Chinese Patent Application No. 201610730759.4 dated Aug. 8, 2019.
Notification of the Second Office Action Chinese Patent Application No. 2016107392205 dated Aug. 5, 2019.
Notification of the Second Office Action Chinese Patent Application No. 2016107392900 dated Aug. 2, 2019.
Office Action dated Aug. 5, 2019 in Chinese Application 2016107392084.
Notice of Issuance dated Aug. 6, 2019 in Chinese Application 201610532321.5.
Notice of Issuance dated Aug. 16, 2019 in Chinese Application 201610410916.3.
Notice of Allowance dated Aug. 19, 2019 in Taiwanese Application 106133751.
Notice of Allowance dated Aug. 19, 2019 in Taiwanese Application 106133750.
Notice of Allowance dated Aug. 19, 2019 in Taiwanese Application 106133748.
Notice of Allowance dated Aug. 20, 2019 in U.S. Appl. No. 13/650,635.
Notice of Allowance dated Aug. 21, 2019 in U.S. Appl. No. 15/413,852.
Notice of Issuance dated Aug. 29, 2019 in Chinese Application 201610412836.1.
Notice of Allowance dated Aug. 7, 2019 in U.S. Appl. No. 16/268,136.
Office Action dated Sep. 6, 2019 in Chinese Application 201610736815.5.
Office Acton dated Sep. 9, 2019 in Chinese Application 201610736938.9.
Office Action dated Aug. 13, 2019 in Korean Application 10-2019-7018213.
Office Action dated Sep. 3, 2019 in Chinese Application 201610670978.8.
Office Action dated Sep. 4, 2019 in Korean Application 10-2019-7021820.

(56) References Cited

OTHER PUBLICATIONS

Notice of Allowance dated Sep. 4, 2019 in Chinese Application 201610422931.X.
Office Action dated Sep. 16, 2019 in Chinese Application 201610533982.X.
Office Action dated Sep. 30, 2019 in Chinese Application 201610671122.2.
Office Action dated Oct. 9, 2019 in Chinese Application 201610535021.2.
Notice of Allowance dated Oct. 16, 2019 in U.S. Appl. No. 16/446,150.
Office Action dated Oct. 22, 2019 in Chinese Application 201610533637.6.
Notice of Issuance dated Oct. 28, 2019 in Chinese Patent Application 201610534733.2.
Notice of Allowance dated Oct. 21, 2019 in U.S. Appl. No. 16/376,671.
Office Action dated Nov. 7, 2019 in U.S. Appl. No. 15/195,266.
Notice of Allowance dated Nov. 14, 2019 in U.S. Appl. No. 16/261,823.
Office Action dated Nov. 14, 2019 in U.S. Appl. No. 16/578,542.
Office Action dated Nov. 20, 2019 in U.S. Appl. No. 16/566,063.
Office Action dated Nov. 21, 2019 in U.S. Appl. No. 16/000,534.
Notice of Allowance dated Nov. 27, 2019 in U.S. Appl. No. 15/259,592.
Notice of Allowance dated Oct. 23, 2019 in U.S. Appl. No. 16/561,427.
Office Action dated Dec. 23, 2019 in U.S. Appl. No. 16/561,558.
Notice of Allowance dated Oct. 28, 2019 in Chinese Application 2016107307664.
Notice of Issuance dated Oct. 30, 2019 in Chinese Application 201610534766.7.
Notice of Issuance dated Nov. 22, 2019 in Chinese Application 201610420936.9.
Notice of Issuance dated Nov. 19, 2019 in Chinese Application 201610671573.6.
Notice of Issuance dated Dec. 3, 2019 in Chinese Application 2016107307683.
Office Action dated Dec. 4, 2019 in Chinese Application 201610414948.0.
Office Action dated Dec. 10, 2019 in Chinese Application 201610730738.2.
Office Action dated Dec. 10, 2019 in European Application 18195953.7.
Notice of Issuance dated Dec. 16, 2019 in Chinese Application 201610533637.6.
Notice of Issuance dated Dec. 24, 2019 in Chinese Application 201610534392.9.
Notice of Issuance dated Dec. 24, 2019 in Chinese Application 201610534141.0.
Office Action dated Dec. 17, 2019 in Korean Application 10-2019-7029076.
Notice of Issuance dated Dec. 27, 2019 in Chinese Application 201610671078.5.
Notice of Issuance dated Dec. 31, 2019 in Chinese Application 201610533982.X.
Office Action dated Dec. 25, 2019 in Chinese Application 201610736815.5.
Office Action dated Dec. 27, 2019 in Chinese Application 201610739290.0.
Office Action dated Jan. 2, 2020 in Chinese Application 201610531084.0.
Notice of Issuance dated Jan. 2, 2020 in Chinese Application 201610410920.X.
Office Action dated Jan. 8, 2020 in Chinese Application 201610671020.0.
Notice of Issuance dated Jan. 20, 2020 in Chinese Application 201610730770.0.
Notice of Issuance dated Jan. 22, 2020 in Chinese Patent Application 201610670083.4.
Office Action dated Jan. 19, 2020 in Chinese Patent Application 201610671079.X.
Office Action dated Jan. 28, 2020 in European Application 19185278.9.
Decision to Grant dated Jan. 21, 2020 in Korean Application 10-2019-7007867.
Office Action dated Feb. 11, 2020 in European Application 19187893.3.
Winken et al., Description of Video Coding Technology Proposal by Fraunhofer HHI, Joint Collaborative Team on Video Coding (JCT-VC) of ITU-T SG16 WP3 and ISO/IEC JTC1/SC291WG11, 1st Meeting, Dresden DE, Apr. 15-23, 2010.
Marpe, D., et al., Video Compression Using Nested Quadtree Structures, Leaf Merging, and Improved Techniques for Motion Representation and Entropy Coding, IEEE Transactions on Circuits and Systems for Video Technology, 2010, vol. 20, No. 12, pp. 1676-1687.
Office Action dated Jan. 21, 2020 in Japanese Application 2019-033521.
Marco Tagliasacchi et al., Motion Estimation by Quadtree Pruning and Merging, Multimedia and Expo, 2006 IEEE International Conference on, Jul. 9, 2006, pp. 1861-1864.
Notice of Issuance dated Feb. 21, 2020 in Chinese Application 2016105350212.
Notice of Issuance dated Feb. 26, 2020 in Chinese Application 201610671123.7.
Hearing Notice dated Feb. 25, 2020 in Indian Patent Application 3089/KOLNP/2012.
Office Action dated Jan. 2, 2020 in U.S. Appl. No. 15/940,879.
Office Action dated Jan. 22, 2020 in U.S. Appl. No. 16/677,083.
Office Action dated Jan. 23, 2020 in U.S. Appl. No. 16/686,558.
Notice of Allowance dated Mar. 6, 2020 in U.S. Appl. No. 13/649,251.
Notice of Allowance dated Mar. 3, 2020 in U.S. Appl. No. 16/578,542.
Notice of Allowance dated Mar. 4, 2020 in U.S. Appl. No. 16/566,063.
Office Action dated Mar. 10, 2020 in Korean Application 10-2020-7004435.
Notice of Issuance dated Mar. 17, 2020 in Chinese Application 201610739208.4.
Decision to Grant issued Mar. 24, 2020 in Korean Application 10-2019-7006877.
Office Action dated Mar. 17, 2020 in U.S. Appl. No. 16/778,484.
Office Action dated Mar. 23, 2020 in U.S. Appl. No. 16/747,834.
Notice of Allowance dated Mar. 19, 2020 in U.S. Appl. No. 16/664,031.
Notice of Allowance dated Mar. 25, 2020 in U.S. Appl. No. 16/197,232.
Notice of Allowance dated Mar. 25, 2020 in U.S. Appl. No. 13/649,291.
Notice of Allowance dated Mar. 26, 2020 in U.S. Appl. No. 15/195,266.
Office Action dated Jan. 17, 2020 in Brazilian Application 11 2012 026400 1.
Notice of Issuance dated Mar. 3, 2020 in Chinese Application 201610736938.9.
Notice of Issuance dated Mar. 5, 2020 in Chinese Application 201610670978.8.
Office Action dated Mar. 3, 2020 in Korean Application 10-2020-7003599.
Notice of Issuance dated Mar. 12, 2020 in Chinese Application 201610739290.0.
Notice of Issuanced dated Apr. 17, 2020 in Chinese Application 201610739220.5.
Notice of Issuance dated Apr. 9, 2020 in Chinese Applicaiton 201610736815.5.
Decision to Grant dated Apr. 24, 2020 in Korean Applicaiton 10-2019-7018213.
Decision to Grant dated Apr. 21, 2020 in Japanese Application 2018-165914.
Decision to Grant dated Apr. 21, 2020 in Japanese Application 2018-165921.

(56) References Cited

OTHER PUBLICATIONS

Decision to Grant dated Apr. 21, 2020 in Japanese Application 2018-165922.
Office Action dated Apr. 6, 2020 in Brazilian Application 11 2012 026383 8.
Office Action dated May 4, 2020 in European Application 20150595.5.
Office Action dated Mar. 27, 2020 in Korean Application 10-2020-7004587.
Notification of Grant date May 11, 2020 in Korean Application 10-2018-7026913.
Notice of Issuance dated May 28, 2020 in Chinese Application 20161073078.2.
Office Action dated Jun. 4, 2020 in European Application 20155684.2.
Office Action dated May 29, 2020 in European Application 16173177.3.
Notice of Issuance dated Jun. 3, 2020 in Chinese Application 201610414948.0.
Notice of Allowance dated May 22, 2020 in Taiwanese Patent 108118367.
Notice of Allowanced dated Apr. 8, 2020 in U.S. Appl. No. 16/000,534.
Notice of Allowance dated Apr. 9, 2020 in U.S. Appl. No. 16/197,154.
Notice of Allowance dated Apr. 9, 2020 in U.S. Appl. No. 16/561,588.
Notice of Allowanced dated May 4, 2020 in U.S. Appl. No. 16/677,083.
Notice of Allowanced dated May 7, 2020 in U.S. Appl. No. 16/686,558.
Notice of Allowance dated May 14, 2020 in U.S. Appl. No. 16/803,167.
Notice of Allowance dated May 19, 2020 in U.S. Appl. No. 15/413,852.
Office Action dated Jun. 2, 2020 in U.S. Appl. No. 16/855,266.

* cited by examiner

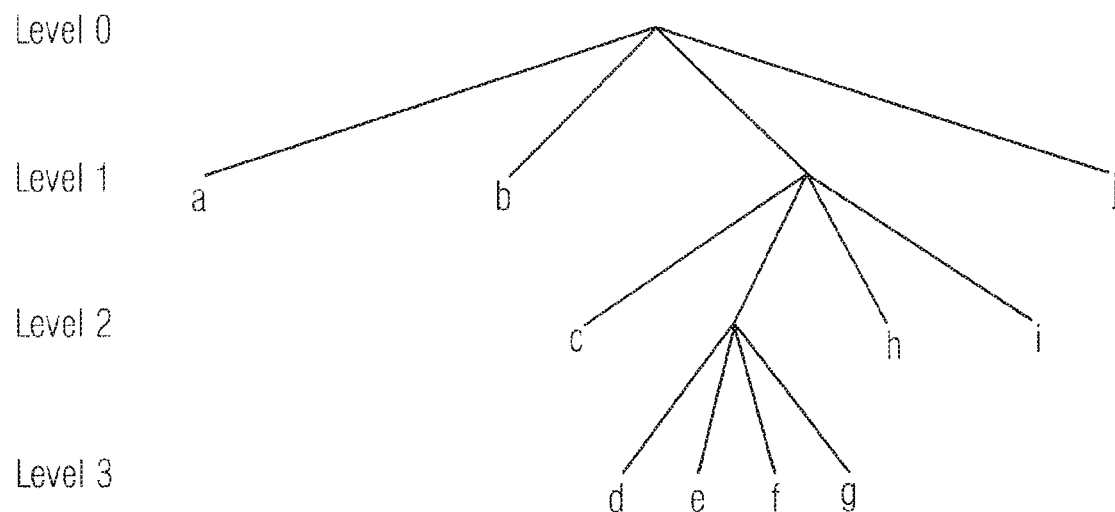
FIGURE 5B
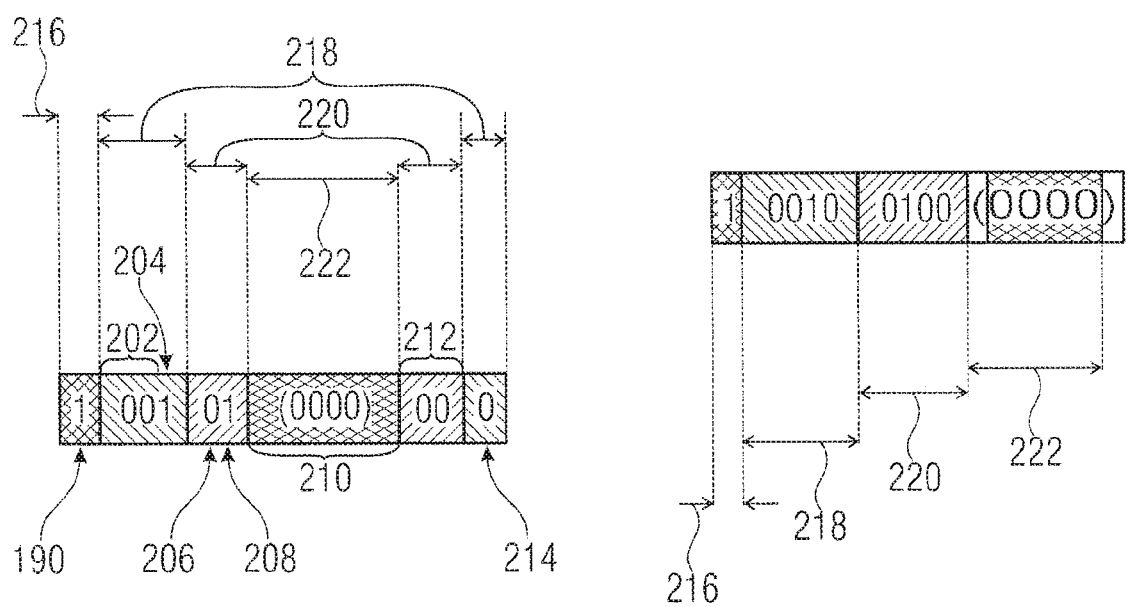
FIGURE 6A
FIGURE 6B

INHERITANCE IN SAMPLE ARRAY MULTITREE SUBDIVISION

CROSS-REFERENCE TO RELATED APPLICATIONS

The present application is a continuation of U.S. patent application Ser. No. 15/197,406, filed Jun. 29, 2016, which is a continuation of U.S. patent application Ser. No. 13/649,233, filed Oct. 11, 2012, now U.S. Pat. No. 10,038,920, which is a continuation of International Application No. PCT/EP2011/055794, filed Apr. 13, 2011, and additionally claims priority from International Application No. PCT/EP2010/054827, filed Apr. 13, 2010, and from EP Patent Application No. 10159782.1, filed Apr. 13, 2010, all of which are incorporated herein by reference in their entireties.

The present invention relates to coding schemes for an array of information samples representing a spatially sampled information signal such as a video or still picture.

BACKGROUND OF THE INVENTION

In image and video coding, the pictures or particular sets of sample arrays for the pictures are usually decomposed into blocks, which are associated with particular coding parameters. The pictures usually consist of multiple sample arrays. In addition, a picture may also be associated with additional auxiliary samples arrays, which may, for example, specify transparency information or depth maps. The sample arrays of a picture (including auxiliary sample arrays) can be grouped into one or more so-called plane groups, where each plane group consists of one or more sample arrays. The plane groups of a picture can be coded independently or, if the picture is associated with more than one plane group, with prediction from other plane groups of the same picture. Each plane group is usually decomposed into blocks. The blocks (or the corresponding blocks of sample arrays) are predicted by either inter-picture prediction or intra-picture prediction. The blocks can have different sizes and can be either quadratic or rectangular. The partitioning of a picture into blocks can be either fixed by the syntax, or it can be (at least partly) signaled inside the bitstream. Often syntax elements are transmitted that signal the subdivision for blocks of predefined sizes. Such syntax elements may specify whether and how a block is subdivided into smaller blocks and associated coding parameters, e.g. for the purpose of prediction. For all samples of a block (or the corresponding blocks of sample arrays) the decoding of the associated coding parameters is specified in a certain way. In the example, all samples in a block are predicted using the same set of prediction parameters, such as reference indices (identifying a reference picture in the set of already coded pictures), motion parameters (specifying a measure for the movement of a blocks between a reference picture and the current picture), parameters for specifying the interpolation filter, intra prediction modes, etc. The motion parameters can be represented by displacement vectors with a horizontal and vertical component or by higher order motion parameters such as affine motion parameters consisting of six components. It is also possible that more than one set of particular prediction parameters (such as reference indices and motion parameters) are associated with a single block. In that case, for each set of these particular prediction parameters, a single intermediate prediction signal for the block (or the corresponding blocks of sample arrays) is generated, and the final prediction signal is build by a combination including superimposing the intermediate prediction signals. The corresponding weighting parameters and potentially also a constant offset (which is added to the weighted sum) can either be fixed for a picture, or a reference picture, or a set of reference pictures, or they can be included in the set of prediction parameters for the corresponding block. The difference between the original blocks (or the corresponding blocks of sample arrays) and their prediction signals, also referred to as the residual signal, is usually transformed and quantized. Often, a two-dimensional transform is applied to the residual signal (or the corresponding sample arrays for the residual block). For transform coding, the blocks (or the corresponding blocks of sample arrays), for which a particular set of prediction parameters has been used, can be further split before applying the transform. The transform blocks can be equal to or smaller than the blocks that are used for prediction. It is also possible that a transform block includes more than one of the blocks that are used for prediction. Different transform blocks can have different sizes and the transform blocks can represent quadratic or rectangular blocks. After transform, the resulting transform coefficients are quantized and so-called transform coefficient levels are obtained. The transform coefficient levels as well as the prediction parameters and, if present, the subdivision information is entropy coded.

In image and video coding standards, the possibilities for sub-dividing a picture (or a plane group) into blocks that are provided by the syntax are very limited. Usually, it can only be specified whether and (potentially how) a block of a predefined size can be sub-divided into smaller blocks. As an example, the largest block size in H.264 is 16×16. The 16×16 blocks are also referred to as macroblocks and each picture is partitioned into macroblocks in a first step. For each 16×16 macroblock, it can be signaled whether it is coded as 16×16 block, or as two 16×8 blocks, or as two 8×16 blocks, or as four 8×8 blocks. If a 16×16 block is sub-divided into four 8×8 block, each of these 8×8 blocks can be either coded as one 8×8 block, or as two 8×4 blocks, or as two 4×8 blocks, or as four 4×4 blocks. The small set of possibilities for specifying the partitioning into blocks in state-of-the-art image and video coding standards has the advantage that the side information rate for signaling the sub-division information can be kept small, but it has the disadvantage that the bit rate that may be used for transmitting the prediction parameters for the blocks can become significant as explained in the following. The side information rate for signaling the prediction information does usually represent a significant amount of the overall bit rate for a block. And the coding efficiency could be increased when this side information is reduced, which, for instance, could be achieved by using larger block sizes. Real images or pictures of a video sequence consist of arbitrarily shaped objects with specific properties. As an example, such objects or parts of the objects are characterized by a unique texture or a unique motion. And usually, the same set of prediction parameters can be applied for such an object or part of an object. But the object boundaries usually don't coincide with the possible block boundaries for large prediction blocks (e.g., 16×16 macroblocks in H.264). An encoder usually determines the sub-division (among the limited set of possibilities) that results in the minimum of a particular rate-distortion cost measure. For arbitrarily shaped objects this can result in a large number of small blocks. And since each of these small blocks is associated with a set of prediction parameters, which need to be transmitted, the side information rate can become a significant part of the overall bit rate. But since several of the small blocks still represent areas of the same object or part of an object, the prediction parameters for a number of the obtained blocks are the same or very similar.

That is, the sub-division or tiling of a picture into smaller portions or tiles or blocks substantially influences the coding efficiency and coding complexity. As outlined above, a sub-division of a picture into a higher number of smaller blocks enables a spatial finer setting of the coding parameters, whereby enabling a better adaptivity of these coding parameters to the picture/video material. On the other hand, setting the coding parameters at a finer granularity poses a higher burden onto the amount of side information that may be used in order to inform the decoder on the settings that may be used. Even further, it should be noted that any freedom for the encoder to (further) sub-divide the picture/video spatially into blocks tremendously increases the amount of possible coding parameter settings and thereby generally renders the search for the coding parameter setting leading to the best rate/distortion compromise even more difficult.

SUMMARY

According to an embodiment, a decoder for reconstructing an array of information samples representing a spatially sampled information signal, which is subdivided, according to subdivision information, into leaf regions of different sizes by multi-tree subdivision, from a data stream, wherein each leaf region has associated therewith a hierarchy level out of a sequence of hierarchy levels of the multi-tree subdivision, each leaf region has associated therewith coding parameters, the coding parameters are, for each leaf region, represented by a respective set of syntax elements, each syntax element is of a respective syntax element type out of a set of syntax element types, may have: an extractor for extracting the subdivision information and inheritance information, signaled within the data stream in addition to the sub-division information, from the data stream, the inheritance information indicating as to whether inheritance is used or not, and if inheritance is indicated to be used, at least one inheritance region of the array of information samples which is composed of a set of the leaf regions and corresponds to an hierarchy level of sequence of hierarchy levels of the multi-tree subdivision, being lower than each of the hierarchy levels with which the set of leaf regions are associated; wherein the decoder is configured to, if inheritance is indicated to be used, extracting an inheritance subset including at least one syntax element of a predetermined syntax element type from the data stream per inheritance region, and copying the inheritance subset into, or using the inheritance subset as a prediction for, a corresponding inheritance subset of syntax elements within the set of syntax elements representing the coding parameters associated with the set of leaf regions which the respective at least one inheritance region is composed of.

According to another embodiment, a method for reconstructing an array of information samples representing a spatially sampled information signal, which is subdivided, according to subdivision information, into leaf regions of different sizes by multi-tree subdivision, from a data stream, wherein each leaf region has associated therewith a hierarchy level out of a sequence of hierarchy levels of the multi-tree subdivision, each leaf region has associated therewith coding parameters, the coding parameters are, for each leaf region, represented by a respective set of syntax elements, each syntax element is of a respective syntax element type out of a set of syntax element types, may have the steps of: extracting the subdivision information from the data stream; extracting an inheritance information, signaled within the data stream in addition to the subdivision information, from the data stream, the inheritance information indicating as to whether inheritance is used or not, and if inheritance is indicated to be used, at least one inheritance region of the array of information samples which is composed of a set of the leaf regions and corresponds to an hierarchy level of sequence of hierarchy levels of the multi-tree subdivision, being lower than each of the hierarchy levels with which the set of leaf regions are associated; if inheritance is indicated to be used, extracting an inheritance subset including at least one syntax element of a predetermined syntax element type from the data stream per inheritance region, and copying the inheritance subset into, or using the inheritance subset as a prediction for, a corresponding inheritance subset of syntax elements within the set of syntax elements representing the coding parameters associated with the set of leaf regions which the respective at least one inheritance region is composed of.

According to another embodiment, an encoder for encoding an array of information samples representing a spatially sampled information signal, which is subdivided, according to subdivision information, into leaf regions of different sizes by multi-tree subdivision, into a data stream, wherein each leaf region has associated therewith a hierarchy level out of a sequence of hierarchy levels of the multi-tree subdivision, each leaf region has associated therewith coding parameters, the coding parameters are, for each leaf region, represented by a respective set of syntax elements, each syntax element is of a respective syntax element type out of a set of syntax element types, may have: a data stream inserter for inserting the subdivision information and inheritance information into the data stream so that the inheritance information is signaled within the data stream in addition to the subdivision information, the inheritance information indicating as to whether inheritance is used or not, and if inheritance is indicated to be used, at least one inheritance region of the array of information samples which is composed of a set of the leaf regions and corresponds to an hierarchy level of sequence of hierarchy levels of the multi-tree subdivision, being lower than each of the hierarchy levels with which the set of leaf regions are associated; wherein the encoder is configured to, if inheritance is indicated to be used, insert an inheritance subset including at least one syntax element of a predetermined syntax element type from the data stream per inheritance region into the data stream, and suppress coding a corresponding inheritance subset of syntax elements within the set of syntax elements representing the coding parameters associated with the set of leaf regions which the respective at least one inheritance region is composed of, or using the inheritance subset inserted as a prediction in residual encoding the corresponding inheritance subset of syntax elements within the set of syntax elements representing the coding parameters associated with the set of leaf regions which the respective at least one inheritance region is composed of, into the data stream.

According to another embodiment, a method for encoding an array of information samples representing a spatially sampled information signal, which is subdivided, according to subdivision information, into leaf regions of different sizes by multi-tree subdivision, into a data stream, wherein each leaf region has associated therewith a hierarchy level out of a sequence of hierarchy levels of the multi-tree subdivision, each leaf region has associated therewith coding parameters, the coding parameters are, for each leaf region, represented by a respective set of syntax elements, each syntax element is of a respective syntax element type out of a set of syntax element types, may have the steps of: inserting the subdivision information into the data stream; inserting, into the data stream, an inheritance information so that the inheritance information is signaled within the data stream in addition to the subdivision information, the inheritance information indicating as to whether inheritance is used or not, and if inheritance is indicated to be used, at least one inheritance region of the array of information samples which is composed of a set of the leaf regions and corresponds to an hierarchy level of sequence of hierarchy levels of the multi-tree subdivision, being lower than each of the hierarchy levels with which the set of leaf regions are associated; if inheritance is indicated to be used, inserting an inheritance subset including at least one syntax element of a predetermined syntax element type from the data stream per inheritance region into the data stream, and suppressing coding a corresponding inheritance subset of syntax elements within the set of syntax elements representing the coding parameters associated with the set of leaf regions which the respective at least one inheritance region is composed of, or using the inheritance subset inserted as a prediction in residual encoding the corresponding inheritance subset of syntax elements within the set of syntax elements representing the coding parameters associated with the set of leaf regions which the respective at least one inheritance region is composed of, into the data stream.

Another embodiment may have a computer readable digital storage medium having stored thereon a computer program having a program code for performing, when running on a computer, a method for reconstructing an array of information samples representing a spatially sampled information signal, which is subdivided, according to subdivision information, into leaf regions of different sizes by multi-tree subdivision, from a data stream, wherein each leaf region has associated therewith a hierarchy level out of a sequence of hierarchy levels of the multi-tree subdivision, each leaf region has associated therewith coding parameters, the coding parameters are, for each leaf region, represented by a respective set of syntax elements, each syntax element is of a respective syntax element type out of a set of syntax element types, which method may have the steps of: extracting the subdivision information from the data stream; extracting an inheritance information, signaled within the data stream in addition to the subdivision information, from the data stream, the inheritance information indicating as to whether inheritance is used or not, and if inheritance is indicated to be used, at least one inheritance region of the array of information samples which is composed of a set of the leaf regions and corresponds to an hierarchy level of sequence of hierarchy levels of the multi-tree subdivision, being lower than each of the hierarchy levels with which the set of leaf regions are associated; if inheritance is indicated to be used, extracting an inheritance subset including at least one syntax element of a predetermined syntax element type from the data stream per inheritance region, and copying the inheritance subset into, or using the inheritance subset as a prediction for, a corresponding inheritance subset of syntax elements within the set of syntax elements representing the coding parameters associated with the set of leaf regions which the respective at least one inheritance region is composed of.

Another embodiment may have a computer readable digital storage medium having stored thereon a computer program having a program code for performing, when running on a computer, a method for encoding an array of information samples representing a spatially sampled information signal, which is subdivided, according to subdivision information, into leaf regions of different sizes by multi-tree subdivision, into a data stream, wherein each leaf region has associated therewith a hierarchy level out of a sequence of hierarchy levels of the multi-tree subdivision, each leaf region has associated therewith coding parameters, the coding parameters are, for each leaf region, represented by a respective set of syntax elements, each syntax element is of a respective syntax element type out of a set of syntax element types, which method may have the steps of: inserting the subdivision information into the data stream; inserting, into the data stream, an inheritance information so that the inheritance information is signaled within the data stream in addition to the subdivision information, the inheritance information indicating as to whether inheritance is used or not, and if inheritance is indicated to be used, at least one inheritance region of the array of information samples which is composed of a set of the leaf regions and corresponds to an hierarchy level of sequence of hierarchy levels of the multi-tree subdivision, being lower than each of the hierarchy levels with which the set of leaf regions are associated; if inheritance is indicated to be used, inserting an inheritance subset including at least one syntax element of a predetermined syntax element type from the data stream per inheritance region into the data stream, and suppressing coding a corresponding inheritance subset of syntax elements within the set of syntax elements representing the coding parameters associated with the set of leaf regions which the respective at least one inheritance region is composed of, or using the inheritance subset inserted as a prediction in residual encoding the corresponding inheritance subset of syntax elements within the set of syntax elements representing the coding parameters associated with the set of leaf regions which the respective at least one inheritance region is composed of, into the data stream.

Another embodiment may have a data stream having encoded therein an array of information samples representing a spatially sampled information signal, which is subdivided, according to subdivision information, into leaf regions of different sizes by multi-tree subdivision, into a data stream, wherein each leaf region has associated therewith a hierarchy level out of a sequence of hierarchy levels of the multi-tree subdivision, each leaf region has associated therewith coding parameters, the coding parameters are, for each leaf region, represented by a respective set of syntax elements, each syntax element is of a respective syntax element type out of a set of syntax element types, wherein the data stream may have: the sub-division information; an inheritance information signaled within the data stream in addition to the subdivision information, the inheritance information and indicating as to whether inheritance is used or not, and if inheritance is indicated to be used, at least one inheritance region of the array of information samples which is composed of a set of the leaf regions and corresponds to an hierarchy level of sequence of hierarchy levels of the multi-tree subdivision, being lower than each of the hierarchy levels with which the set of leaf regions are associated; if inheritance is indicated to be used, an inheritance subset including at least one syntax element of a predetermined syntax element type from the data stream per inheritance region into the data stream, so that the inheritance subset is to be copied into a corresponding inheritance subset of syntax elements within the set of syntax elements representing the coding parameters associated with the set of leaf regions which the respective at least one inheritance region is composed of, or is to be used as a prediction for corresponding inheritance subset of syntax elements within the set of syntax elements representing the coding parameters associated with the set of leaf regions which the respective at least one inheritance region is composed of, with the data stream further including residuals of the corresponding inheritance subset of syntax elements within the set of syntax elements representing the coding parameters associated with the set of leaf regions which the respective at least one inheritance region is composed of, relative to the inheritance subset inserted as a prediction.

According to another embodiment, a decoder for reconstructing an array of information samples representing a spatially sampled information signal, which is subdivided into a multi-tree structure of leaf regions of different sizes by multi-tree subdivision, from a data stream, wherein the multi-tree structure is divided into a primary and a sub-ordinate sub-division defined in a sub-ordinate manner to each other, so that a tree-root block of the primary sub-division is sub-divided leaf blocks of the primary sub-division which, in turn, form the tree-root blocks of the sub-ordinate sub-division, further sub-divided into leaf regions of the multi-tree structure, each leaf region of the multi-tree structure has associated therewith a hierarchy level out of a sequence of hierarchy levels of the multi-tree subdivision, each leaf region of the multi-tree structure has associated therewith coding parameters, the coding parameters are, for each leaf region, represented by a respective set of syntax elements, each syntax element is of a respective syntax element type out of a set of syntax element types, may have: an extractor for extracting the multitree structure from the data stream, so as to acquire an inheritance information from the data stream, the inheritance information indicating as to whether inheritance is used or not, and if inheritance is indicated to be used, at least one inheritance region of the array of information samples which is composed of a set of the leaf regions of the multi-tree structure, corresponds to an hierarchy level of sequence of hierarchy levels of the multi-tree subdivision, being lower than each of the hierarchy levels with which the set of leaf regions of the multi-tree structure are associated, and is formed by leaf regions of the primary sub-division; wherein the extractor is further configured to extract an inheritance subset including at least one syntax element of a predetermined syntax element type from the data stream per inheritance region, wherein the at least one syntax element of the predetermined syntax element type is an intra-prediction mode syntax element, wherein the decoder is configured to decode, in an residual decoding order, a residual signal for each of the leaf regions of the multi-tree structure which the respective inheritance region is composed of, copy the inheritance subset into a corresponding inheritance subset of syntax elements within the set of syntax elements representing the coding parameters associated with the set of leaf regions of the multi-tree structure which the respective at least one inheritance region is composed of, and calculate, in the residual decoding order, a separate intra prediction signal for each of the leaf regions of the multi-tree structure which the respective inheritance region is composed of, according to an intra-prediction mode indicated by the intra-prediction mode syntax element, by using neighboring samples of a reconstructed signal of already reconstructed leaf regions of the multi-tree structure as a reference signal, with reconstructing the respective leaf region of the multi-tree structure by adding the intra prediction signal and the residual signal.

According to another embodiment, a method for reconstructing an array of information samples representing a spatially sampled information signal, which is subdivided into a multi-tree structure of leaf regions of different sizes by multi-tree subdivision, from a data stream, wherein the multi-tree structure is divided into a primary and a sub-ordinate sub-division defined in a sub-ordinate manner to each other, so that a tree-root block of the primary sub-division is sub-divided leaf blocks of the primary sub-division which, in turn, form the tree-root blocks of the sub-ordinate sub-division, further sub-divided into leaf regions of the multi-tree structure, each leaf region of the multi-tree structure has associated therewith a hierarchy level out of a sequence of hierarchy levels of the multi-tree subdivision, each leaf region of the multi-tree structure has associated therewith coding parameters, the coding parameters are, for each leaf region, represented by a respective set of syntax elements, each syntax element is of a respective syntax element type out of a set of syntax element types, may have the steps of: extracting the multitree structure from the data stream, so as to acquire an inheritance information from the data stream, the inheritance information indicating as to whether inheritance is used or not, and if inheritance is indicated to be used, at least one inheritance region of the array of information samples which is composed of a set of the leaf regions of the multi-tree structure, corresponds to an hierarchy level of sequence of hierarchy levels of the multi-tree subdivision, being lower than each of the hierarchy levels with which the set of leaf regions of the multi-tree structure are associated, and is formed by leaf regions of the primary sub-division; extracting an inheritance subset including at least one syntax element of a predetermined syntax element type from the data stream per inheritance region, wherein the at least one syntax element of the predetermined syntax element type is an intra-prediction mode syntax element, decoding, in an residual decoding order, a residual signal for each of the leaf regions of the multi-tree structure which the respective inheritance region is composed of, copying the inheritance subset into a corresponding inheritance subset of syntax elements within the set of syntax elements representing the coding parameters associated with the set of leaf regions of the multi-tree structure which the respective at least one inheritance region is composed of, and calculating, in the residual decoding order, a separate intra prediction signal for each of the leaf regions of the multi-tree structure which the respective inheritance region is composed of, according to an intra-prediction mode indicated by the intra-prediction mode syntax element, by using neighboring samples of a reconstructed signal of already reconstructed leaf regions of the multi-tree structure as a reference signal, with reconstructing the respective leaf region of the multi-tree structure by adding the intra prediction signal and the residual signal.

An idea underlying the present invention is that a better compromise between encoding complexity and achievable rate distortion ratio, and/or to achieve a better rate distortion ratio may be achieved when multitree sub-divisioning is not only used in order to subdivide a continuous area, namely the sample array, into leaf regions, but if the intermediate regions are used to share coding parameters among the corresponding collocated leaf blocks. By this measure, coding procedures performed in tiles—leaf regions—locally, may be associated with coding parameters individually without having to, however, explicitly transmit the whole coding parameters for each leaf region separately. Rather, similarities may effectively exploited by using the multitree subdivision.

In accordance with an embodiment, the array of information samples representing the spatially sampled information signal is spatially into tree root regions first with then sub-dividing, in accordance with multi-tree-sub-division information extracted from a data-stream, at least a subset of the tree root regions into smaller simply connected regions of different sizes by recursively multi-partitioning the subset of the tree root regions. In order to enable finding a good compromise between a too fine sub-division and a too coarse sub-division in rate-distortion sense, at reasonable encoding complexity, the maximum region size of the tree root regions into which the array of information samples is spatially divided, is included within the data stream and extracted from the data stream at the decoding side. According, a decoder may comprise an extractor configured to extract a maximum region size and multi-tree-sub-division information from a data stream, a sub-divider configured to spatially divide an array of information samples representing a spatially sampled information signal into tree root regions of the maximum region size and sub-dividing, in accordance with the multi-tree-sub-division information, at least a subset of the tree root regions into smaller simply connected regions of different sizes by recursively multi-partitioning the subset of tree root regions; and a reconstuctor configured to reconstruct the array of information samples from the data stream using the sub-division into the smaller simply connected regions.

In accordance with an embodiment, the data stream also contains the maximum hierarchy level up to which the subset of tree root regions are subject to the recursive multi-partitioning. By this measure, the signaling of the multi-tree-sub-division information is made easier and needs less bits for coding.

Furthermore, the reconstructor may be configured to perform one or more of the following measures at a granularity which depends on the intermediate sub-division: decision which prediction mode among, at least, intra and inter prediction mode to use; transformation from spectral to spatial domain, performing and/or setting parameters for, an inter-prediction; performing and/or setting the parameters for an intra prediction.

Furthermore, the extractor may be configured to extract syntax elements associated with the leaf regions of the partitioned treeblocks in a depth-first traversal order from the data stream. By this measure, the extractor is able to exploit the statistics of syntax elements of already coded neighboring leaf regions with a higher likelihood than using a breadth-first traversal order.

In accordance with another embodiment, a further subdivider is used in order to sub-divide, in accordance with a further multi-tree sub-division information, at least a subset of the smaller simply connected regions into even smaller simply connected regions. The first-stage sub-division may be used by the reconstructor for performing the prediction of the area of information samples, while the second-stage sub-division may be used by the reconstructor to perform the retransformation from spectral to spatial domain. Defining the residual sub-division to be subordinate relative to the prediction sub-division renders the coding of the overall sub-division less bit consuming and on the other hand, the restriction and freedom for the residual sub-division resulting from the subordination has merely minor negative affects on coding efficiency since mostly, portions of pictures having similar motion compensation parameters are larger than portions having similar spectral properties.

In accordance with even a further embodiment, a further maximum region size is contained in the data stream, the further maximum region size defining the size of tree root sub-regions into which the smaller simply connected regions are firstly divided before sub-dividing at least a subset of the tree root sub-regions in accordance with the further multi-tree sub-division information into even smaller simply connected regions. This, in turn, enables an independent setting of the maximum region sizes of the prediction sub-division on the one hand and the residual sub-division on the other hand and, thus, enables finding a better rate/distortion compromise.

In accordance with an even further embodiment of the present invention, the data stream comprises a first subset of syntax elements disjoint from a second subset of syntax elements forming the multi-tree sub-division information, wherein a merger at the decoding side is able to combine, depending on the first subset of syntax elements, spatially neighboring smaller simply connected regions of the multi-tree sub-division to obtain an intermediate sub-division of the array of samples. The reconstructor may be configured to reconstruct the array of samples using the intermediate sub-division. By this measure, it is easier for the encoder to adapt the effective sub-division to the spatial distribution of properties of the array of information samples with finding an optimum rate/distortion compromise. For example, if the maximum region size is high, the multi-tree sub-division information is likely to get more complex due to the treeroot regions getting larger. On the other hand, however, if the maximum region size is small, it becomes more likely that neighboring treeroot regions pertain to information content with similar properties so that these treeroot regions could also have been processed together. The merging fills this gap between the afore-mentioned extremes, thereby enabling a nearly optimum sub-division of granularity. From the perspective of the encoder, the merging syntax elements allow for a more relaxed or computationally less complex encoding procedure since if the encoder erroneously uses a too fine sub-division, this error my be compensated by the encoder afterwards, by subsequently setting the merging syntax elements with or without adapting only a small part of the syntax elements having been set before setting the merging syntax elements.

In accordance with an even further embodiment, the maximum region size and the multi-tree-sub-division information is used for the residual sub-division rather than the prediction sub-division.

A depth-first traversal order for treating the simply connected regions of a quadtree sub-division of an array of information samples representing a spatially sampled information signal is used in accordance with an embodiment rather than a breadth-first traversal order. By using the depth-first traversal order, each simply connected region has a higher probability to have neighboring simply connected regions which have already been traversed so that information regarding these neighboring simply connected regions may be positively exploited when reconstructing the respective current simply connected region.

When the array of information samples is firstly divided into a regular arrangement of tree root regions of zero-order hierarchy size with then sub-dividing at least a subset of the tree root regions into smaller simply connected regions of different sizes, the reconstructor may use a zigzag scan in order to scan the tree root regions with, for each tree root region to be partitioned, treating the simply connected leaf regions in depth-first traversal order before stepping further to the next tree root region in the zigzag scan order. Moreover, in accordance with the depth-first traversal order, simply connected leaf regions of the same hierarchy level may be traversed in a zigzag scan order also. Thus, the increased likelihood of having neighboring simply connected leaf regions is maintained.

According to an embodiment, although the flags associated with the nodes of the multi-tree structure are sequentially arranged in a depth-first traversal order, the sequential coding of the flags uses probability estimation contexts which are the same for flags associated with nodes of the multi-tree structure lying within the same hierarchy level of the multi-tree structure, but different for nodes of the multi-tree structure lying within different hierarchy levels of the multi-tree structure, thereby allowing for a good compromise between the number of contexts to be provided and the adaptation to the actual symbol statistics of the flags on the other hand.

In accordance with an embodiment, the probability estimation contexts for a predetermined flag used also depends on flags preceding the predetermined flag in accordance with the depth-first traversal order and corresponding to areas of the tree root region having a predetermined relative location relationship to the area to which the predetermined flag corresponds. Similar to the idea underlying the proceeding aspect, the use of the depth-first traversal order guarantees a high probability that flags already having been coded also comprise flags corresponding to areas neighboring the area corresponding to the predetermined flag so that this knowledge may be used to better adapt the context to be used for the predetermined flag.

The flags which may be used for setting the context for a predetermined flag, may be those corresponding to areas lying to the top of and/or to the left of the area to which the predetermined flag corresponds. Moreover, the flags used for selecting the context may be restricted to flags belonging to the same hierarchy level as the node with which the predetermined flag is associated.

According to an embodiment, the coded signaling comprises an indication of a highest hierarchy level and a sequence of flags associated with nodes of the multi-tree structure unequal to the highest hierarchy level, each flag specifying whether the associated node is an intermediate node or child node, and a sequentially decoding, in a depth-first or breadth-first traversal order, of the sequence of flags from the data stream takes place, with skipping nodes of the highest hierarchy level and automatically appointing same leaf nodes, thereby reducing the coding rate.

In accordance with a further embodiment, the coded signaling of the multi-tree structure may comprise the indication of the highest hierarchy level. By this measure, it is possible to restrict the existence of flags to hierarchy levels other than the highest hierarchy level as a further partitioning of blocks of the highest hierarchy level is excluded anyway.

In case of the spatial multi-tree-sub-division being part of a secondary sub-division of leaf nodes and un-partitioned tree root regions of a primary multi-tree-sub-division, the context used for coding the flags of the secondary sub-division may be selected such that the context are the same for the flags associated with areas of the same size.

In accordance with further embodiments, a favorable merging or grouping of simply connected regions into which the array of information samples is sub-divided, is coded with a reduced amount of data. To this end, for the simply connected regions, a predetermined relative locational relationship is defined enabling an identifying, for a predetermined simply connected region, of simply connected regions within the plurality of simply connected regions which have the predetermined relative locational relationship to the predetermined simply connected region. Namely, if the number is zero, a merge indicator for the predetermined simply connected region may be absent within the data stream. Further, if the number of simply connected regions having the predetermined relative location relationship to the predetermined simply connected region is one, the coding parameters of the simply connected region may be adopted or may be used for a prediction for the coding parameters for the predetermined simply connected region without the need for any further syntax element. Otherwise, i.e., if the number of simply connected regions having the predetermined relative location relationship to the predetermined simply connected regions is greater than one, the introduction of a further syntax element may be suppressed even if the coding parameters associated with these identified simply connected regions are identical to each other.

In accordance with an embodiment, if the coding parameters of the neighboring simply connected regions are unequal to each other, a reference neighbor identifier may identify a proper subset of the number of simply connected regions having the predetermined relative location relationship to the predetermined simply connected region and this proper subset is used when adopting the coding parameters or predicting the coding parameters of the predetermined simply connected region.

In accordance with even further embodiments, a spatial sub-division of an area of samples representing a spatial sampling of the two-dimensional information signal into a plurality of simply connected regions of different sizes by recursively multi-partitioning is performed depending on a first subset of syntax elements contained in the data stream, followed by a combination of spatially neighboring simply connected regions depending on a second subset of syntax elements within the data stream being disjoined from the first subset, to obtain an intermediate sub-division of the array of samples into disjoint sets of simply connected regions, the union of which is the plurality of simply connected regions. The intermediate sub-division is used when reconstructing the array of samples from the data stream. This enables rendering the optimization with respect to the sub-division less critical due to the fact that a too fine sub-division may be compensated by the merging afterwards. Further, the combination of the sub-division and the merging enables achieving intermediate sub-divisions which would not be possible by way of recursive multi-partitioning only so that the concatenation of the sub-division and the merging by use of disjoined sets of syntax elements enables a better adaptation of the effective or intermediate sub-division to the actual content of the two-dimensional information signal. Compared to the advantages, the additional overhead resulting from the additional subset of syntax elements for indicating the merging details, is negligible.

BRIEF DESCRIPTION OF THE DRAWINGS

Embodiments of the present invention will be detailed subsequently referring to the appended drawings, in which:

FIGS. 3a-c schematically show an illustrative example for a quadtree sub-division, wherein FIG. 3a shows a first hierarchy level, FIG. 3b shows a second hierarchy level and FIG. 3c shows a third hierarchy level;

FIGS. 6*a*,*b* schematically show binary strings or sequences of flags representing the tree structure of FIG. 4 and the quadtree sub-division of FIGS. 3*a* to 3*c*, respectively in accordance with different embodiments;

DETAILED DESCRIPTION OF THE INVENTION

In the following description of the Figs., elements occurring in several of these Figs. are indicated by common reference numbers and a repeated explanation of these elements is avoided. Rather, explanations with respect to an element presented within one Fig. shall also apply to other Figs. in which the respective element occurs as long as the explanation presented with these other Figs. indicate deviations therefrom.

Further, the following description starts with embodiments of an encoder and decoder which are explained with respect to FIGS. 1 to 11. The embodiments described with respect to these Figs. combine many aspects of the present application which, however, would also be advantageous if implemented individually within a coding scheme and accordingly, with respect to the subsequent Figs., embodiments are briefly discussed which exploit just-mentioned aspects individually with each of these embodiments representing an abstraction of the embodiments described with respect to FIGS. 1 and 11 in a different sense.

Figure 1:
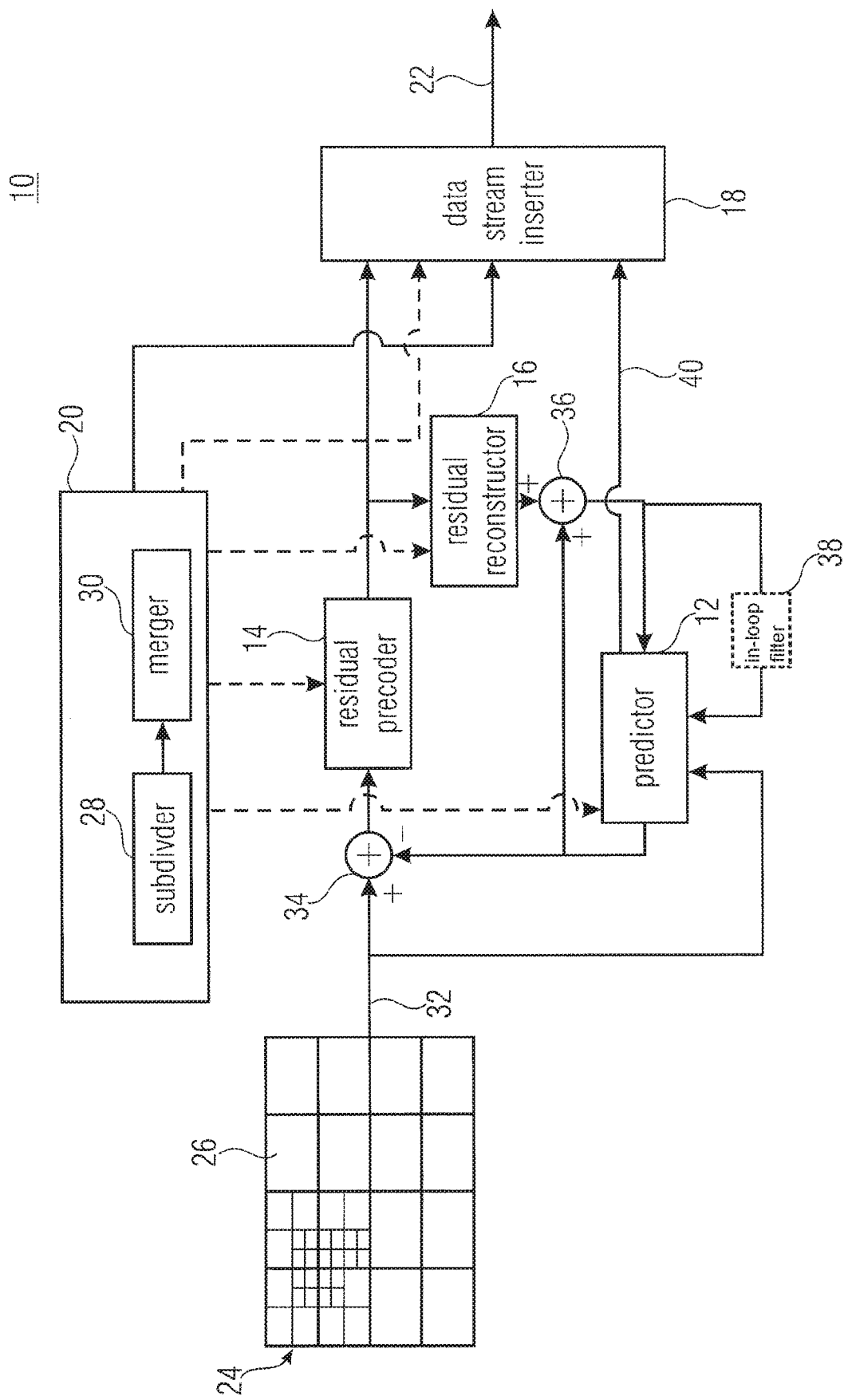
FIG. 1 shows a block diagram of an encoder according to an embodiment of the present application.

FIG. 1 shows an encoder according to an embodiment of the present invention. The encoder 10 of FIG. 1 comprises a predictor 12, a residual precoder 14, a residual reconstructor 16, a data stream inserter 18 and a block divider 20. The encoder 10 is for coding a temporal spatially sampled information signal into a data stream 22. The temporal spatially sampled information signal may be, for example, a video, i.e., a sequence of pictures. Each picture represents an array of image samples. Other examples of temporal spatially information signals comprise, for example, depth images captured by, for example, time-of-light cameras. Further, it should be noted that a spatially sampled information signal may comprise more than one array per frame or time stamp such as in the case of a color video which comprises, for example, an array of luma samples along with two arrays of chroma samples per frame. It may also be possible that the temporal sampling rate for the different components of the information signal, i.e., luma and chroma may be different. The same applies to the spatial resolution. A video may also be accompanied by further spatially sampled information such as depth or transparency information. The following description, however, will focus on the processing of one of these arrays for the sake of a better understanding of the main issues of the present application first with then turning to the handling of more than one plane.

The encoder 10 of FIG. 1 is configured to create the data stream 22 such that the syntax elements of the data stream 22 describe the pictures in a granularity lying between whole pictures and individual image samples. To this end, the divider 20 is configured to sub-divide each picture 24 into simply connected regions of different sizes 26. In the following these regions will simply be called blocks or sub-regions 26.

As will be outlined in more detail below, the divider 20 uses a multi-tree sub-division in order to sub-divide the picture 24 into the blocks 26 of different sizes. To be even more precise, the specific embodiments outlined below with respect to FIGS. 1 to 11 mostly use a quadtree sub-division. As will also be explained in more detail below, the divider 20 may, internally, comprise a concatenation of a sub-divider 28 for sub-dividing the pictures 24 into the just-mentioned blocks 26 followed by a merger 30 which enables combining groups of these blocks 26 in order to obtain an effective sub-division or granularity which lies between the non-sub-division of the pictures 24 and the sub-division defined by sub-divider 28.

As illustrated by dashed lines in FIG. 1, the predictor 12, the residual precoder 14, the residual reconstructor 16 and the data stream inserter 18 operate on picture sub-divisions defined by divider 20. For example, as will be outlined in more detail below, predictor 12 uses a prediction sub-division defined by divider 20 in order to determine for the individual sub-regions of the prediction sub-division as to whether the respective sub-region should be subject to intra picture prediction or inter picture prediction with setting the corresponding prediction parameters for the respective sub-region in accordance with the chosen prediction mode.

The residual pre-coder 14, in turn, may use a residual sub-division of the pictures 24 in order to encode the residual of the prediction of the pictures 24 provided by predictor 12. As the residual reconstructor 16 reconstructs the residual from the syntax elements output by residual pre-coder 14, residual reconstructor 16 also operates on the just-mentioned residual sub-division. The data stream inserter 18 may exploit the divisions just-mentioned, i.e., the prediction and residual sub-divisions, in order to determine insertion orders and neighborships among the syntax elements for the insertion of the syntax elements output by residual pre-coder 14 and predictor 12 into the data stream 22 by means of, for example, entropy encoding.

As shown in FIG. 1, encoder 10 comprises an input 32 where the original information signal enters encoder 10. A subtractor 34, the residual pre-coder 14 and the data stream inserter 18 are connected in series in the order mentioned between input 32 and the output of data stream inserter 18 at which the coded data stream 22 is output. Subtractor 34 and residual precoder 14 are part of a prediction loop which is closed by the residual constructor 16, an adder 36 and predictor 12 which are connected in series in the order mentioned between the output of residual precoder 14 and the inverting input of subtractor 34. The output of predictor 12 is also connected to a further input of adder 36. Additionally, predictor 12 comprises an input directly connected to input 32 and may comprise an even further input also connected to the output of adder 36 via an optional in-loop filter 38. Further, predictor 12 generates side information during operation and, therefore, an output of predictor 12 is also coupled to data stream inserter 18. Similarly, divider 20 comprises an output which is connected to another input of data stream inserter 18.

Having described the structure of encoder 10, the mode of operation is described in more detail in the following.

As described above, divider 20 decides for each picture 24 how to sub-divide same into sub-regions 26. In accordance with a sub-division of the picture 24 to be used for prediction, predictor 12 decides for each sub-region corresponding to this sub-division, how to predict the respective sub-region. Predictor 12 outputs the prediction of the sub-region to the inverting input of substractor 34 and to the further input of adder 36 and outputs prediction information reflecting the way how predictor 12 obtained this prediction from previously encoded portions of the video, to data stream inserter 18.

At the output of subtractor 34, the prediction residual is thus obtained wherein residual pre-coder 14 processes this prediction residual in accordance with a residual sub-division also prescribed by divider 20. As described in further detail below with respect to FIGS. 3 to 10, the residual sub-division of picture 24 used by residual precoder 14 may be related to the prediction sub-division used by predictor 12 such that each prediction sub-region is adopted as residual sub-region or further sub-divided into smaller residual sub-regions. However, totally independent prediction and residual sub-divisions would also be possible.

Residual precoder 14 subjects each residual sub-region to a transformation from spatial to spectral domain by a two-dimensional transform followed by, or inherently involving, a quantization of the resulting transform coefficients of the resulting transform blocks whereby distortion results from the quantization noise. The data stream inserter 18 may, for example, losslessly encode syntax elements describing the afore-mentioned transform coefficients into the data stream 22 by use of, for example, entropy encoding.

The residual reconstructor 16, in turn, reconverts, by use of a re-quantization followed by a re-transformation, the transform coefficients into a residual signal wherein the residual signal is combined within adder 36 with the prediction used by subtractor 34 for obtaining the prediction residual, thereby obtaining a reconstructed portion or subregion of a current picture at the output of adder 36. Predictor 12 may use the reconstructed picture subregion for intra prediction directly, that is for predicting a certain prediction sub-region by extrapolation from previously reconstructed prediction sub-regions in the neighborhood. However, an intra prediction performed within the spectral domain by predicting the spectrum of the current subregion from that of a neighboring one, directly would theoretically also be possible.

For inter prediction, predictor 12 may use previously encoded and reconstructed pictures in a version according to which same have been filtered by an optional in-loop filter 38. In-loop filter 38 may, for example, comprise a deblocking filter or an adaptive filter having a transfer function adapted to advantageously form the quantization noise mentioned before.

Predictor 12 chooses the prediction parameters revealing the way of predicting a certain prediction sub-region by use of a comparison with the original samples within picture 24. The prediction parameters may, as outlined in more detail below, comprise for each prediction sub-region an indication of the prediction mode, such as intra picture prediction and inter picture prediction. In case of intra picture prediction, the prediction parameters may also comprise an indication of an angle along which edges within the prediction sub-region to be intra predicted mainly extend, and in case of inter picture prediction, motion vectors, motion picture indices and, eventually, higher order motion transformation parameters and, in case of both intra and/or inter picture prediction, optional filter information for filtering the reconstructed image samples based on which the current prediction sub-region is predicted.

As will be outlined in more detail below, the aforementioned sub-divisions defined by a divider 20 substantially influence the rate/distortion ratio maximally achievable by residual precoder 14, predictor 12 and data stream inserter 18. In case of a too fine sub-division, the prediction parameters 40 output by predictor 12 to be inserted into data stream 22 involve a too large coding rate although the prediction obtained by predictor 12 might be better and the residual signal to be coded by residual precoder 14 might be smaller so that same might be coded by less bits. In case, of a too coarse sub-division, the opposite applies. Further, the just-mentioned thought also applies for the residual sub-division in a similar manner: a transformation of a picture using a finer granularity of the individual transformation blocks leads to a lower complexity for computing the transformations and an increased spatial resolution of the resulting transformation. That is, smaller residual sub-regions enable the spectral distribution of the content within individual residual sub-regions to be more consistent. However, the spectral resolution is reduced and the ratio between significant and insignificant, i.e. quantized to zero, coefficients gets worse. That is, the granularity of the transform should be adapted to the picture content locally. Additionally, independent from the positive effect of a finder granularity, a finer granularity regularly increases the amount of side information that may be used in order to indicate the subdivision chosen to the decoder. As will be outlined in more detail below, the embodiments described below provide the encoder 10 with the ability to adapt the sub-divisions very effectively to the content of the information signal to be encoded and to signal the sub-divisions to be used to the decoding side by instructing the data stream inserter 18 to insert the sub-division information into the coded data stream 22. Details are presented below.

Figure 2:
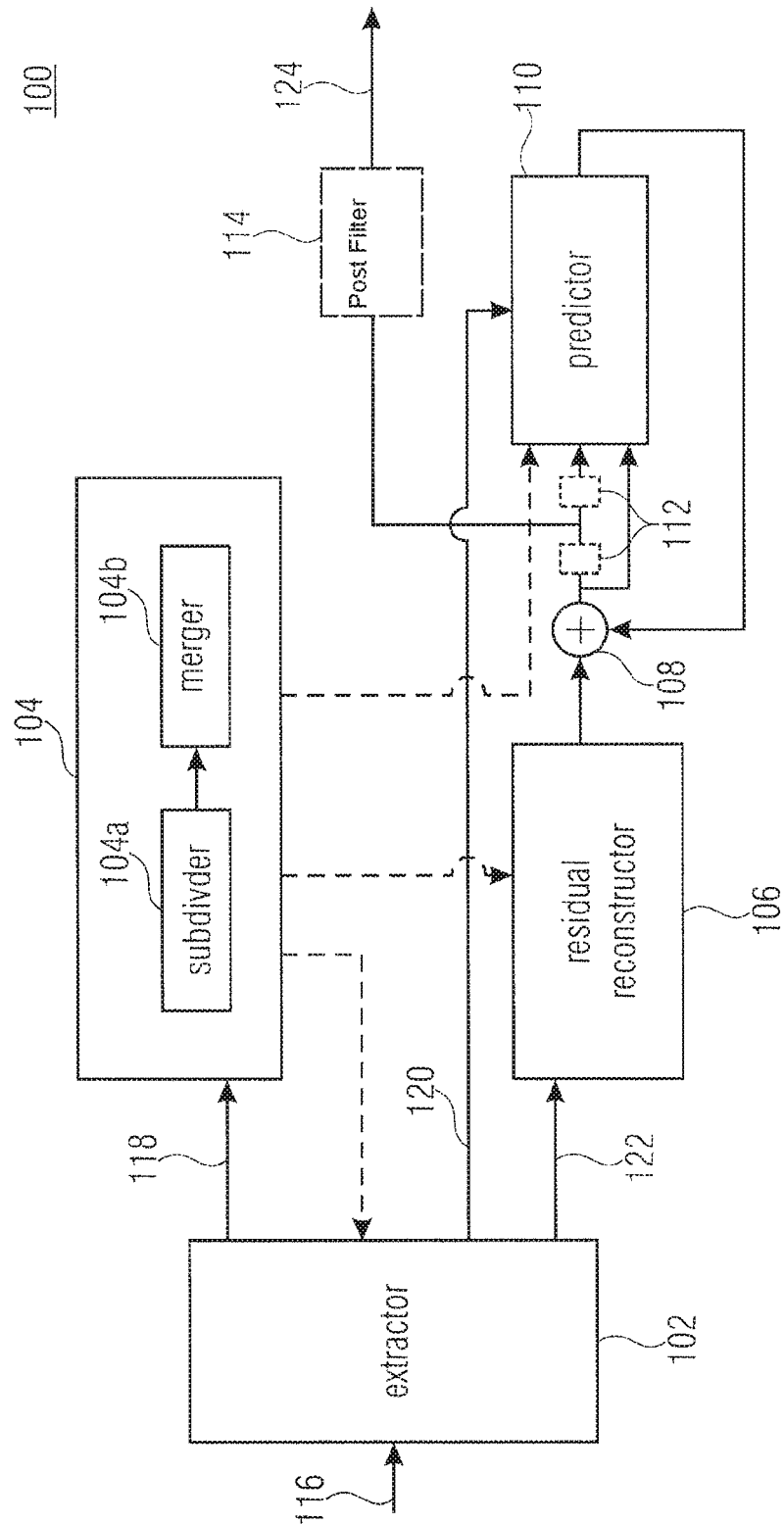
FIG. 2 shows a block diagram of a decoder according to an embodiment of the present application.

However, before defining the sub-division of divider 20 in more detail, a decoder in accordance with an embodiment of the present application is described in more detail with respect to FIG. 2.

The decoder of FIG. 2 is indicated by reference sign 100 and comprises an extractor 102, a divider 104, a residual reconstructor 106, an adder 108, a predictor 110, an optional in-loop filter 112 and an optional post-filter 114. The extractor 102 receives the coded data stream at an input 116 of decoder 100 and extracts from the coded data stream sub-division information 118, prediction parameters 120 and residual data 122 which the extractor 102 outputs to picture divider 104, predictor 110 and residual reconstructor 106, respectively. Residual reconstructor 106 has an output connected to a first input of adder 108. The other input of adder 108 and the output thereof are connected into a prediction loop into which the optional in-loop filer 112 and predictor 110 are connected in series in the order mentioned with a by-pass path leading from the output of adder 108 to predictor 110 directly similar to the above-mentioned connections between adder 36 and predictor 12 in FIG. 1, namely one for intra picture prediction and the other one for inter picture prediction. Either the output of adder 108 or the output of in-loop filter 112 may be connected to an output 124 of decoder 100 where the reconstructed information signal is output to a reproduction device, for example. An optional post-filter 114 may be connected into the path leading to output 124 in order to improve the visual quality of visual impression of the reconstructed signal at output 124.

Generally speaking, the residual reconstructor 106, the adder 108 and predictor 110 act like elements 16, 36 and 12 in FIG. 1. In other words, same emulate the operation of the afore-mentioned elements of FIG. 1. To this end, residual reconstructor 106 and predictor 110 are controlled by the prediction parameters 120 and the sub-division prescribed by picture divider 104 in accordance with a sub-division information 118 from extractor 102, respectively, in order to predict the prediction sub-regions the same way as predictor 12 did or decided to do, and to retransform the transform coefficients received at the same granularity as residual precoder 14 did. The picture divider 104, in turn, rebuilds the sub-divisions chosen by divider 20 of FIG. 1 in a synchronized way by relying on the sub-division information 118. The extractor may use, in turn, the subdivision information in order to control the data extraction such as in terms of context selection, neighborhood determination, probability estimation, parsing the syntax of the data stream etc.

Several deviations may be performed on the above embodiments. Some are mentioned within the following detailed description with respect to the sub-division performed by sub-divider 28 and the merging performed by merger 30 and others are described with respect to the subsequent FIGS. 12 to 16. In the absence of any obstacles, all these deviations may be individually or in subsets applied to the afore-mentioned description of FIG. 1 and FIG. 2, respectively. For example, dividers 20 and 104 may not determine a prediction sub-division and residual sub-division per picture only. Rather, they may also determine a filter sub-division for the optional in-loop filter 38 and 112, respectively, Either independent from or dependent from the other sub-divisions for prediction or residual coding, respectively. Moreover, a determination of the sub-division or sub-divisions by these elements may not be performed on a frame by frame basis. Rather, a sub-division or sub-divisions determined for a certain frame may be reused or adopted for a certain number of following frames with merely then transferring a new sub-division.

In providing further details regarding the division of the pictures into sub-regions, the following description firstly focuses on the sub-division part which sub-divider 28 and 104a assume responsibility for. Then the merging process which merger 30 and merger 104b assume responsibility for, is described. Lastly, inter plane adaptation/prediction is described.

The way, sub-divider 28 and 104a divide the pictures is such that a picture is dividable into a number of blocks of possibly different sizes for the purpose of predictive and residual coding of the image or video data. As mentioned before, a picture 24 may be available as one or more arrays of image sample values. In case of YUV/YCbCr color space, for example, the first array may represent the luma channel while the other two arrays represent chroma channels. These arrays may have differing dimensions. All arrays may be grouped into one or more plane groups with each plane group consisting of one or more consecutive planes such that each plane is contained in one and only one plane group. For each plane group the following applies. The first array of a particular plane group may be called the primary array of this plane group. The possibly following arrays are subordinate arrays. The block division of the primary array may be done based on a quadtree approach as described below. The block division of the subordinate arrays may be derived based on the division of primary array.

In accordance with the embodiments described below, sub-dividers 28 and 104a are configured to divide the primary array into a number of square blocks of equal size, so-called treeblocks in the following. The edge length of the treeblocks is typically a power of two such as 16, 32 or 64 when quadtrees are used. For sake of completeness, however, it is noted that the use of other tree types would be possible as well such as binary trees or trees with any number of leaves. Moreover, the number of children of the tree may be varied depending on the level of the tree and depending on what signal the tree is representing.

Beside this, as mentioned above, the array of samples may also represent other information than video sequences such as depth maps or lightfields, respectively. For simplicity, the following description focuses on quadtrees as a representative example for multi-trees. Quadtrees are trees that have exactly four children at each internal node. Each of the treeblocks constitutes a primary quadtree together with subordinate quadtrees at each of the leaves of the primary quadtree. The primary quadtree determines the sub-division of a given treeblock for prediction while a subordinate quadtree determines the sub-division of a given prediction block for the purpose of residual coding.

Figure 3A:
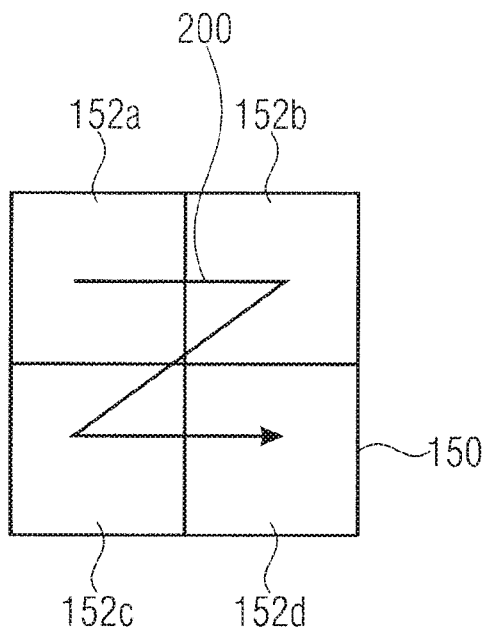

The root node of the primary quadtree corresponds to the full treeblock. For example, FIG. 3a shows a treeblock 150. It should be recalled that each picture is divided into a regular grid of lines and columns of such treeblocks 150 so that same, for example, gaplessly cover the array of samples. However, it should be noted that for all block subdivisions shown hereinafter, the seamless subdivision without overlap is not critical. Rather, neighboring block may overlap each other as long as no leaf block is a proper subportion of a neighboring leaf block.

Figure 3B:
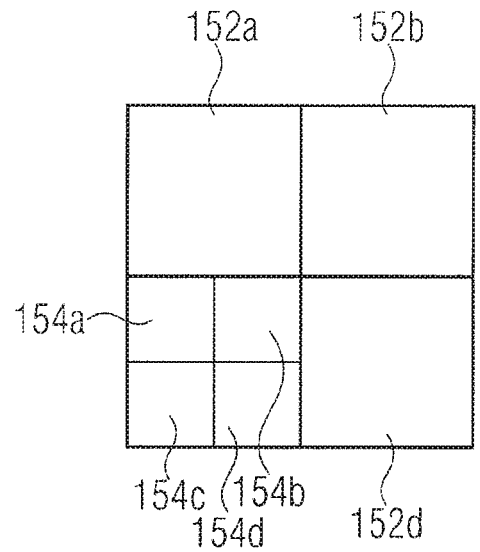

Along the quadtree structure for treeblock 150, each node can be further divided into four child nodes, which in the case of the primary quadtree means that each treeblock 150 can be split into four sub-blocks with half the width and half the height of the treeblock 150. In FIG. 3a, these sub-blocks are indicated with reference signs 152a to 152d. In the same manner, each of these sub-blocks can further be divided into four smaller sub-blocks with half the width and half the height of the original sub-blocks. In FIG. 3d this is shown exemplary for sub-block 152c which is sub-divided into four small sub-blocks 154a to 154d. Insofar, FIGS. 3a to 3c show exemplary how a treeblock 150 is first divided into its four sub-blocks 152a to 152d, then the lower left sub-block 152c is further divided into four small sub-blocks 154a to 154d and finally, as shown in FIG. 3c, the upper right block 154b of these smaller sub-blocks is once more divided into four blocks of one eighth the width and height of the original treeblock 150, with these even smaller blocks being denoted with 156a to 156d.

Figure 3C:
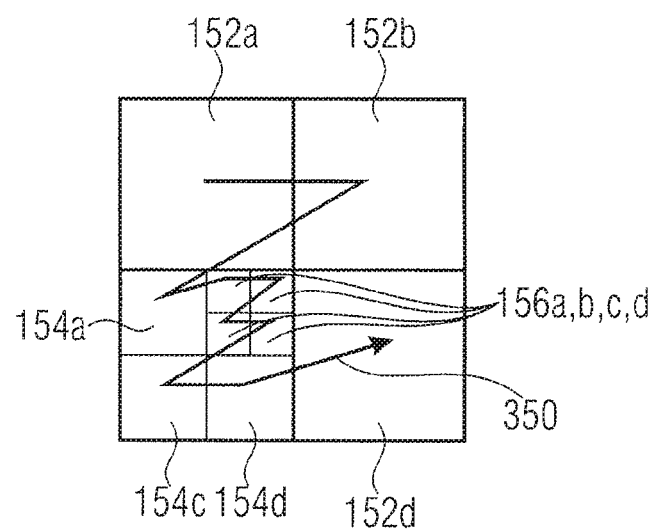
Figure 4:
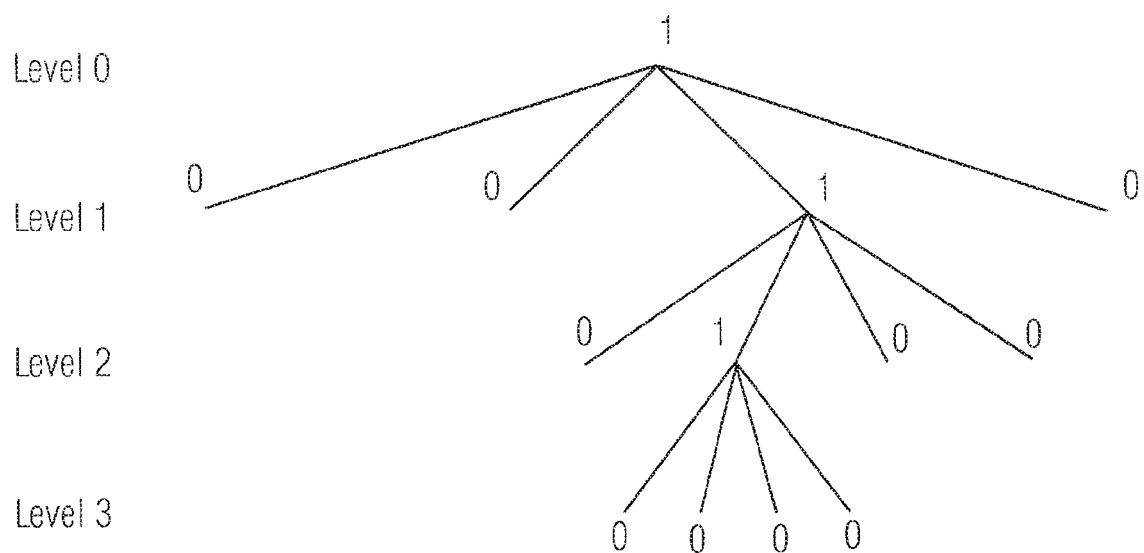
FIG. 4 schematically shows a tree structure for the illustrative quadtree sub-division of FIGS. 3a to 3c according to an embodiment.

FIG. 4 shows the underlying tree structure for the exemplary quadtree-based division as shown in FIGS. 3a-3d. The numbers beside the tree nodes are the values of a so-called sub-division flag, which will be explained in much detail later when discussing the signaling of the quadtree structure. The root node of the quadtree is depicted on top of the figure (labeled "Level 0"). The four branches at level 1 of this root node correspond to the four sub-blocks as shown in FIG. 3a. As the third of these sub-blocks is further sub-divided into its four sub-blocks in FIG. 3b, the third node at level 1 in FIG. 4 also has four branches. Again, corresponding to the sub-division of the second (top right) child node in FIG. 3c, there are four sub-branches connected with the second node at level 2 of the quadtree hierarchy. The nodes at level 3 are not sub-divided any further.

Each leaf of the primary quadtree corresponds to a variable-sized block for which individual prediction parameters can be specified (i.e., intra or inter, prediction mode, motion parameters, etc.). In the following, these blocks are called prediction blocks. In particular, these leaf blocks are the blocks shown in FIG. 3c. With briefly referring back to the description of FIGS. 1 and 2, divider 20 or sub-divider 28 determines the quadtree sub-division as just-explained. The sub-divider 152a-d performs the decision which of the treeblocks 150, sub-blocks 152a-d, small sub-blocks 154a-d and so on, to sub-divide or partition further, with the aim to find an optimum tradeoff between a too fine prediction sub-division and a too coarse prediction sub-division as already indicate above. The predictor 12, in turn, uses the prescribed prediction sub-division in order to determine the prediction parameters mentioned above at a granularity depending on the prediction sub-division or for each of the prediction sub-regions represented by the blocks shown in FIG. 3c, for example.

The prediction blocks shown in FIG. 3c can be further divided into smaller blocks for the purpose of residual coding. For each prediction block, i.e., for each leaf node of the primary quadtree, the corresponding sub-division is determined by one or more subordinate quadtree(s) for residual coding. For example, when allowing a maximum residual block size of 16×16, a given 32×32 prediction block could be divided into four 16×16 blocks, each of which being determined by a subordinate quadtree for residual coding. Each 16×16 block in this example corresponds to the root node of a subordinate quadtree.

Just as described for the case of the sub-division of a given treeblock into prediction blocks, each prediction block can be divided into a number of residual blocks by usage of subordinate quadtree decomposition(s). Each leaf of a subordinate quadtree corresponds to a residual block for which individual residual coding parameters can be specified (i.e., transform mode, transform coefficients, etc.) by residual precoder 14 which residual coding parameters control, in turn, residual reconstructors 16 and 106, respectively.

In other words, sub-divider 28 may be configured to determine for each picture or for each group of pictures a prediction sub-division and a subordinate residual sub-division by firstly dividing the picture into a regular arrangement of treeblocks 150, recursively partitioning a subset of these treeblocks by quadtree sub-division in order to obtain the prediction sub-division into prediction blocks—which may be treeblocks if no partitioning took place at the respective treeblock, or the leaf blocks of the quadtree sub-division—with then further sub-dividing a subset of these prediction blocks in a similar way, by, if a prediction block is greater than the maximum size of the subordinate residual sub-division, firstly dividing the respective prediction block into a regular arrangement of sub-treeblocks with then sub-dividing a subset of these sub-treeblocks in accordance with the quadtree sub-division procedure in order to obtain the residual blocks—which may be prediction blocks if no division into sub-treeblocks took place at the respective prediction block, sub-treeblocks if no division into even smaller regions took place at the respective sub-treeblock, or the leaf blocks of the residual quadtree sub-division.

As briefly outlined above, the sub-divisions chosen for a primary array may be mapped onto subordinate arrays. This is easy when considering subordinate arrays of the same dimension as the primary array. However, special measures have to be taken when the dimensions of the subordinate arrays differ from the dimension of the primary array. Generally speaking, the mapping of the primary array sub-division onto the subordinate arrays in case of different dimensions could be done by spatially mapping, i.e., by spatially mapping the block boarders of the primary array sub-division onto the subordinate arrays. In particular, for each subordinate array, there may be a scaling factor in horizontal and vertical direction that determines the ratio of the dimension of the primary array to the subordinate array. The division of the subordinate array into sub-blocks for prediction and residual coding may be determined by the primary quadtree and the subordinate quadtree(s) of each of the collocated treeblocks of the primary array, respectively, with the resulting treeblocks of the subordinate array being scaled by the relative scaling factor. In case the scaling factors in horizontal and vertical directions differ (e.g., as in 4:2:2 chroma sub-sampling), the resulting prediction and residual blocks of the subordinate array would not be squares anymore. In this case, it is possible to either predetermine or select adaptively (either for the whole sequence, one picture out of the sequence or for each single prediction or residual block) whether the non-square residual block shall be split into square blocks. In the first case, for example, encoder and decoder could agree onto a sub-division into square blocks each time a mapped block is not squared. In the second case, the sub-divider 28 could signal the selection via data stream inserter 18 and data stream 22 to sub-divider 104a. For example, in case of 4:2:2 chroma sub-sampling, where the subordinate arrays have half the width but the same height as the primary array, the residual blocks would be twice as high as wide. By vertically splitting this block, one would obtain two square blocks again.

As mentioned above, the sub-divider 28 or divider 20, respectively, signals the quadtree-based division via data stream 22 to sub-divider 104a. To this end, sub-divider 28 informs data stream inserter 18 about the sub-divisions chosen for pictures 24. The data stream inserter, in turn, transmits the structure of the primary and secondary quadtree, and, therefore, the division of the picture array into variable-size blocks for prediction or residual coding within the data stream or bit stream 22, respectively, to the decoding side.

The minimum and maximum admissible block sizes are transmitted as side information and may change from picture to picture. Or the minimum and maximum admissible block sizes can be fixed in encoder and decoder. These minimum and maximum block size can be different for prediction and residual blocks. For the signaling of the quadtree structure, the quadtree has to be traversed and for each node it has to be specified whether this particular node is a leaf node of the quadtree (i.e., the corresponding block is not sub-divided any further) or if it branches into its four child nodes (i.e., the corresponding block is divided into four sub-blocks with half the size).

Figure 5A:
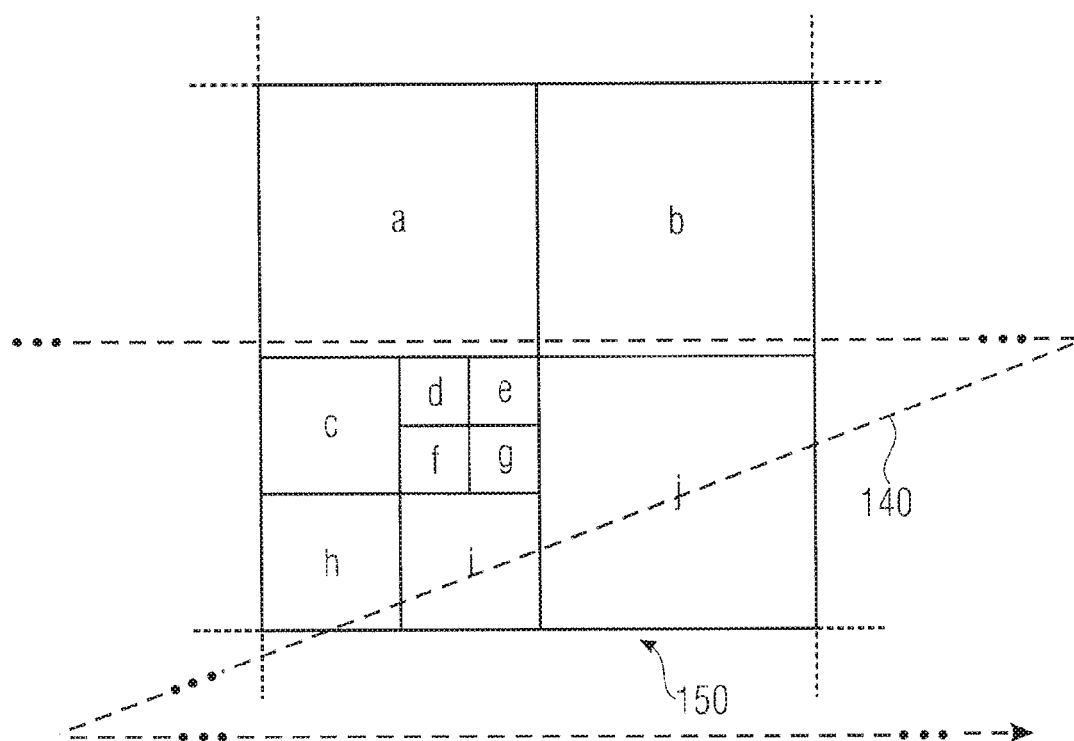
FIGS. 5*a*,*b* schematically illustrate the quadtree sub-division of FIGS. 3*a* to 3*c* and the tree structure with indices indexing the individual leaf blocks.

The signaling within one picture is done treeblock by treeblock in a raster scan order such as from left to right and top to down as illustrated in FIG. 5a at 140. This scan order could also be different, like from bottom right to top left or in a checkerboard sense. In an advantageous embodiment, each treeblock and therefore each quadtree is traversed in depth-first order for signaling the sub-division information.

In an advantageous embodiment, not only the sub-division information, i.e., the structure of the tree, but also the prediction data etc., i.e. the payload associated with the leaf nodes of the tree, are transmitted/processed in depth-first order. This is done because depth-first traversal has big advantages over breadth-first order. In FIG. 5b, a quadtree structure is presented with the leaf nodes labeled as a, b, . . . , j. FIG. 5a shows the resulting block division. If the blocks/leaf nodes are traversed in breadth-first order, we obtain the following order: abjchidefg. In depth-first order, however, the order is abc . . . ij. As can be seen from FIG. 5a, in depth-first order, the left neighbour block and the top neighbour block are transmitted/processed before the current block. Thus, motion vector prediction and context modeling can use the parameters specified for the left and top neighbouring block in order to achieve an improved coding performance. For breadth-first order, this would not be the case, since block j is transmitted before blocks e, g, and i, for example.

Consequently, the signaling for each treeblock is done recursively along the quadtree structure of the primary quadtree such that for each node, a flag is transmitted, specifying whether the corresponding block is split into four sub-blocks. If this flag has the value "1" (for "true"), then this signaling process is repeated recursively for all four child nodes, i.e., sub-blocks in raster scan order (top left, top right, bottom left, bottom right) until the leaf node of the primary quadtree is reached. Note that a leaf node is characterized by having a sub-division flag with a value of "0". For the case that a node resides on the lowest hierarchy level of the primary quadtree and thus corresponds to the smallest admissible prediction block size, no sub-division flag has to be transmitted. For the example in FIG. 3a-c, one would first transmit "1", as shown at 190 in FIG. 6a, specifying that the treeblock 150 is split into its four sub-blocks 152a-d. Then, one would recursively encode the sub-division information of all the four sub-blocks 152a-d in raster scan order 200. For the first two sub-blocks 152a, b one would transmit "0", specifying that they are not sub-divided (see 202 in FIG. 6a). For the third sub-block 152c (bottom left), one would transmit "1", specifying that this block is sub-divided (see 204 in FIG. 6a). Now, according to the recursive approach, the four sub-blocks 154a-d of this block would be processed. Here, one would transmit "0" for the first (206) and "1" for the second (top right) sub-block (208). Now, the four blocks of the smallest block size 156a-d in FIG. 3c would be processed. In case, we already reached the smallest allowed block size in this example, no more data would have to be transmitted, since a further sub-division is not possible. Otherwise "0000", specifying that none of these blocks is further divided, would be transmitted as indicated in FIG. 6a at 210. After this, one would transmit "00" for the lower two blocks in FIG. 3b (see 212 in FIG. 6a), and finally "0" for the bottom right block in FIG. 3a (see 214). So the complete binary string representing the quadtree structure would be the one shown in FIG. 6a.

The different background shadings in this binary string representation of FIG. 6a correspond to different levels in the hierarchy of the quadtree-based sub-division. Shading 216 represents level 0 (corresponding to a block size equal to the original treeblock size), shading 218 represents level 1 (corresponding to a block size equal to half the original treeblock size), shading 220 represents level 2 (corresponding to a block size equal to one quarter of the original treeblock size), and shading 222 represents level 3 (corresponding to a block size equal to one eighth of the original treeblock size). All the sub-division flags of the same hierarchy level (corresponding to the same block size and the same color in the example binary string representation) may be entropy coded using one and the same probability model by inserter 18, for example.

Note, that for the case of a breadth-first traversal, the sub-division information would be transmitted in a different order, shown in FIG. 6b.

Similar to the sub-division of each treeblock for the purpose of prediction, the division of each resulting prediction block into residual blocks has to be transmitted in the bitstream. Also, there may be a maximum and minimum block size for residual coding which is transmitted as side information and which may change from picture to picture. Or the maximum and minimum block size for residual coding can be fixed in encoder and decoder. At each leaf node of the primary quadtree, as those shown in FIG. 3c, the corresponding prediction block may be divided into residual blocks of the maximum admissible size. These blocks are the constituent root nodes of the subordinate quadtree structure for residual coding. For example, if the maximum residual block size for the picture is 64×64 and the prediction block is of size 32×32, then the whole prediction block would correspond to one subordinate (residual) quadtree root node of size 32×32. On the other hand, if the maximum residual block size for the picture is 16×16, then the 32×32 prediction block would consist of four residual quadtree root nodes, each of size 16×16. Within each prediction block, the signaling of the subordinate quadtree structure is done root node by root node in raster scan order (left to right, top to down). Like in the case of the primary (prediction) quadtree structure, for each node a flag is coded, specifying whether this particular node is split into its four child nodes. Then, if this flag has a value of "1", this procedure is repeated recursively for all the four corresponding child nodes and its corresponding sub-blocks in raster scan order (top left, top right, bottom left, bottom right) until a leaf node of the subordinate quadtree is reached. As in the case of the primary quadtree, no signaling is required for nodes on the lowest hierarchy level of the subordinate quadtree, since those nodes correspond to blocks of the smallest possible residual block size, which cannot be divided any further.

For entropy coding, residual block sub-division flags belonging to residual blocks of the same block size may be encoded using one and the same probability model.

Thus, in accordance with the example presented above with respect to FIGS. 3a to 6a, sub-divider 28 defined a primary sub-division for prediction purposes and a subordinate sub-division of the blocks of different sizes of the primary sub-division for residual coding purposes. The data stream inserter 18 coded the primary sub-division by signaling for each treeblock in a zigzag scan order, a bit sequence built in accordance with FIG. 6a along with coding the maximum primary block size and the maximum hierarchy level of the primary sub-division. For each thus defined prediction block, associated prediction parameters have been included into the data stream. Additionally, a coding of similar information, i.e., maximum size, maximum hierarchy level and bit sequence in accordance with FIG. 6a, took place for each prediction block the size of which was equal to or smaller than the maximum size for the residual sub-division and for each residual tree root block into which prediction blocks have been pre-divided the size of which exceeded the maximum size defined for residual blocks. For each thus defined residual block, residual data is inserted into the data stream.

The extractor 102 extracts the respective bit sequences from the data stream at input 116 and informs divider 104 about the sub-division information thus obtained. Besides this, data stream inserter 18 and extractor 102 may use the afore-mentioned order among the prediction blocks and residual blocks to transmit further syntax elements such as residual data output by residual precoder 14 and prediction parameters output by predictor 12. Using this order has advantages in that adequate contexts for encoding the individual syntax elements for a certain block may be chosen by exploiting already coded/decoded syntax elements of neighboring blocks. Moreover, similarly, residual pre-coder 14 and predictor 12 as well as residual reconstructor 106 and pre-coder 110 may process the individual prediction and residual blocks in the order outlined above.

Figure 7:
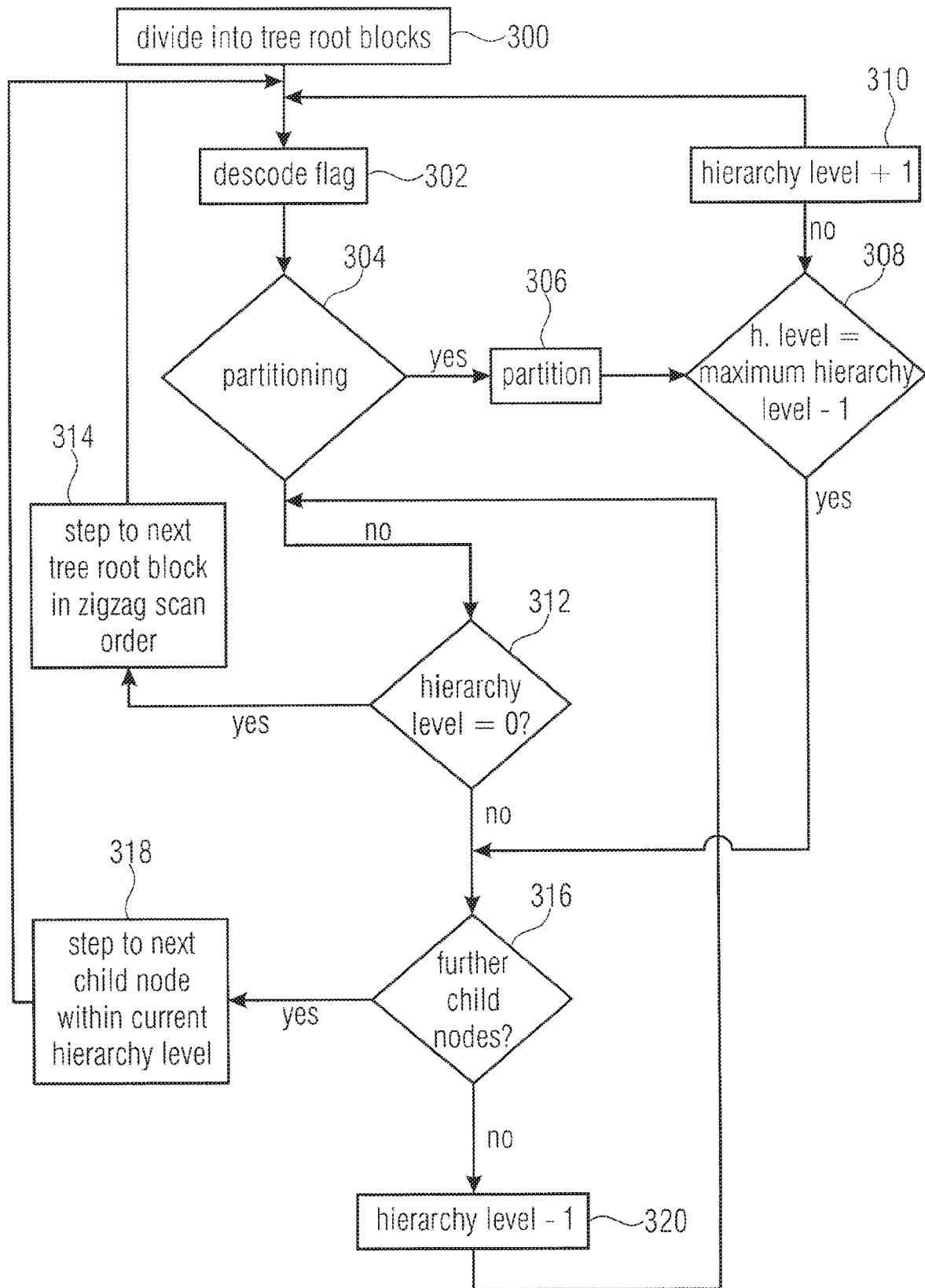
FIG. 7 shows a flow chart showing the steps performed by a data stream extractor in accordance with an embodiment.

FIG. 7 shows a flow diagram of steps, which may be performed by extractor 102 in order to extract the sub-division information from the data stream 22 when encoded in the way as outlined above. In a first step, extractor 102 divides the picture 24 into tree root blocks 150. This step is indicated as step 300 in FIG. 7. Step 300 may involve extractor 102 extracting the maximum prediction block size from the data stream 22. Additionally or alternatively, step 300 may involve extractor 102 extracting the maximum hierarchy level from the data stream 22.

Next, in a step 302, extractor 102 decodes a flag or bit from the data stream. The first time step 302 is performed, the extractor 102 knows that the respective flag is the first flag of the bit sequence belonging to the first tree root block 150 in tree root block scan order 140. As this flag is a flag of hierarchy level 0, extractor 102 may use a context modeling associated with that hierarchy level 0 in step 302 in order to determine a context. Each context may have a respective probability estimation for entropy decoding the flag associated therewith. The probability estimation of the contexts may context-individually be adapted to the respective context symbol statistic. For example, in order to determine an appropriate context for decoding the flag of hierarchy level 0 in step 302, extractor 102 may select one context of a set of contexts, which is associated with that hierarchy level 0 depending on the hierarchy level 0 flag of neighboring treeblocks, or even further, depending on information contained within the bit strings defining the quadtree sub-division of neighboring treeblocks of the currently-processed treeblock, such as the top and left neighbor treeblock.

In the next step, namely step 304, extractor 102 checks as to whether the recently-decoded flag suggests a partitioning. If this is the case, extractor 102 partitions the current block—presently a treeblock—or indicates this partitioning to sub-divider 104a in step 306 and checks, in step 308, as to whether the current hierarchy level was equal to the maximum hierarchy level minus one. For example, extractor 102 could, for example, also have the maximum hierarchy level extracted from the data stream in step 300. If the current hierarchy level is unequal to the maximum hierarchy level minus one, extractor 102 increases the current hierarchy level by 1 in step 310 and steps back to step 302 to decode the next flag from the data stream. This time, the flags to be decoded in step 302 belongs to another hierarchy level and, therefore, in accordance with an embodiment, extractor 102 may select one of a different set of contexts, the set belonging to the current hierarchy level. The selection may be based also on sub-division bit sequences according to FIG. 6a of neighboring treeblocks already having been decoded.

If a flag is decoded, and the check in step 304 reveals that this flag does not suggest a partitioning of the current block, the extractor 102 proceeds with step 312 to check as to whether the current hierarchy level is 0. If this is the case, extractor 102 proceeds processing with respect to the next tree root block in the scan order 140 in step 314 or stops processing extracting the sub-division information if there is no tree root block to be processed left.

It should be noted that the description of FIG. 7 focuses on the decoding of the sub-division indication flags of the prediction sub-division only, so that, in fact, step 314 could involve the decoding of further bins or syntax elements pertaining, for example to the current treeblock. In any case, if a further or next tree root block exists, extractor 102 proceeds from step 314 to step 302 to decode the next flag from the sub-division information, namely, the first flag of the flag sequence regarding the new tree root block.

If, in step 312 the hierarchy level turns out to be unequal to 0, the operation proceeds in step 316 with a check as to whether further child nodes pertaining the current node exist. That is, when extractor 102 performs the check in step 316, it has already been checked in step 312 that the current hierarchy level is a hierarchy level other than 0 hierarchy level. This, in turn, means that a parent node exists, which belongs to a tree root block 150 or one of the smaller blocks 152a-d, or even smaller blocks 152a-d, and so on. The node of the tree structure, which the recently-decoded flag belongs to, has a parent node, which is common to three further nodes of the current tree structure. The scan order among such child nodes having a common parent node has been illustrated exemplarily in FIG. 3a for hierarchy level 0 with reference sign 200. Thus, in step 316, extractor 102 checks as to whether all of these four child nodes have already been visited within the process of FIG. 7. If this is not the case, i.e. if there are further child nodes with the current parent node, the process of FIG. 7 proceeds with step 318, where the next child node in accordance with a zigzag scan order 200 within the current hierarchy level is visited, so that its corresponding sub-block now represents the current block of process 7 and, thereafter, a flag is decoded in step 302 from the data stream regarding the current block or current node. If, however, there are no further child nodes for the current parent node in step 316, the process of FIG. 7 proceeds to step 320 where the current hierarchy level is decreased by 1 wherein after the process proceeds with step 312.

Figure 8:
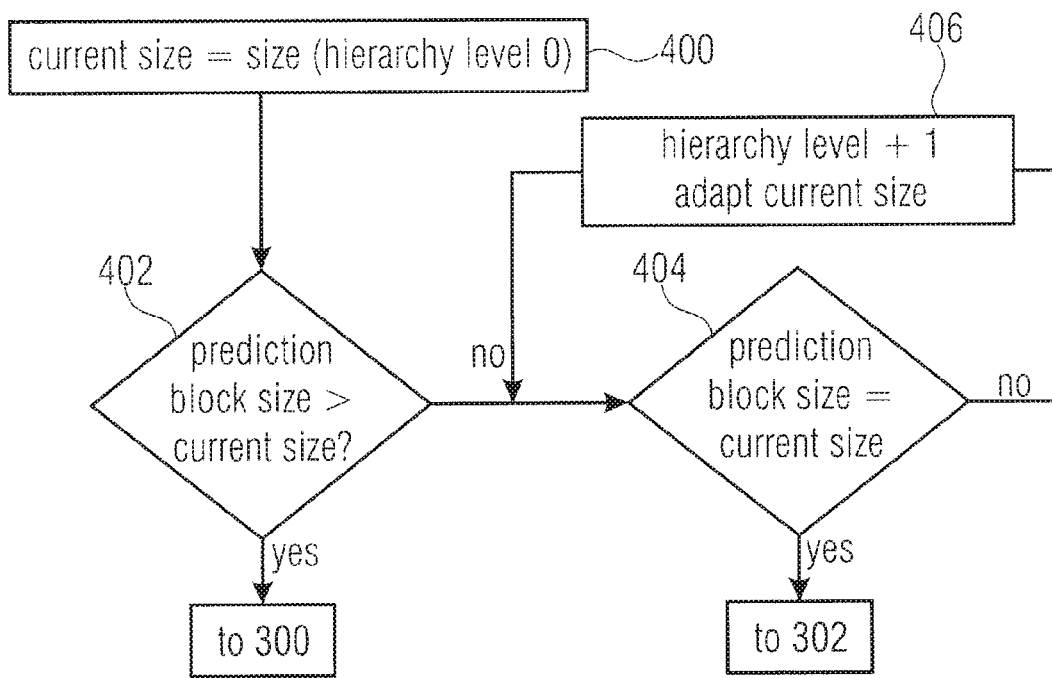
FIG. 8 shows a flow chart illustrating the functionality of a data stream extractor in accordance with a further embodiment.

By performing the steps shown in FIG. 7, extractor 102 and sub-divider 104a cooperate to retrieve the sub-division chosen at the encoder side from the data stream. The process of FIG. 7 is concentrated on the above-described case of the prediction sub-division. FIG. 8 shows, in combination with the flow diagram of FIG. 7, how extractor 102 and sub-divider 104a cooperate to retrieve the residual sub-division from the data stream.

In particular, FIG. 8 shows the steps performed by extractor 102 and sub-divider 104a, respectively, for each of the prediction blocks resulting from the prediction sub-division. These prediction blocks are traversed, as mentioned above, in accordance with a zigzag scan order 140 among the treeblocks 150 of the prediction sub-division and using a depth-first traversal order within each treeblock 150 currently visited for traversing the leaf blocks as shown, for example, in FIG. 3c. According to the depth-first traversal order, the leaf blocks of partitioned primary treeblocks are visited in the depth-first traversal order with visiting sub-blocks of a certain hierarchy level having a common current node in the zigzag scan order 200 and with primarily scanning the sub-division of each of these sub-blocks first before proceeding to the next sub-block in this zigzag scan order 200.

For the example in FIG. 3c, the resulting scan order among the leaf nodes of treeblock 150 is shown with reference sign 350.

For a currently-visited prediction block, the process of FIG. 8 starts at step 400. In step 400, an internal parameter denoting the current size of the current block is set equal to the size of hierarchy level 0 of the residual sub-division, i.e. the maximum block size of the residual sub-division. It should be recalled that the maximum residual block size may be lower than the smallest block size of the prediction sub-division or may be equal to or greater than the latter. In other words, according to an embodiment, the encoder is free to chose any of the just-mentioned possibilities.

In the next step, namely step 402, a check is performed as to whether the prediction block size of the currently-visited block is greater than the internal parameter denoting the current size. If this is the case, the currently-visited prediction block, which may be a leaf block of the prediction sub-division or a treeblock of the prediction sub-division, which has not be partitioned any further, is greater than the maximum residual block size and in this case, the process of FIG. 8 proceeds with step 300 of FIG. 7. That is, the currently-visited prediction block is divided into residual treeroot blocks and the first flag of the flag sequence of the first residual treeblock within this currently-visited prediction block is decoded in step 302, and so on.

If, however, the currently-visited prediction block has a size equal to or smaller than the internal parameter indicting the current size, the process of FIG. 8 proceeds to step 404 where the prediction block size is checked to determine as to whether same is equal to the internal parameter indicating the current size. If this is the case, the division step 300 may be skipped and the process proceeds directly with step 302 of FIG. 7.

If, however, the prediction block size of the currently-visited prediction block is smaller than the internal parameter indicating the current size, the process of FIG. 8 proceeds with step 406 where the hierarchy level is increased by 1 and the current size is set to the size of the new hierarchy level such as divided by 2 (in both axis directions in case of quadtree subdivision). Thereafter, the check of step 404 is performed again. The effect of the loop formed by steps 404 and 406 is that the hierarchy level corresponds to the size of the corresponding blocks to be partitioned, independent from the respective prediction block having been smaller than or equal to/greater than the maximum residual block size. Thus, when decoding the flags in step 302, the context modeling performed depends on the hierarchy level and the size of the block to which the flag refers to, concurrently. The use of different contexts for flags of different hierarchy levels or block sizes, respectively, is advantageous in that the probability estimation may well fit the actual probability distribution among the flag value occurrences with, on the other hand, having a relative moderate number of contexts to be managed, thereby reducing the context managing overhead as well as increasing the context adaptation to the actual symbol statistics.

As already noted above, there may be more than one array of samples and these arrays of samples may be grouped into one or more plane groups. The input signal to be encoded, entering input 32, for example, may be one picture of a video sequence or a still image. The picture may, thus, be given in the form of one or more sample arrays. In the context of the coding of a picture of a video sequence or a still image, the sample arrays might refer to the three color planes, such as red, green and blue or to luma and chroma planes, such in color representations of YUV or YCbCr. Additionally, sample arrays representing alpha, i.e. transparency, and/or depth information for 3-D video material might be present as well. A number of these sample arrays may be grouped together as a so-called plane group. For example, luma (Y) might be one plane group with only one sample array and chroma, such as CbCr, might be another plane group with two sample arrays or, in another example, YUV might be one plane group with three matrices and a depth information for 3-D video material might be a different plane group with only one sample array. For every plane group, one primary quadtree structure may be coded within the data stream 22 for representing the division into prediction blocks and for each prediction block, a secondary quadtree structure representing the division into residual blocks. Thus, in accordance with a first example just mentioned where the luma component is one plane group, whereas the chroma component forms the other plane group, there would be one quadtree structure for the prediction blocks of the luma plane, one quadtree structure for the residual blocks of the luma plane, one quadtree structure for the prediction block of the chroma plane and one quadtree structure for the residual blocks of the chroma plane. In the second example mentioned before, however, there would be one quadtree structure for the prediction blocks of luma and chroma together (YUV), one quadtree structure for the residual blocks of luma and chroma together (YUV), one quadtree structure for the prediction blocks of the depth information for 3-D video material and one quadtree structure for the residual blocks of the depth information for 3-D video material.

Further, in the foregoing description, the input signal was divided into prediction blocks using a primary quadtree structure and it was described how these prediction blocks were further sub-divided into residual blocks using a subordinate quadtree structure. In accordance with an alternative embodiment, the sub-division might not end at the subordinate quadtree stage. That is, the blocks obtained from a division using the subordinate quadtree structure might be further sub-divided using a tertiary quadtree structure. This division, in turn, might be used for the purpose of using further coding tools that might facilitate encoding the residual signal.

The foregoing description concentrated on the sub-division performed by sub-divider 28 and sub-divider 104a, respectively. As mentioned above, the sub-division defined by sub-divider 28 and 104a, respectively, may control the processing granularity of the afore-mentioned modules of encoder 10 and decoder 100. However, in accordance with the embodiments described in the following, the sub-dividers 228 and 104a, respectively, are followed by a merger 30 and merger 104b, respectively. It should be noted, however, that the mergers 30 and 104b are optional and may be left away.

In effect, however, and as will be outlined in more detail below, the merger provides the encoder with the opportunity of combining some of the prediction blocks or residual blocks to groups or clusters, so that the other, or at least some of the other modules may treat these groups of blocks together. For example, the predictor 12 may sacrifice the small deviations between the prediction parameters of some prediction blocks as determined by optimization using the subdivision of subdivider 28 and use prediction parameters common to all these prediction blocks instead if the signalling of the grouping of the prediction blocks along with a common parameter transmission for all the blocks belonging to this group is more promising in rate/distortion ratio sense than individually signaling the prediction parameters for all these prediction blocks. The processing for retrieving the prediction in predictors 12 and 110, itself, based on these common prediction parameters, may, however, still take place prediction-block wise. However, it is also possible that predictors 12 and 110 even perform the prediction process once for the whole group of prediction blocks.

As will be outlined in more detail below, it is also possible that the grouping of prediction blocks is not only for using the same or common prediction parameters for a group of prediction blocks, but, alternatively, or additionally, enables the encoder 10 to send one prediction parameter for this group along with prediction residuals for prediction blocks belonging to this group, so that the signaling overhead for signalling the prediction parameters for this group may be reduced. In the latter case, the merging process may merely influence the data stream inserter 18 rather than the decisions made by residual pre-coder 14 and predictor 12. However, more details are presented below. For completeness, however, it should be noted that the just-mentioned aspect also applies to the other sub-divisions, such as the residual sub-division or the filter sub-division mentioned above.

Firstly, the merging of sets of samples, such as the aforementioned prediction and residual blocks, is motivated in a more general sense, i.e. not restricted to the above-mentioned multi-tree sub-division. Subsequently, however, the description focuses on the merging of blocks resulting from multi-tree sub-division for which embodiments have just been described above.

Generally speaking, merging the syntax elements associated with particular sets of samples for the purpose of transmitting associated coding parameters enables reducing the side information rate in image and video coding applications. For example, the sample arrays of the signal to be encoded are usually partitioned into particular sets of samples or sample sets, which may represent rectangular or quadratic blocks, or any other collection of samples, including arbitrarily-shaped regions, triangles or other shapes. In the afore-described embodiments, the simply-connected regions were the prediction blocks and the residual blocks resulting from the multi-tree sub-division. The sub-division of sample arrays may be fixed by the syntax or, as described above, the sub-division may be, at least partially, signaled inside the bit stream. To keep the side information rate for signalling the sub-division information small, the syntax usually allows only a limited number of choices resulting in simple partitioning, such as the sub-division of blocks to smaller blocks. The sample sets are associated with particular coding parameters, which may specify prediction information or residual coding modes, etc. Details regarding this issue have been described above. For each sample set, individual coding parameters, such as for specifying the prediction and/or residual coding may be transmitted. In order to achieve an improved coding efficiency, the aspect of merging described hereinafter, namely the merging of two or more sample sets into so-called groups of sample sets, enables some advantages, which are described further below. For example, sample sets may be merged such that all sample sets of such a group share the same coding parameters, which can be transmitted together with one of the sample sets in the group. By doing so, the coding parameters do not have to be transmitted for each sample set of the group of sample sets individually, but, instead, the coding parameters are transmitted only once for the whole group of sample sets. As a result, the side information rate for transmitting the coding parameters may be reduced and the overall coding efficiency may be improved. As an alternative approach, an additional refinement for one or more of the coding parameters can be transmitted for one or more of the sample sets of a group of sample sets. The refinement can either be applied to all sample sets of a group or only to the sample set for which it is transmitted.

The merging aspect further described below also provides the encoder with a greater freedom in creating the bit stream 22, since the merging approach significantly increases the number of possibilities for selecting a partitioning for the sample arrays of a picture. Since the encoder can choose between more options, such as, for minimizing a particular rate/distortion measure, the coding efficiency can be improved. There are several possibilities of operating an encoder. In a simple approach, the encoder could firstly determine the best sub-division of the sample arrays. Briefly referring to FIG. 1, sub-divider 28 could determine the optimal sub-division in a first stage. Afterwards, it could be checked, for each sample set, whether a merging with another sample set or another group of sample sets, reduces a particular rate/distortion cost measure. At this, the prediction parameters associated with a merged group of sample sets can be re-estimated, such as by performing a new motion search or the prediction parameters that have already been determined for the common sample set and the candidate sample set or group of sample sets for merging could be evaluated for the considered group of sample sets. In a more extensive approach, a particular rate/distortion cost measure could be evaluated for additional candidate groups of sample sets.

It should be noted that the merging approach described hereinafter does not change the processing order of the sample sets. That is, the merging concept can be implemented in a way so that the delay is not increased, i.e. each sample set remains decodable at the same time instant as without using the merging approach.

If, for example, the bit rate that is saved by reducing the number of coded prediction parameters is larger than the bit rate that is to be additionally spent for coding merging information for indicating the merging to the decoding side, the merging approach further to be described below results in an increased coding efficiency. It should further be mentioned that the described syntax extension for the merging provides the encoder with the additional freedom in selecting the partitioning of a picture or plane group into blocks. In other words, the encoder is not restricted to do the sub-division first and then to check whether some of the resulting blocks have the same set or a similar set of prediction parameters. As one simple alternative, the encoder could first determine the sub-division in accordance with a rate-distortion cost measure and then the encoder could check, for each block, whether a merging with one of its neighbor blocks or the associated already-determined group of blocks reduces a rate-distortion cost measure. At this, the prediction parameters associated with the new group of blocks can be re-estimated, such as by performing a new motion search or the prediction parameters that have already been determined for the current block and the neighboring block or groups of blocks could be evaluated for the new group of blocks. The merging information can be signaled on a block basis. Effectively, the merging could also be interpreted as inference of the prediction parameters for a current block, wherein the inferred prediction parameters are set equal to the prediction parameters of one of the neighboring blocks. Alternatively, residuals may be transmitted for blocks within a group of blocks.

Thus, the basic idea underlying the merging concept further described below is to reduce the bit rate that may be used for transmitting the prediction parameters or other coding parameters by merging neighboring blocks into a group of blocks, where each group of blocks is associated with a unique set of coding parameters, such as prediction parameters or residual coding parameters. The merging information is signaled inside the bit stream in addition to the sub-division information, if present. The advantage of the merging concept is an increased coding efficiency resulting from a decreased side information rate for the coding parameters. It should be noted that the merging processes described here could also extend to other dimensions than the spatial dimensions. For example, a group of sets of samples or blocks, respectively, lying within several different video pictures, could be merged into one group of blocks. Merging could also be applied to 4-D compression and light-field coding.

Thus, briefly returning to the previous description of FIGS. 1 to 8, it is noted that the merging process subsequent to the sub-division is advantageous independent from the specific way sub-dividers 28 and 104a, respectively, sub-divide the pictures. To be more precise, the latter could also sub-divide the pictures in a way similar to, for example, H.264, i.e. by sub-dividing each picture into a regular arrangement of rectangular or quadratic macro blocks of a predetermined size, such as 16×16 luma samples or a size signaled within the data stream, each macro block having certain coding parameters associated therewith comprising, inter alia, partitioning parameters defining, for each macro-block, a partitioning into a regular sub-grid of 1, 2, 4 or some other number of partitions serving as a granularity for prediction and the corresponding prediction parameters in the data stream as well as for defining the partitioning for the residual and the corresponding residual transformation granularity.

In any case, merging provides the above-mentioned briefly discussed advantages, such as reducing the side information rate bit in image and video coding applications. Particular sets of samples, which may represent the rectangular or quadratic blocks or arbitrarily-shaped regions or any other collection of samples, such as any simply-connected region or samples are usually connected with a particular set of coding parameters and for each of the sample sets, the coding parameters are included in the bit stream, the coding parameters representing, for example, prediction parameters, which specify how the corresponding set of samples is predicted using already-coded samples. The partitioning of the sample arrays of a picture into sample sets may be fixed by the syntax or may be signaled by the corresponding sub-division information inside the bit stream. The coding parameters for the sample set may be transmitted in a predefined order, which is given by the syntax. According to the merging functionality, merger 30 is able to signal, for a common set of samples or a current block, such as a prediction block or a residual block that it is merged with one or more other sample sets, into a group of sample sets. The coding parameters for a group of sample sets, therefore, needs to be transmitted only once. In a particular embodiment, the coding parameters of a current sample set are not transmitted if the current sample set is merged with a sample set or an already-existing group of sample sets for which the coding parameters have already been transmitted. Instead, the coding parameters for the current set of samples are set equal to the coding parameters of the sample set or group of sample sets with which the current set of samples is merged. As an alternative approach, an additional refinement for one or more of the coding parameters can be transmitted for a current sample set. The refinement can either be applied to all sample sets of a group or only to the sample set for which it is transmitted.

In accordance with an embodiment, for each set of samples such as a prediction block as mentioned above, a residual block as mentioned above, or a leaf block of a multitree subdivision as mentioned above, the set of all previously coded/decoded sample sets is called the "set of causal sample sets". See, for example, FIG. 3c. All the blocks shown in this Fig. are the result of a certain sub-division, such as a prediction sub-division or a residual sub-division or of any multitree subdivision, or the like, and the coding/decoding order defined among these blocks is defined by arrow 350. Considering a certain block among these blocks as being the current sample set or current simply-connected region, its set of causal sample sets is made of all the blocks preceding the current block along order 350. However, it is, again, recalled that another sub-division not using multi-tree sub-division would be possible as well as far as the following discussion of the merging principles are concerned.

The sets of samples that can be used for the merging with a current set of samples is called the "set of candidate sample sets" in the following and is a subset of the "set of causal sample sets". The way how the subset is formed can either be known to the decoder or it can be specified inside the data stream or bit stream from the encoder to the decoder. If a particular current set of samples is coded/decoded and its set of candidate sample sets is not empty, it is signaled within the data stream at the encoder or derived from the data stream at the decoder whether the common set of samples is merged with one sample set out of this set of candidate sample sets and, if so, with which of them. Otherwise, the merging cannot be used for this block, since the set of candidate sample sets is empty anyway.

There are different ways how to determine the subset of the set of causal sample sets, which shall represent the set of candidate sample sets. For example, the determination of candidate sample sets may be based on a sample inside the current set of samples, which is uniquely geometrically-defined, such as the upper-left image sample of a rectangular or quadratic block. Starting from this uniquely geometrically-defined sample, a particular non-zero number of samples is determined, which represent direct spatial neighbors of this uniquely geometrically-defined sample. For example, this particular, non-zero number of samples comprises the top neighbor and the left neighbor of the uniquely geometrically-defined sample of the current set of samples, so that the non-zero number of neighboring samples may be, at the maximum, two, one if one of the top or left neighbors is not available or lies outside the picture, or zero in case of both neighbors missing.

The set of candidate sample sets could then be determined to encompass those sample sets that contain at least one of the non-zero number of the just-mentioned neighboring samples. See, for example, FIG. 9a. The current sample set currently considered as being merging object, shall be block X and its geometrically uniquely-defined sample, shall exemplarily be the top-left sample indicated at 400. The top and left neighbor samples of sample 400 are indicated at 402 and 404. The set of causal sample sets or set of causal blocks is highlighted in a shaded manner. Among these blocks, blocks A and B comprise one of the neighboring samples 402 and 404 and, therefore, these blocks form the set of candidate blocks or the set of candidate sample sets.

In accordance with another embodiment, the set of candidate sample sets determined for the sake of merging may additionally or exclusively include sets of samples that contain a particular non-zero number of samples, which may be one or two that have the same spatial location, but are contained in a different picture, namely, for example, a previously coded/decoded picture. For example, in addition to blocks A and B in FIG. 9a, a block of a previously coded picture could be used, which comprises the sample at the same position as sample 400. By the way, it is noted that merely the top neighboring sample 404 or merely the left neighboring sample 402 could be used to define the aforementioned non-zero number of neighboring samples. Generally, the set of candidate sample sets may be derived from previously-processed data within the current picture or in other pictures. The derivation may include spatial directional information, such as transform coefficients associated with a particular direction and image gradients of the current picture or it may include temporal directional information, such as neighboring motion representations. From such data available at the receiver/decoder and other data and side information within the data stream, if present, the set of candidate sample sets may be derived.

It should be noted that the derivation of the candidate sample sets is performed in parallel by both merger 30 at the encoder side and merger 104b at the decoder side. As just mentioned, both may determine the set of candidate sample sets independent from each other based on a predefined way known to both or the encoder may signal hints within the bit stream, which bring merger 104b into a position to perform the derivation of these candidate sample sets in a way equal to the way merger 30 at the encoder side determined the set of candidate sample sets.

As will be described in more detail below, merger 30 and data stream inserter 18 cooperate in order to transmit one or more syntax elements for each set of samples, which specify whether the set of samples is merged with another sample set, which, in turn, may be part of an already-merged group of sample sets and which of the set of candidate sample sets is employed for merging. The extractor 102, in turn, extracts these syntax elements and informs merger 104b accordingly. In particular, in accordance with the specific embodiment described later on, one or two syntax elements are transmitted for specifying the merging information for a specific set of samples. The first syntax element specifies whether the current set of samples is merged with another sample set. The second syntax element, which is only transmitted if the first syntax element specifies that the current set of samples is merged with another set of samples, specifies which of the sets of candidate sample sets is employed for merging. The transmission of the first syntax element may be suppressed if a derived set of candidate sample sets is empty. In other words, the first syntax element may only be transmitted if a derived set of candidate sample sets is not empty. The second syntax element may only be transmitted if a derived set of candidate sample sets contains more than one sample set, since if only one sample set is contained in the set of candidate sample sets, a further selection is not possible anyway. Even further, the transmission of the second syntax element may be suppressed if the set of candidate sample sets comprises more than one sample set, but if all of the sample sets of the set of candidate sample sets are associated with the same coding parameter. In other words, the second syntax element may only be transmitted if at least two sample sets of a derived set of candidate sample sets are associated with different coding parameters.

Within the bit stream, the merging information for a set of samples may be coded before the prediction parameters or other particular coding parameters that are associated with that sample set. The prediction or coding parameters may only be transmitted if the merging information signals that the current set of samples is not to be merged with any other set of samples.

The merging information for a certain set of samples, i.e. a block, for example, may be coded after a proper subset of the prediction parameters or, in a more general sense, coding parameters that are associated with the respective sample set, has been transmitted. The subset of prediction/coding parameters may consist of one or more reference picture indices or one or more components of a motion parameter vector or a reference index and one or more components of a motion parameter vector, etc. The already-transmitted subset of prediction or coding parameters can be used for deriving a set of candidate sample sets out of a greater provisional set of candidate sample sets, which may have been derived as just described above. As an example, a difference measure or distance according to a predetermined distance measure, between the already-coded prediction and coding parameters of the current set of samples and the corresponding prediction or coding parameters of the preliminary set of candidate sample sets can be calculated. Then, only those sample sets for which the calculated difference measure, or distance, is smaller than or equal to a predefined or derived threshold, are included in the final, i.e. reduced set of candidate sample sets. See, for example, FIG. 9a. The current set of samples shall be block X. A subset of the coding parameters pertaining this block shall have already been inserted into the data stream 22. Imagine, for example, block X was a prediction block, in which case the proper subset of the coding parameters could be a subset of the prediction parameters for this block X, such as a subset out of a set comprising a picture reference index and motion-mapping information, such as a motion vector. If block X was a residual block, the subset of coding parameters is a subset of residual information, such as transform coefficients or a map indicating the positions of the significant transform coefficients within block X. Based on this information, both data stream inserter 18 and extractor 102 are able to use this information in order to determine a subset out of blocks A and B, which form, in this specific embodiment, the previously-mentioned preliminary set of candidate sample sets. In particular, since blocks A and B belong to the set of causal sample sets, the coding parameters thereof are available to both encoder and decoder at the time the coding parameters of block X are currently coded/decoded. Therefore, the afore-mentioned comparison using the difference measure may be used to exclude any number of blocks of the preliminary set of candidate sample sets A and B. The resulting-reduced set of candidate sample sets may then be used as described above, namely in order to determine as to whether a merge indicator indicating a merging is to be transmitted within or is to be extracted from the data stream depending on the number of sample sets within the reduced set of candidate sample sets and as to whether a second syntax element has to be transmitted within, or has to be extracted from the data stream with a second syntax element indicating which of the sample sets within the reduced set of candidate sample sets shall be the partner block for merging.

The afore-mentioned threshold against which the afore-mentioned distances are compared may be fixed and known to both encoder and decoder or may be derived based on the calculated distances such as the median of the difference values, or some other central tendency or the like. In this case, the reduced set of candidate sample sets would unavoidably be a proper subset of the preliminary set of candidate sample sets. Alternatively, only those sets of samples are selected out of the preliminary set of candidate sample sets for which the distance according to the distance measure is minimized. Alternatively, exactly one set of samples is selected out of the preliminary set of candidate sample sets using the afore-mentioned distance measure. In the latter case, the merging information would only need to specify whether the current set of samples is to be merged with a single candidate set of samples or not.

Figure 9B:
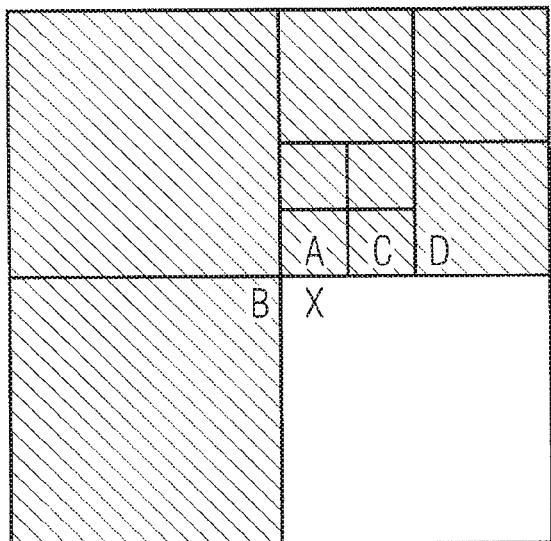
FIG. 9*a*, *b* show schematic diagrams of illustrative quadtree sub-divisions with neighboring candidate blocks for a predetermined block being highlighted in accordance with an embodiment.
Figure 9A:
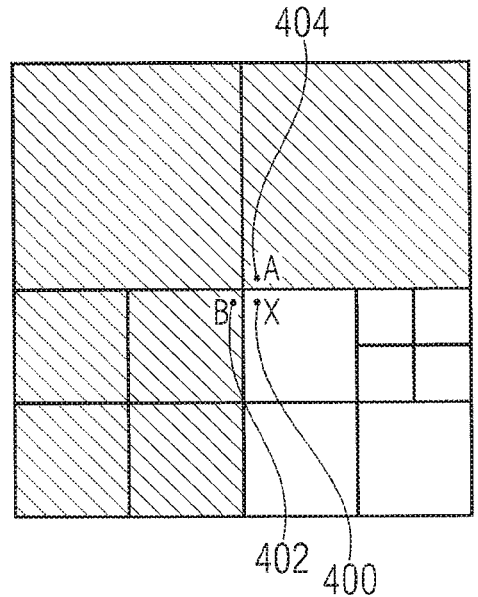

Thus, the set of candidate blocks could be formed or derived as described in the following with respect to FIG. 9a. Starting from the top-left sample position 400 of the current block X in FIG. 9a, its left neighboring sample 402 position and its top neighboring sample 404 position is derived—at its encoder and decoder sides. The set of candidate blocks can, thus, have only up to two elements, namely those blocks out of the shaded set of causal blocks in FIG. 9a that contain one of the two sample positions, which in the case of FIG. 9a, are blocks B and A. Thus, the set of candidate blocks can only have the two directly neighboring blocks of the top-left sample position of the current block as its elements. According to another embodiment, the set of candidate blocks could be given by all blocks that have been coded before the current block and contain one or more samples that represent direct spatial neighbors of any sample of the current block. The direct spatial neighborhood may be restricted to direct left neighbors and/or direct top neighbors and/or direct right neighbors and/or direct bottom neighbors of any sample of the current block. See, for example, FIG. 9b showing another block sub-division. In this case, the candidate blocks comprise four blocks, namely blocks A, B, C and D.

Alternatively, the set of candidate blocks, additionally, or exclusively, may include blocks that contain one or more samples that are located at the same position as any of the samples of the current block, but are contained in a different, i.e. already coded/decoded picture.

Even alternatively, the candidate set of blocks represents a subset of the above-described sets of blocks, which were determined by the neighborhood in spatial or time direction. The subset of candidate blocks may be fixed, signaled or derived. The derivation of the subset of candidate blocks may consider decisions made for other blocks in the picture or in other pictures. As an example, blocks that are associated with the same or very similar coding parameters than other candidate blocks might not be included in the candidate set of blocks.

The following description of an embodiment applies for the case where only two blocks that contain the left and top neighbor sample of the top-left sample of the current block are considered as potential candidate at the maximum.

If the set of candidate blocks is not empty, one flag called merge_flag is signaled, specifying whether the current block is merged with any of the candidate blocks. If the merge_flag is equal to 0 (for "false"), this block is not merged with one of its candidate blocks and all coding parameters are transmitted ordinarily. If the merge_flag is equal to 1 (for "true"), the following applies. If the set of candidate blocks contains one and only one block, this candidate block is used for merging. Otherwise, the set of candidate blocks contains exactly two blocks. If the prediction parameters of these two blocks are identical, these prediction parameters are used for the current block. Otherwise (the two blocks have different prediction parameters), a flag called merge_left_flag is signaled. If merge_left_flag is equal to 1 (for "true"), the block containing the left neighboring sample position of the top-left sample position of the current block is selected out of the set of candidate blocks. If merge_left_flag is equal to 0 (for "false"), the other (i.e., top neighboring) block out of the set of candidate blocks is selected. The prediction parameters of the selected block are used for the current block.

Figure 10:
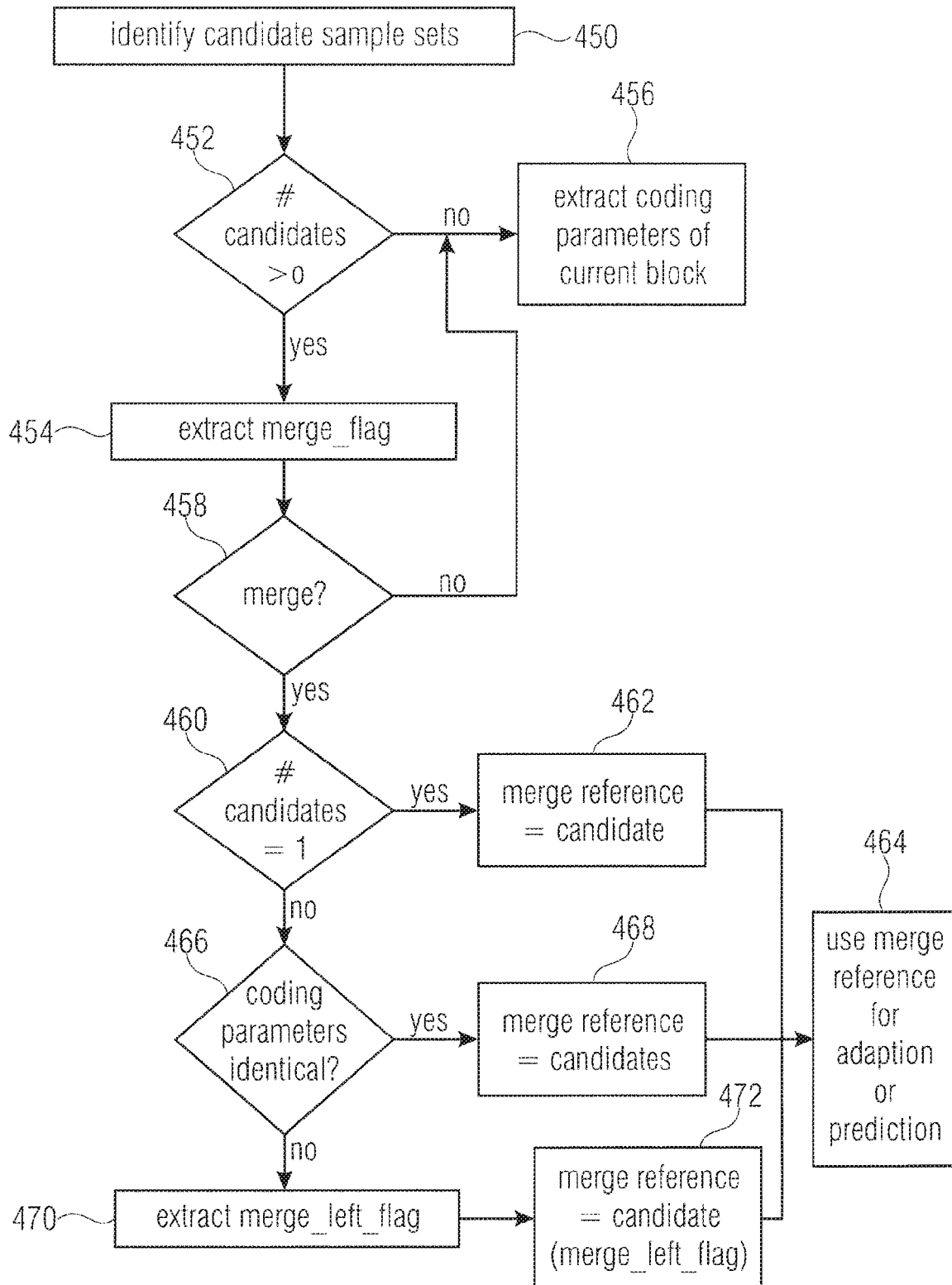
FIG. 10 shows a flow chart of a functionality of a data stream extractor in accordance with a further embodiment.

In summarizing some of the above-described embodiments with respect to merging, reference is made to FIG. 10 showing steps performed by extractor 102 to extract the merging information from the data stream 22 entering input 116.

The process starts at 450 with identifying the candidate blocks or sample sets for a current sample set or block. It should be recalled that the coding parameters for the blocks are transmitted within the data stream 22 in a certain one-dimensional order and accordingly, FIG. 10 refers to the process of retrieving the merge information for a currently visited sample set or block.

As mentioned before, the identification and step 450 may comprise the identification among previously decoded blocks, i.e. the causal set of blocks, based on neighborhood aspects. For example, those neighboring blocks may be appointed candidate, which include certain neighboring samples neighboring one or more geometrically predetermined samples of the current block X in space or time. Further, the step of identifying may comprise two stages, namely a first stage involving an identification as just-mentioned, namely based on the neighborhood, leading to a preliminary set of candidate blocks, and a second stage according to which merely those blocks are appointed candidates the already transmitted coding parameters of which fulfill a certain relationship to the a proper subset of the coding parameters of the current block X, which has already been decoded from the data stream before step 450.

Next, the process steps to step 452 where it is determined as to whether the number of candidate blocks is greater than zero. If this is the case, a merge_flag is extracted from the data stream in step 454. The step of extracting 454 may involve entropy decoding. The context for entropy decoding the merge_flag in step 454 may be determined based on syntax elements belonging to, for example, the set of candidate blocks or the preliminary set of candidate blocks, wherein the dependency on the syntax elements may be restricted to the information whether the blocks belonging to the set of interest has been subject to merging or not. The probability estimation of the selected context may be adapted.

If, however, the number of candidate blocks is determined to be zero instead 452, the process FIG. 10 proceeds with step 456 where the coding parameters of the current block are extracted from the bitstream or, in case of the above-mentioned two-stage identification alternative, the remaining coding parameters thereof wherein after the extractor 102 proceeds with processing the next block in the block scan order such as order 350 shown in FIG. 3c.

Returning to step 454, the process proceeds after extraction in step 454, with step 458 with a check as to whether the extracted merge_flag suggests the occurrence or absence of a merging of the current block. If no merging shall take place, the process proceeds with afore-mentioned step 456. Otherwise, the process proceeds with step 460, including a check as to whether the number of candidate blocks is equal to one. If this is the case, the transmission of an indication of a certain candidate block among the candidate blocks was not necessary and therefore, the process of FIG. 10 proceeds with step 462 according to which the merging partner of the current block is set to be the only candidate block wherein after in step 464 the coding parameters of the merged partner block is used for adaption or prediction of the coding parameters or the remaining coding parameters of the current block. In case of adaption, the missing coding parameters of the current block are merely copied from the merge partner block. In the other case, namely the case of prediction, step 464 may involve a further extraction of residual data from the data stream the residual data pertaining the prediction residual of the missing coding parameters of the current block and a combination of this residual data with the prediction of these missing coding parameters obtained from the merge partner block.

If, however, the number of candidate blocks is determined to be greater than one in step 460, the process of FIG. 10 steps forward to step 466 where a check is performed as to whether the coding parameters or the interesting part of the coding parameters—namely the subpart thereof relating to the part not yet having been transferred within the data stream for the current block—are identical to each other. If this is the case, these common coding parameters are set as merge reference or the candidate blocks are set as merge partners in step 468 and the respective interesting coding parameters are used for adaption or prediction in step 464.

It should be noted that the merge partner itself may have been a block for which merging was signaled. In this case, the adopted or predictively obtained coding parameters of that merging partner are used in step 464.

Otherwise, however, i.e. in case the coding parameters are not identical, the process of FIG. 10 proceeds to step 470, where a further syntax element is extracted from the data stream, namely this merge_left_flag. A separate set of contexts may be used for entropy-decoding this flag. The set of contexts used for entropy-decoding the merge_left_flag may also comprise merely one context. After step 470, the candidate block indicated by merge_left_flag is set to be the merge partner in step 472 and used for adaption or prediction in step 464. After step 464, extractor 102 proceeds with handling the next block in block order.

Of course, there exist many alternatives. For example, a combined syntax element may be transmitted within the data stream instead of the separate syntax elements merge_flag and merge_left_flag described before, the combined syntax elements signaling the merging process. Further, the aforementioned merge_left_flag may be transmitted within the data stream irrespective of whether the two candidate blocks have the same prediction parameters or not, thereby reducing the computational overhead for performing process of FIG. 10.

As was already denoted with respect to, for example, FIG. 9b, more than two blocks may be included in the set of candidate blocks. Further, the merging information, i.e. the information signaling whether a block is merged and, if yes, with which candidate block it is to be merged, may be signaled by one or more syntax elements. One syntax element could specify whether the block is merged with any of the candidate blocks such as the merge_flag described above. The flag may only be transmitted if the set of candidate blocks is not empty. A second syntax element may signal which of the candidate blocks is employed for merging such as the aforementioned merge_left_flag, but in general indicating a selection among two or more than two candidate blocks. The second syntax element may be transmitted only if the first syntax element signals that the current block is to be merged with one of the candidate blocks. The second syntax element may further only be transmitted if the set of candidate blocks contains more than one candidate block and/or if any of the candidate blocks have different prediction parameters than any other of the candidate blocks. The syntax can be depending on how many candidate blocks are given and/or on how different prediction parameters are associated with the candidate blocks.

The syntax for signaling which of the blocks of the candidate blocks to be used, may be set simultaneously and/or parallel at the encoder and decoder side. For example, if there are three choices for candidate blocks identified in step 450, the syntax is chosen such that only these three choices are available and are considered for entropy coding, for example, in step 470. In other words, the syntax element is chosen such that its symbol alphabet has merely as many elements as choices of candidate blocks exist. The probabilities for all other choices may be considered to be zero and the entropy-coding/decoding may be adjusted simultaneously at encoder and decoder.

Further, as has already been noted with respect to step 464, the prediction parameters that are inferred as a consequence of the merging process may represent the complete set of prediction parameters that are associated with the current block or they may represent a subset of these prediction parameters such as the prediction parameters for one hypothesis of a block for which multi-hypothesis prediction is used.

As noted above, the syntax elements related to the merging information could be entropy-coded using context modeling. The syntax elements may consist of the merge_flag and the merge_left_flag described above (or similar syntax elements). In a concrete example, one out of three context models or contexts could be used for coding/decoding the merge_flag in step 454, for example. The used context model index merge_flag_ctx may be derived as follows: if the set of candidate blocks contains two elements, the value of merge_flag_ctx is equal to the sum of the values of the merge_flag of the two candidate blocks. If the set of candidate blocks contains one element, however, the value of merge_flag_ctx may be equal to two times the value of merge_flag of this one candidate block. As each merge_flag of the neighboring candidate blocks may either be one or zero, three contexts are available for merge_flag. The merge_left_flag may be coded using merely a single probability model.

However, according to an alternative embodiment, different context models might be used. For example, non-binary syntax elements may be mapped onto a sequence of binary symbols, so-called bins. The context models for some syntax elements or bins of syntax elements defining the merging information may be derived based on already transmitted syntax elements of neighboring blocks or the number of candidate blocks or other measures while other syntax elements or bins of the syntax elements may be coded with a fixed context model.

Regarding the above description of the merging of blocks, it is noted that the set of candidate blocks may also be derived the same way as for any of the embodiments described above with the following amendment: candidate blocks are restricted to blocks using motion-compensated prediction or interprediction, respectively. Only those can be elements of the set of candidate blocks. The signaling and context modeling of the merging information could be done as described above.

Returning to the combination of the multitree subdivision embodiments described above and the merging aspect described now, if the picture is divided into square blocks of variable size by use of a quadtree-based subdivision structure, for example, the merge_flag and merge_left_flag or other syntax elements specifying the merging could be interleaved with the prediction parameters that are transmitted for each leaf node of the quadtree structure. Consider again, for example, FIG. 9a. FIG. 9a shows an example for a quadtree-based subdivision of a picture into prediction blocks of variable size. The top two blocks of the largest size are so-called treeblocks, i.e., they are prediction blocks of the maximum possible size. The other blocks in this figure are obtained as a subdivision of their corresponding treeblock. The current block is marked with an "X". All the shaded blocks are en/decoded before the current block, so they form the set of causal blocks. As explicated in the description of the derivation of the set of candidate blocks for one of the embodiments, only the blocks containing the direct (i.e., top or left) neighboring samples of the top-left sample position of the current block can be members of the set of candidate blocks. Thus the current block can be merged with either block "A" or block "B". If merge_flag is equal to 0 (for "false"), the current block "X" is not merged with any of the two blocks. If blocks "A" and "B" have identical prediction parameters, no distinction needs to be made, since merging with any of the two blocks will lead to the same result. So, in this case, the merge_left_flag is not transmitted. Otherwise, if blocks "A" and "B" have different prediction parameters, merge_left_flag equal to 1 (for "true") will merge blocks "X" and "B", whereas merge_left_flag equal to 0 (for "false") will merge blocks "X" and "A". In another advantageous embodiment, additional neighboring (already transmitted) blocks represent candidates for the merging.

In FIG. 9b another example is shown. Here the current block "X" and the left neighbor block "B" are treeblocks, i.e. they have the maximum allowed block size. The size of the top neighbor block "A" is one quarter of the treeblock size. The blocks which are element of the set of causal blocks are shaded. Note that according to one of the advantageous embodiment, the current block "X" can only be merged with the two blocks "A" or "B", not with any of the other top neighboring blocks. In other advantageous embodiment, additional neighboring (already transmitted) blocks represent candidates for the merging.

Before proceeding with the description with regard to the aspect how to handle different sample arrays of a picture in accordance with embodiments of the present application, it is noted that the above discussion regarding the multitree subdivision and the signaling on the one hand and the merging aspect on the other hand made clear that these aspects provide advantages which may be exploited independent from each other. That is, as has already been explained above, a combination of a multitree subdivision with merging has specific advantages but advantages result also from alternatives where, for example, the merging feature is embodied with, however, the subdivision performed by subdividers 30 and 104a not being based on a quadtree or multitree subdivision, but rather corresponding to a macroblock subdivision with regular partitioning of these macroblocks into smaller partitions. On the other hand, in turn, the combination of the multitree subdivisioning along with the transmission of the maximum treeblock size indication within the bitstream, and the use of the multitree subdivision along with the use of the depth-first traversal order transporting the corresponding coding parameters of the blocks is advantageous independent from the merging feature being used concurrently or not. Generally, the advantages of merging can be understood, when considering that, intuitively, coding efficiency may be increased when the syntax of sample array codings is extended in a way that it does not only allow to subdivide a block, but also to merge two or more of the blocks that are obtained after subdivision. As a result, one obtains a group of blocks that are coded with the same prediction parameters. The prediction parameters for such a group of blocks need to be coded only once. Further, with respect to the merging of sets of samples, it should again been noted that the considered sets of samples may be rectangular or quadratic blocks, in which case the merged sets of samples represent a collection of rectangular and/or quadratic blocks. Alternatively, however, the considered sets of samples are arbitrarily shaped picture regions and the merged sets of samples represent a collection of arbitrarily shaped picture regions.

The following description focuses on the handling of different sample arrays of a picture in case there are more than one sample arrays per picture, and some aspects outlined in the following sub-description are advantageous independent from the kind of subdivision used, i.e. independent from the subdivision being based on multitree subdivision or not, and independent from merging being used or not. Before starting with describing specific embodiments regarding the handling of different sample arrays of a picture, the main issue of these embodiments is motivated by way of a short introduction into the field of the handling of different sample arrays per picture.

The following discussion focuses on coding parameters between blocks of different sample arrays of a picture in an image or video coding application, and, in particular, a way of adaptively predicting coding parameters between different sample arrays of a picture in, for example, but not exclusively the encoder and decoder of FIGS. 1 and 2, respectively, or another image or video coding environment. The sample arrays can, as noted above, represent sample arrays that are related to different color components or sample arrays that associate a picture with additional information such as transparency data or depth maps. Sample arrays that are related to color components of a picture are also referred to as color planes. The technique described in the following is also referred to as inter-plane adoption/prediction and it can be used in block-based image and video encoders and decoders, whereby the processing order of the blocks of the sample arrays for a picture can be arbitrary.

Image and video coders are typically designed for coding color pictures (either still images or pictures of a video sequence). A color picture consists of multiple color planes, which represent sample arrays for different color components. Often, color pictures are coded as a set of sample arrays consisting of a luma plane and two chroma planes, where the latter ones specify color difference components. In some application areas, it is also common that the set of coded sample arrays consists of three color planes representing sample arrays for the three primary colors red, green, and blue. In addition, for an improved color representation, a color picture may consist of more than three color planes. Furthermore, a picture can be associated with auxiliary sample arrays that specify additional information for the picture. For instance, such auxiliary sample arrays can be sample arrays that specify the transparency (suitable for specific display purposes) for the associated color sample arrays or sample arrays that specify a depth map (suitable for rendering multiple views, e.g., for 3-D displays).

In the conventional image and video coding standards (such as H.264), the color planes are usually coded together, whereby particular coding parameters such as macroblock and sub-macroblock prediction modes, reference indices, and motion vectors are used for all color components of a block. The luma plane can be considered as the primary color plane for which the particular coding parameters are specified in the bitstream, and the chroma planes can be considered as secondary planes, for which the corresponding coding parameters are inferred from the primary luma plane. Each luma block is associated with two chroma blocks representing the same area in a picture. Depending on the used chroma sampling format, the chroma sample arrays can be smaller than the luma sample array for a block. For each macroblock consisting of a luma and two chroma components, the same partitioning into smaller blocks is used (if the macroblock is subdivided). For each block consisting of a block of luma samples and two blocks of chroma samples (which may be the macroblock itself or a subblock of the macroblock), the same set of prediction parameters such as reference indices, motion parameters, and sometimes intra prediction modes are employed. In specific profiles of conventional video coding standards (such as the 4:4:4 profiles in H.264), it is also possible to code the different color planes of a picture independently. In that configuration, the macroblock partitioning, the prediction modes, reference indices, and motion parameters can be separately chosen for a color component of a macroblock or subblock. Conventional coding standards either all color planes are coded together using the same set of particular coding parameters (such as subdivision information and prediction parameters) or all color planes are coded completely independently of each other.

If the color planes are coded together, one set of subdivision and prediction parameters may be used for all color components of a block. This ensures that the side information is kept small, but it can result in a reduction of the coding efficiency compared to an independent coding, since the usage of different block decompositions and prediction parameters for different color components can result in a smaller rate-distortion cost. As an example, the usage of a different motion vector or reference frame for the chroma components can significantly reduce the energy of the residual signal for the chroma components and increase their overall coding efficiency. If the color planes are coded independently, the coding parameters such as the block partitioning, the reference indices, and the motion parameters can be selected for each color component separately in order to optimize the coding efficiency for each color component. But it is not possible, to employ the redundancy between the color components. The multiple transmissions of particular coding parameters does result in an increased side information rate (compared to the combined coding) and this increased side information rate can have a negative impact on the overall coding efficiency. Also, the support for auxiliary sample arrays in the state-of-the-art video coding standards (such as H.264) is restricted to the case that the auxiliary sample arrays are coded using their own set of coding parameters.

Thus, in all embodiments described so far, the picture planes could be handled as described above, but as also discussed above, the overall coding efficiency for the coding of multiple sample arrays (which may be related to different color planes and/or auxiliary sample arrays) can be increased, when it would be possible to decide on a block basis, for example, whether all sample arrays for a block are coded with the same coding parameters or whether different coding parameters are used. The basic idea of the following inter-plane prediction is to allow such an adaptive decision on a block basis, for example. The encoder can choose, for example based on a rate-distortion criterion, whether all or some of the sample arrays for a particular block are coded using the same coding parameters or whether different coding parameters are used for different sample arrays. This selection can also be achieved by signaling for a particular block of a sample array whether specific coding parameters are inferred from an already coded co-located block of a different sample array. It is also possible to arrange different sample arrays for a picture in groups, which are also referred to as sample array groups or plane groups. Each plane group can contain one or more sample arrays of a picture. Then, the blocks of the sample arrays inside a plane group share the same selected coding parameters such as subdivision information, prediction modes, and residual coding modes, whereas other coding parameters such as transform coefficient levels are separately transmitted for each sample arrays inside the plane group. One plane group is coded as primary plane group, i.e., none of the coding parameters is inferred or predicted from other plane groups. For each block of a secondary plane group, it can be adaptively chosen whether a new set of selected coding parameters is transmitted or whether the selected coding parameters are inferred or predicted from the primary or another secondary plane group. The decisions of whether selected coding parameters for a particular block are inferred or predicted are included in the bitstream. The inter-plane prediction allows a greater freedom in selecting the trade-off between the side information rate and prediction quality relative to the state-of-the-art coding of pictures consisting of multiple sample arrays. The advantage is an improved coding efficiency relative to the conventional coding of pictures consisting of multiple sample arrays.

Intra-plane adoption/prediction may extend an image or video coder, such as those of the above embodiments, in a way that it can be adaptively chosen for a block of a color sample array or an auxiliary sample array or a set of color sample arrays and/or auxiliary sample arrays whether a selected set of coding parameters is inferred or predicted from already coded co-located blocks of other sample arrays in the same picture or whether the selected set of coding parameters for the block is independently coded without referring to co-located blocks of other sample arrays in the same picture. The decisions of whether the selected set of coding parameters is inferred or predicted for a block of a sample array or a block of multiple sample arrays may be included in the bitstream. The different sample arrays that are associated with a picture don't need to have the same size.

As described above, the sample arrays that are associated with a picture (the sample arrays can represent color components and/or auxiliary sample arrays) may be arranged into two or more so-called plane groups, where each plane group consists of one or more sample arrays. The sample arrays that are contained in a particular plane group don't need to have the same size. Note that this arrangement into plane group includes the case that each sample array is coded separately.

To be more precise, in accordance with an embodiment, it is adaptively chosen, for each block of a plane group, whether the coding parameters specifying how a block is predicted are inferred or predicted from an already coded co-located block of a different plane group for the same picture or whether these coding parameters are separately coded for the block. The coding parameters that specify how a block is predicted include one or more of the following coding parameters: block prediction modes specifying what prediction is used for the block (intra prediction, inter prediction using a single motion vector and reference picture, inter prediction using two motion vectors and reference pictures, inter prediction using a higher-order, i.e., non-translational motion model and a single reference picture, inter prediction using multiple motion models and reference pictures), intra prediction modes specifying how an intra prediction signal is generated, an identifier specifying how many prediction signals are combined for generating the final prediction signal for the block, reference indices specifying which reference picture(s) is/are employed for motion-compensated prediction, motion parameters (such as displacement vectors or affine motion parameters) specifying how the prediction signal(s) is/are generated using the reference picture(s), an identifier specifying how the reference picture(s) is/are filtered for generating motion-compensated prediction signals. Note that in general, a block can be associated with only a subset of the mentioned coding parameters. For instance, if the block prediction mode specifies that a block is intra predicted, the coding parameters for a block can additionally include intra prediction modes, but coding parameters such as reference indices and motion parameters that specify how an inter prediction signal is generated are not specified; or if the block prediction mode specifies inter prediction, the associated coding parameters can additionally include reference indices and motion parameters, but intra prediction modes are not specified.

One of the two or more plane groups may be coded or indicated within the bitstream as the primary plane group. For all blocks of this primary plane group, the coding parameters specifying how the prediction signal is generated are transmitted without referring to other plane groups of the same picture. The remaining plane groups are coded as secondary plane groups. For each block of the secondary plane groups, one or more syntax elements are transmitted that signal whether the coding parameters for specifying how the block is predicted are inferred or predicted from a co-located block of other plane groups or whether a new set of these coding parameters is transmitted for the block. One of the one or more syntax elements may be referred to as inter-plane prediction flag or inter-plane prediction parameter. If the syntax elements signal that the corresponding coding parameters are not inferred or predicted, a new set of the corresponding coding parameters for the block are transmitted in the bitstream. If the syntax elements signal that the corresponding coding parameters are inferred or predicted, the co-located block in a so-called reference plane group is determined. The assignment of the reference plane group for the block can be configured in multiple ways. In one embodiment, a particular reference plane group is assigned to each secondary plane group; this assignment can be fixed or it can signaled in high-level syntax structures such as parameter sets, access unit header, picture header, or slice header.

In a second embodiment, the assignment of the reference plane group is coded inside the bitstream and signaled by the one or more syntax elements that are coded for a block in order to specify whether the selected coding parameters are inferred or predicted or separately coded.

Figure 11:
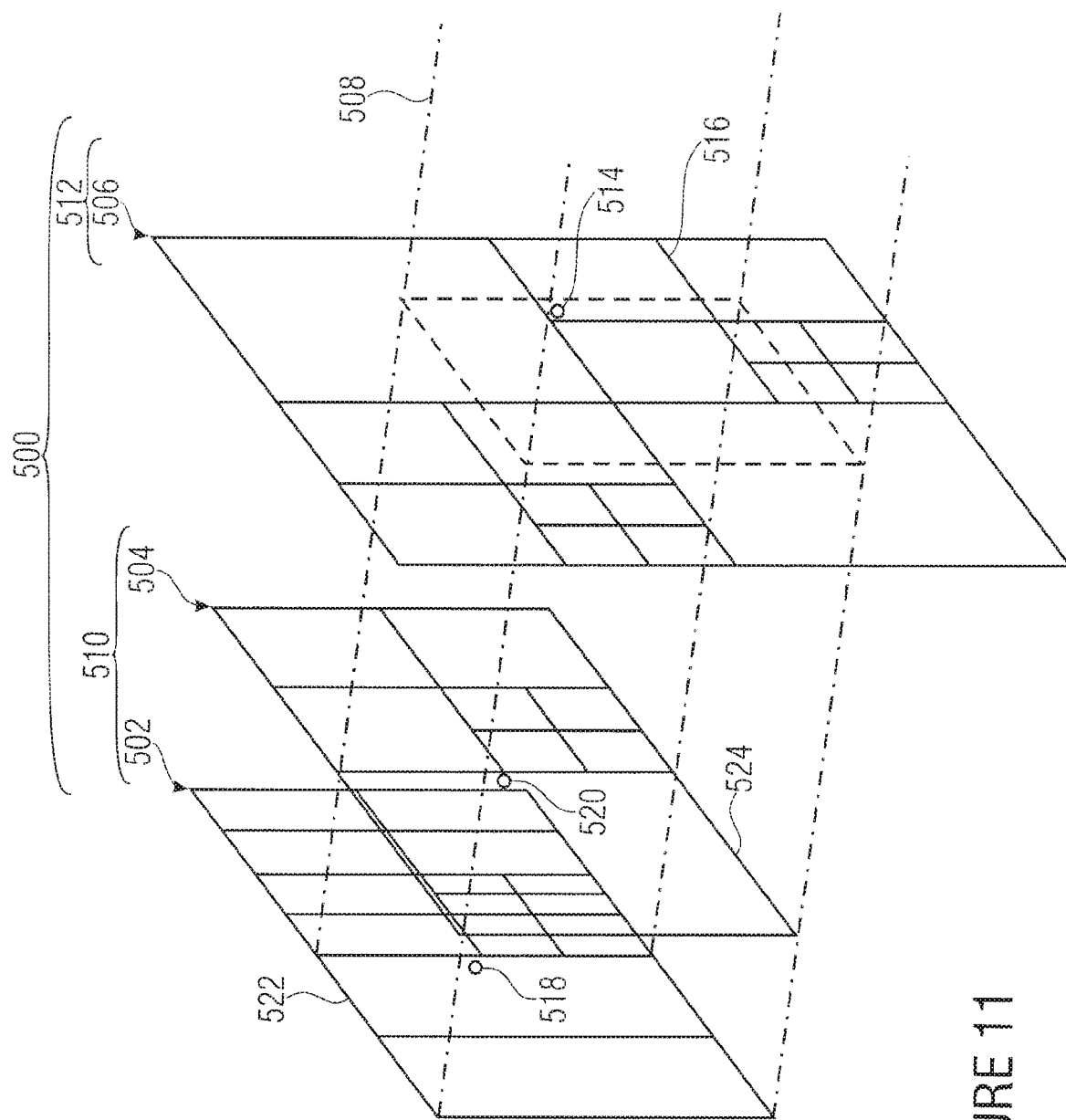
FIG. 11 schematically shows a composition of a picture out of planes and plane groups and illustrates a coding using inter plane adaptation/prediction in accordance with an embodiment.

In order to ease the just-mentioned possibilities in connection with inter-plane prediction and the following detailed embodiments, reference is made to FIG. 11, which shows illustratively a picture 500 composed of three sample arrays 502, 504 and 506. For the sake of easier understanding, merely sub-portions of the sample arrays 502-506 are shown in FIG. 11. The sample arrays are shown as if they were registered against each other spatially, so that the sample arrays 502-506 overlay each other along a direction 508 and so that a projection of the samples of the sample arrays 502-506 along the direction 508 results in the samples of all these sample arrays 502-506 to be correctly spatially located to each other. In yet other words, the planes 502 and 506 have been spread along the horizontal and vertical direction in order to adapt their spatial resolution to each other and to register them to each other.

In accordance with an embodiment, all sample arrays of a picture belong to the same portion of a spatial scene wherein the resolution along the vertical and horizontal direction may differ between the individual sample arrays 502-506. Further, for illustration purposes, the sample arrays 502 and 504 are considered to belong to one plane group 510, whereas the sample array 506 is considered to belong to another plane group 512. Further, FIG. 11 illustrates the exemplary case where the spatial resolution along the horizontal axis of sample array 504 is twice the resolution in the horizontal direction of sample array 502. Moreover, sample array 504 is considered to form the primary array relative to sample array 502, which forms a subordinate array relative to primary array 504. As explained earlier, in this case, the subdivision of sample array 504 into blocks as decided by subdivider 30 of FIG. 1 is adopted by subordinate array 502 wherein, in accordance with the example of FIG. 11, due to the vertical resolution of sample array 502 being half the resolution in the vertical direction of primary array 504, each block has been halved into two horizontally juxtapositioned blocks, which, due to the halving are quadratic blocks again when measured in units of the sample positions within sample array 502.

As is exemplarily shown in FIG. 11, the subdivision chosen for sample array 506 is different from the subdivision of the other plane group 510. As described before, subdivider 30 may select the subdivision of pixel array 506 separately or independent from the subdivision for plane group 510. Of course, the resolution of sample array 506 may also differ from the resolutions of the planes 502 and 504 of plane group 510.

Now, when encoding the individual sample arrays 502-506, the encoder 10 may begin with coding the primary array 504 of plane group 510 in, for example, the manner described above. The blocks shown in FIG. 11 may, for example, be the prediction blocks mentioned above. Alternatively, the blocks are residual blocks or other blocks defining the granularity for defining certain coding parameters. The inter-plane prediction is not restricted to quadtree or multitree subdivision, although this is illustrated in FIG. 11.

After the transmission of the syntax element for primary array 504, encoder 10 may decide to declare primary array 504 to be the reference plane for subordinate plane 502. Encoder 10 and extractor 30, respectively, may signal this decision via the bitstream 22 while the association may be clear from the fact that sample array 504 forms the primary array of plane group 510 which information, in turn, may also be part of the bitstream 22. In any case, for each block within sample array 502 inserter 18 or any other module of encoder 10 along with inserter 18 may decide to either suppress a transferal of the coding parameters of this block within the bitstream and to signal within the bitstream for that block instead that the coding parameters of a co-located block within the primary array 504 shall be used instead, or that the coding parameters of the co-located block within the primary array 504 shall be used as a prediction for the coding parameters of the current block of sample array 502 with merely transferring the residual data thereof for the current block of the sample array 502 within the bitstream. In case of a negative decision, the coding parameters are transferred within the data stream as usual. The decision is signaled within the data stream 22 for each block. At the decoder side, the extractor 102 uses this inter-plane prediction information for each block in order to gain the coding parameters of the respective block of the sample array 502 accordingly, namely by inferring the coding parameters of the co-located block of the primary array 504 or, alternatively, extracting residual data for that block from the data stream and combining this residual data with a prediction obtained from the coding parameters of the co-located block of the primary array 504 if the inter-plane adoption/prediction information suggests inter-plane adoption/prediction, or extracting the coding parameters of the current block of the sample array 502 as usual independent from the primary array 504.

As also described before, reference planes are not restricted to reside within the same plane group as the block for which inter-plane prediction is currently of interest. Therefore, as described above, plane group 510 may represent the primary plane group or reference plane group for the secondary plane group 512. In this case, the bitstream might contain a syntax element indicating for each block of sample array 506 as to whether the afore-mentioned adoption/prediction of coding parameters of co-located macroblocks of any of the planes 502 and 504 of the primary plane group or reference plane group 510 shall be performed or not wherein in the latter case the coding parameters of the current block of sample array 506 are transmitted as usual.

It should be noted that the subdivision and/or prediction parameters for the planes inside a plane group can be the same, i.e., because they are only coded once for a plane group (all secondary planes of a plane group infer the subdivision information and/or prediction parameters from the primary plane inside the same plane group), and the adaptive prediction or inference of the subdivision information and/or prediction parameters is done between plane groups.

It should be noted that the reference plane group can be a primary plane group or a secondary plane group.

The co-location between blocks of different planes within a plane group is readily understandable as the subdivision of the primary sample array 504 is spatially adopted by the subordinate sample array 502, except the just-described sub-partitioning of the blocks in order to render the adopted leaf blocks into quadratic blocks. In case of inter-plane adoption/prediction between different plane groups, the co-location might be defined in a way so as to allow for a greater freedom between the subdivisions of these plane groups. Given the reference plane group, the co-located block inside the reference plane group is determined. The derivation of the co-located block and the reference plane group can be done by a process similar to the following. A particular sample 514 in the current block 516 of one of the sample arrays 506 of the secondary plane group 512 is selected. Same may be the top-left sample of the current block 516 as shown at 514 in FIG. 11 for illustrative purposes or, a sample in the current block 516 close to the middle of the current block 516 or any other sample inside the current block, which is geometrically uniquely defined. The location of this selected sample 515 inside a sample array 502 and 504 of the reference plane group 510 is calculated. The positions of the sample 514 within the sample arrays 502 and 504 are indicated in FIG. 11 at 518 and 520, respectively. Which of the planes 502 and 504 within the reference plane group 510 is actually used may be predetermined or may be signaled within the bitstream. The sample within the corresponding sample array 502 or 504 of the reference plane group 510, being closest to the positions 518 and 520, respectively, is determined and the block that contains this sample is chosen as the co-located block within the respective sample array 502 and 504, respectively. In case of FIG. 11, these are blocks 522 and 524, respectively. An alternative approach for determining co-located block in other planes is described later.

In an embodiment, the coding parameters specifying the prediction for the current block 516 are completely inferred using the corresponding prediction parameters of the co-located block 522/524 in a different plane group 510 of the same picture 500, without transmitting additional side information. The inference can consist of a simply copying of the corresponding coding parameters or an adaptation of the coding parameters taken into account differences between the current 512 and the reference plane group 510. As an example, this adaptation may consist of adding a motion parameter correction (e.g., a displacement vector correction) for taking into account the phase difference between luma and chroma sample arrays; or the adaptation may consist of modifying the precision of the motion parameters (e.g., modifying the precision of displacement vectors) for taking into account the different resolution of luma and chroma sample arrays. In a further embodiment, one or more of the inferred coding parameters for specifying the prediction signal generation are not directly used for the current block 516, but are used as a prediction for the corresponding coding parameters for the current block 516 and a refinement of these coding parameters for the current block 516 is transmitted in the bitstream 22. As an example, the inferred motion parameters are not directly used, but motion parameter differences (such as a displacement vector difference) specifying the deviation between the motion parameters that are used for the current block 516 and the inferred motion parameters are coded in the bitstream; at the decoder side, the actual used motion parameters are obtained by combining the inferred motion parameters and the transmitted motion parameter differences.

In another embodiment, the subdivision of a block, such as the treeblocks of the aforementioned prediction subdivision into prediction blocks (i.e., blocks of samples for which the same set of prediction parameters is used) is adaptively inferred or predicted from an already coded co-located block of a different plane group for the same picture, i.e. the bit sequence according to FIG. 6a or 6b. In an embodiment, one of the two or more plane groups is coded as primary plane group. For all blocks of this primary plane group, the subdivision information is transmitted without referring to other plane groups of the same picture. The remaining plane groups are coded as secondary plane groups. For blocks of the secondary plane groups, one or more syntax elements are transmitted that signal whether the subdivision information is inferred or predicted from a co-located block of other plane groups or whether the subdivision information is transmitted in the bitstream. One of the one or more syntax elements may be referred to as inter-plane prediction flag or inter-plane prediction parameter. If the syntax elements signal that the subdivision information is not inferred or predicted, the subdivision information for the block is transmitted in the bitstream without referring to other plane groups of the same picture. If the syntax elements signal that the subdivision information is inferred or predicted, the co-located block in a so-called reference plane group is determined. The assignment of the reference plane group for the block can be configured in multiple ways. In one embodiment, a particular reference plane group is assigned to each secondary plane group; this assignment can be fixed or it can signaled in high-level syntax structures such as parameter sets, access unit header, picture header, or slice header. In a second embodiment, the assignment of the reference plane group is coded inside the bitstream and signaled by the one or more syntax elements that are coded for a block in order to specify whether the subdivision information is inferred or predicted or separately coded. The reference plane group can be the primary plane group or another secondary plane group. Given the reference plane group, the co-located block inside the reference plane group is determined. The co-located block is the block in the reference plane group that corresponds to the same image area as the current block, or the block that represents the block inside the reference plane group that shares the largest portion of the image area with the current block. The co-located block can be partitioned into smaller prediction blocks.

In a further embodiment, the subdivision information for the current block, such as the quadtree-based subdivision info according to FIG. 6a or 6b, is completely inferred using the subdivision information of the co-located block in a different plane group of the same picture, without transmitting additional side information. As a particular example, if the co-located block is partitioned into two or four prediction blocks, the current block is also partitioned into two or four subblocks for the purpose of prediction. As another particular example, if the co-located block is partitioned into four subblocks and one of these subblocks is further partitioned into four smaller subblocks, the current block is also partitioned into four subblocks and one of these subblocks (the one corresponding to the subblock of the co-located block that is further decomposed) is also partitioned into four smaller subblocks. In a further advantageous embodiment, the inferred subdivision information is not directly used for the current block, but it is used as a prediction for the actual subdivision information for the current block, and the corresponding refinement information is transmitted in the bitstream. As an example, the subdivision information that is inferred from the co-located block may be further refined. For each subblock that corresponds to a subblock in the co-located block that is not partitioned into smaller blocks, a syntax element can be coded in the bitstream, which specifies if the subblock is further decomposed in the current plane group. The transmission of such a syntax element can be conditioned on the size of the subblock. Or it can be signaled in the bitstream that a subblock that is further partitioned in the reference plane group is not partitioned into smaller blocks in the current plane group.

In a further embodiment, both the subdivision of a block into prediction blocks and the coding parameters specifying how that subblocks are predicted are adaptively inferred or predicted from an already coded co-located block of a different plane group for the same picture. In an advantageous embodiment of the invention, one of the two or more plane groups is coded as primary plane group. For all blocks of this primary plane group, the subdivision information and the prediction parameters are transmitted without referring to other plane groups of the same picture. The remaining plane groups are coded as secondary plane groups. For blocks of the secondary plane groups, one or more syntax elements are transmitted that signal whether the subdivision information and the prediction parameters are inferred or predicted from a co-located block of other plane groups or whether the subdivision information and the prediction parameters are transmitted in the bitstream. One of the one or more syntax elements may be referred to as inter-plane prediction flag or inter-plane prediction parameter. If the syntax elements signal that the subdivision information and the prediction parameters are not inferred or predicted, the subdivision information for the block and the prediction parameters for the resulting subblocks are transmitted in the bitstream without referring to other plane groups of the same picture. If the syntax elements signal that the subdivision information and the prediction parameters for the subblock are inferred or predicted, the co-located block in a so-called reference plane group is determined. The assignment of the reference plane group for the block can be configured in multiple ways. In one embodiment, a particular reference plane group is assigned to each secondary plane group; this assignment can be fixed or it can signaled in high-level syntax structures such as parameter sets, access unit header, picture header, or slice header. In a second embodiment, the assignment of the reference plane group is coded inside the bitstream and signaled by the one or more syntax elements that are coded for a block in order to specify whether the subdivision information and the prediction parameters are inferred or predicted or separately coded. The reference plane group can be the primary plane group or another secondary plane group. Given the reference plane group, the co-located block inside the reference plane group is determined. The co-located block may be the block in the reference plane group that corresponds to the same image area as the current block, or the block that represents the block inside the reference plane group that shares the largest portion of the image area with the current block. The co-located block can be partitioned into smaller prediction blocks. In an advantageous embodiment, the subdivision information for the current block as well as the prediction parameters for the resulting subblocks are completely inferred using the subdivision information of the co-located block in a different plane group of the same picture and the prediction parameters of the corresponding subblocks, without transmitting additional side information. As a particular example, if the co-located block is partitioned into two or four prediction blocks, the current block is also partitioned into two or four subblocks for the purpose of prediction and the prediction parameters for the subblocks of the current block are derived as described above. As another particular example, if the co-located block is partitioned into four subblocks and one of these subblocks is further partitioned into four smaller subblocks, the current block is also partitioned into four subblocks and one of these subblocks (the one corresponding to the subblock of the co-located block that is further decomposed) is also partitioned into four smaller subblocks and the prediction parameters for all not further partitioned subblocks are inferred as described above. In a further advantageous embodiment, the subdivision information is completely inferred based on the subdivision information of the co-located block in the reference plane group, but the inferred prediction parameters for the subblocks are only used as prediction for the actual prediction parameters of the subblocks. The deviations between the actual prediction parameters and the inferred prediction parameters are coded in the bitstream. In a further embodiment, the inferred subdivision information is used as a prediction for the actual subdivision information for the current block and the difference is transmitted in the bitstream (as described above), but the prediction parameters are completely inferred. In another embodiment, both the inferred subdivision information and the inferred prediction parameters are used as prediction and the differences between the actual subdivision information and prediction parameters and their inferred values are transmitted in the bitstream.

In another embodiment, it is adaptively chosen, for a block of a plane group, whether the residual coding modes (such as the transform type) are inferred or predicted from an already coded co-located block of a different plane group for the same picture or whether the residual coding modes are separately coded for the block. This embodiment is similar to the embodiment for the adaptive inference/prediction of the prediction parameters described above.

In another embodiment, the subdivision of a block (e.g., a prediction block) into transform blocks (i.e., blocks of samples to which a two-dimensional transform is applied) is adaptively inferred or predicted from an already coded co-located block of a different plane group for the same picture. This embodiment is similar to the embodiment for the adaptive inference/prediction of the subdivision into prediction blocks described above.

In another embodiment, the subdivision of a block into transform blocks and the residual coding modes (e.g., transform types) for the resulting transform blocks are adaptively inferred or predicted from an already coded co-located block of a different plane group for the same picture. This embodiment is similar to the embodiment for the adaptive inference/prediction of the subdivision into prediction blocks and the prediction parameters for the resulting prediction blocks described above.

In another embodiment, the subdivision of a block into prediction blocks, the associated prediction parameters, the subdivision information of the prediction blocks, and the residual coding modes for the transform blocks are adaptively inferred or predicted from an already coded co-located block of a different plane group for the same picture. This embodiment represents a combination of the embodiments described above. It is also possible that only some of the mentioned coding parameters are inferred or predicted.

Thus, the inter-plane adoption/prediction may increase the coding efficiency described previously. However, the coding efficiency gain by way of inter-plane adoption/prediction is also available in case of other block subdivisions being used than multitree-based subdivisions and independent from block merging being implemented or not.

The above-outlined embodiments with respect to inter plane adaptation/prediction are applicable to image and video encoders and decoders that divide the color planes of a picture and, if present, the auxiliary sample arrays associated with a picture into blocks and associate these blocks with coding parameters. For each block, a set of coding parameters may be included in the bitstream. For instance, these coding parameters can be parameters that describe how a block is predicted or decoded at the decoder side. As particular examples, the coding parameters can represent macroblock or block prediction modes, sub-division information, intra prediction modes, reference indices used for motion-compensated prediction, motion parameters such as displacement vectors, residual coding modes, transform coefficients, etc. The different sample arrays that are associated with a picture can have different sizes.

Next, a scheme for enhanced signaling of coding parameters within a tree-based partitioning scheme as, for example, those described above with respect to FIGS. 1 to 8 is described. As with the other schemes, namely merging and inter plane adoption/prediction, the effects and advantages of the enhanced signaling schemes, in the following often called inheritance, are described independent from the above embodiments, although the below described schemes are combinable with any of the above embodiments, either alone or in combination.

Generally, the improved coding scheme for coding side information within a tree-based partitioning scheme, called inheritance, described next enables the following advantages relative to conventional schemes of coding parameter treatment.

In conventional image and video coding, the pictures or particular sets of sample arrays for the pictures are usually decomposed into blocks, which are associated with particular coding parameters. The pictures usually consist of multiple sample arrays. In addition, a picture may also be associated with additional auxiliary samples arrays, which may, for example, specify transparency information or depth maps. The sample arrays of a picture (including auxiliary sample arrays) can be grouped into one or more so-called plane groups, where each plane group consists of one or more sample arrays. The plane groups of a picture can be coded independently or, if the picture is associated with more than one plane group, with prediction from other plane groups of the same picture. Each plane group is usually decomposed into blocks. The blocks (or the corresponding blocks of sample arrays) are predicted by either inter-picture prediction or intra-picture prediction. The blocks can have different sizes and can be either quadratic or rectangular. The partitioning of a picture into blocks can be either fixed by the syntax, or it can be (at least partly) signaled inside the bitstream. Often syntax elements are transmitted that signal the subdivision for blocks of predefined sizes. Such syntax elements may specify whether and how a block is subdivided into smaller blocks and being associated coding parameters, e.g. for the purpose of prediction. For all samples of a block (or the corresponding blocks of sample arrays) the decoding of the associated coding parameters is specified in a certain way. In the example, all samples in a block are predicted using the same set of prediction parameters, such as reference indices (identifying a reference picture in the set of already coded pictures), motion parameters (specifying a measure for the movement of a blocks between a reference picture and the current picture), parameters for specifying the interpolation filter, intra prediction modes, etc. The motion parameters can be represented by displacement vectors with a horizontal and vertical component or by higher order motion parameters such as affine motion parameters consisting of six components. It is also possible that more than one set of particular prediction parameters (such as reference indices and motion parameters) are associated with a single block. In that case, for each set of these particular prediction parameters, a single intermediate prediction signal for the block (or the corresponding blocks of sample arrays) is generated, and the final prediction signal is build by a combination including superimposing the intermediate prediction signals. The corresponding weighting parameters and potentially also a constant offset (which is added to the weighted sum) can either be fixed for a picture, or a reference picture, or a set of reference pictures, or they can be included in the set of prediction parameters for the corresponding block. The difference between the original blocks (or the corresponding blocks of sample arrays) and their prediction signals, also referred to as the residual signal, is usually transformed and quantized. Often, a two-dimensional transform is applied to the residual signal (or the corresponding sample arrays for the residual block). For transform coding, the blocks (or the corresponding blocks of sample arrays), for which a particular set of prediction parameters has been used, can be further split before applying the transform. The transform blocks can be equal to or smaller than the blocks that are used for prediction. It is also possible that a transform block includes more than one of the blocks that are used for prediction. Different transform blocks can have different sizes and the transform blocks can represent quadratic or rectangular blocks. After transform, the resulting transform coefficients are quantized and so-called transform coefficient levels are obtained. The transform coefficient levels as well as the prediction parameters and, if present, the subdivision information is entropy coded.

In some image and video coding standards, the possibilities for subdividing a picture (or a plane group) into blocks that are provided by the syntax are very limited. Usually, it can only be specified whether and (potentially how) a block of a predefined size can be subdivided into smaller blocks. As an example, the largest block size in H.264 is 16×16. The 16×16 blocks are also referred to as macroblocks and each picture is partitioned into macroblocks in a first step. For each 16×16 macroblock, it can be signaled whether it is coded as 16×16 block, or as two 16×8 blocks, or as two 8×16 blocks, or as four 8×8 blocks. If a 16×16 block is subdivided into four 8×8 block, each of these 8×8 blocks can be either coded as one 8×8 block, or as two 8×4 blocks, or as two 4×8 blocks, or as four 4×4 blocks. The small set of possibilities for specifying the partitioning into blocks in state-of-the-art image and video coding standards has the advantage that the side information rate for signaling the subdivision information can be kept small, but it has the disadvantage that the bit rate that may be used for transmitting the prediction parameters for the blocks can become significant as explained in the following. The side information rate for signaling the prediction information does usually represent a significant amount of the overall bit rate for a block. And the coding efficiency could be increased when this side information is reduced, which, for instance, could be achieved by using larger block sizes. Real images or pictures of a video sequence consist of arbitrarily shaped objects with specific properties. As an example, such objects or parts of the objects are characterized by a unique texture or a unique motion. And usually, the same set of prediction parameters can be applied for such an object or part of an object. But the object boundaries usually don't coincide with the possible block boundaries for large prediction blocks (e.g., 16×16 macroblocks in H.264). An encoder usually determines the subdivision (among the limited set of possibilities) that results in the minimum of a particular rate-distortion cost measure. For arbitrarily shaped objects this can result in a large number of small blocks. And since each of these small blocks is associated with a set of prediction parameters, which need to be transmitted, the side information rate can become a significant part of the overall bit rate. But since several of the small blocks still represent areas of the same object or part of an object, the prediction parameters for a number of the obtained blocks are the same or very similar. Intuitively, the coding efficiency could be increased when the syntax is extended in a way that it does not only allow to subdivide a block, but also to share coding parameters between the blocks that are obtained after subdivision. In a tree-based subdivision, sharing of coding parameters for a given set of blocks can be achieved by assigning the coding parameters or parts thereof to one or more parent nodes in the tree-based hierarchy. As a result, the shared parameters or parts thereof can be used in order to reduce the side information that may be used for signaling the actual choice of coding parameters for the blocks obtained after subdivision. Reduction can be achieved by omitting the signaling of parameters for subsequent blocks or by using the shared parameter(s) for prediction and/or context modeling of the parameters for subsequent blocks.

The basic idea of the inheritance scheme describe below is to reduce the bit rate that may be used for transmitting the coding parameters by sharing information along the tree-based hierarchy of blocks. The shared information is signaled inside the bitstream (in addition to the subdivision information). The advantage of the inheritance scheme is an increased coding efficiency resulting from a decreased side information rate for the coding parameters.

In order to reduce the side information rate, in accordance with the embodiments described below, the respective coding parameters for particular sets of samples, i.e. simply connected regions, which may represent rectangular or quadratic blocks or arbitrarily shaped regions or any other collection of samples, of a multitree subdivision are signaled within the data stream in an efficient way. The inheritance scheme described below enables that the coding parameters don not have to be explicitly included in the bitstream for each of these sample sets in full. The coding parameters may represent prediction parameters, which specify how the corresponding set of samples is predicted using already coded samples. Many possibilities and examples have been described above and do also apply here. As has also been indicated above, and will be described further below, as far as the following inheritance scheme is concerned, the tree-based partitioning of the sample arrays of a picture into sample sets may be fixed by the syntax or may be signaled by corresponding subdivision information inside the bitstream. The coding parameters for the sample sets may, as described above, transmitted in a predefined order, which is given by the syntax.

In accordance with the inheritance scheme, the decoder or extractor 102 of the decoder is configured to derive the information on the coding parameters of the individual simply connected region or sample sets in a specific way. In particular, coding parameters or parts thereof such as those parameters serving for the purpose of prediction, are shared between blocks along the given tree-based partitioning scheme with the sharing group along the tree structure being decided by the encoder or inserter 18, respectively. In a particular embodiment, sharing of the coding parameters for all child nodes of a given internal node of the partitioning tree is indicated by using a specific binary-valued sharing flag. As an alternative approach, refinements of the coding parameters can be transmitted for each node such that the accumulated refinements of parameters along the tree-based hierarchy of blocks can be applied to all sample sets of the block at a given leaf node. In another embodiment, parts of the coding parameters that are transmitted for internal nodes along the tree-based hierarchy of blocks can be used for context-adaptive entropy encoding and decoding of the coding parameter or parts thereof for the block at a given leaf node.

Figure 12A:
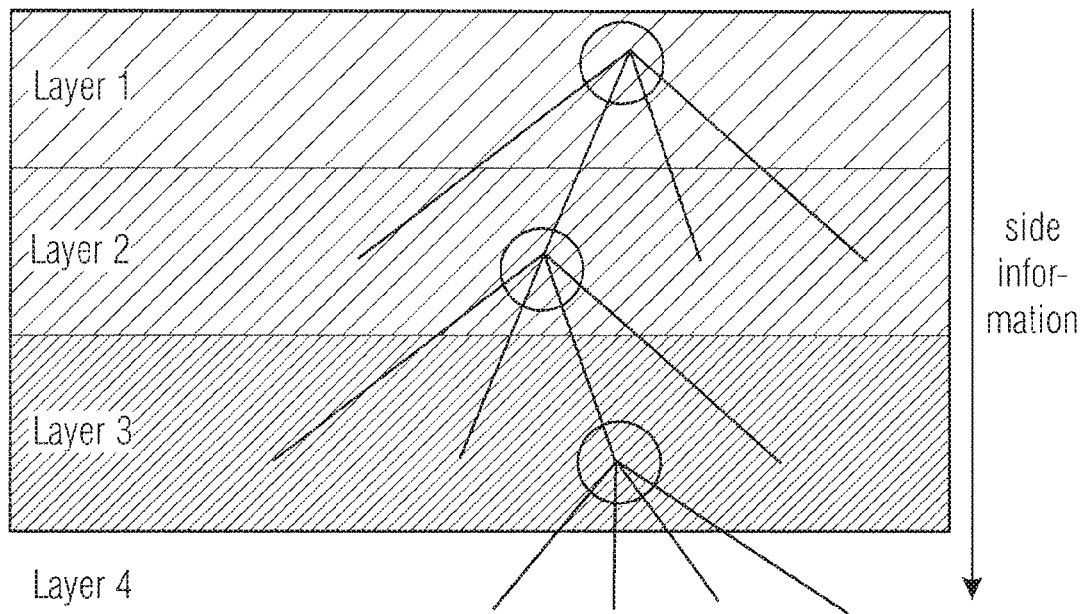
FIGS. 12*a* and 12*b* schematically illustrate a subtree structure and the corresponding sub-division in order to illustrate the inheritance scheme in accordance with an embodiment.
Figure 12B:
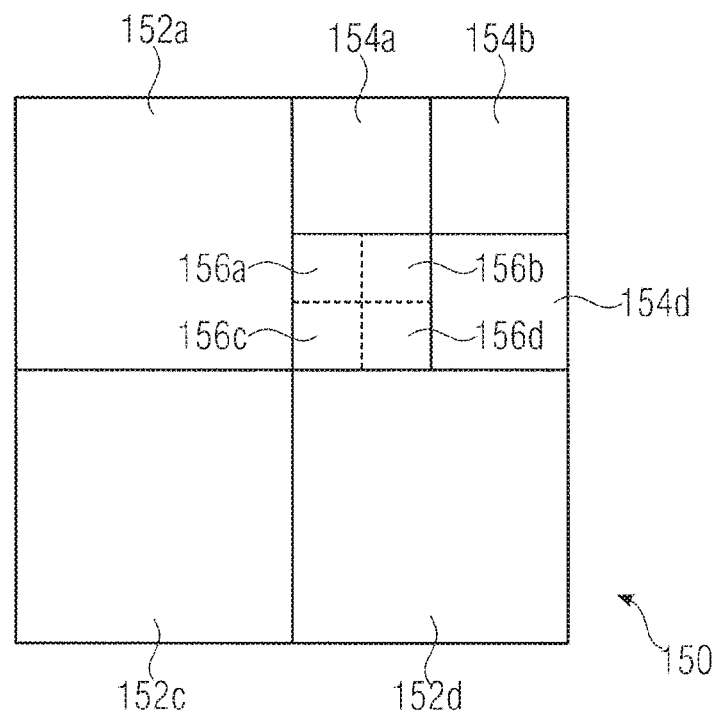

FIGS. 12a and 12b illustrate the basis idea of inheritance for the specific case of using a quadtree-based partitioning. However, as indicated several times above, other multitree subdivision schemes may be used as well The tree structure is shown in FIG. 12a whereas the corresponding spatial partitioning corresponding to the tree structure of FIG. 12a is shown in FIG. 12b. The partitioning shown therein is similar to that shown with respect to FIGS. 3a to 3c. Generally speaking, the inheritance scheme will allow side information to be assigned to nodes at different non-leaf layers within the tree structure. Depending on the assignment of side information to nodes at the different layers in the tree, such as the internal nodes in the tree of FIG. 12a or the root node thereof, different degrees of sharing side information can be achieved within the tree hierarchy of blocks shown in FIG. 12b. For example, if it is decided that all the leaf nodes in layer 4, which, in case of FIG. 12a all have the same parent node, shall share side information, virtually, this means that the smallest blocks in FIG. 12b indicated with 156a to 156d share this side information and it is no longer necessary to transmit the side information for all these small blocks 156a to 156d in full, i.e. four times, although this is kept as an option for the encoder However, it would also be possible to decide that a whole region of hierarchy level 1 (layer 2) of FIG. 12a, namely the quarter portion at the top right hand corner of tree block 150 including the subblocks 154a, 154b and 154d as well as the even smaller subblock 156a to 156d just-mentioned, serves as a region wherein coding parameters are shared. Thus, the area sharing side information is increased. The next level of increase would be to sum-up all the subblocks of layer 1, namely subblocks 152a, 152c and 152d and the aforementioned smaller blocks. In other words, in this case, the whole tree block would have side information assigned thereto with all the subblocks of this tree block 150 sharing the side information.

In the following description of inheritance, the following notation is used for describing the embodiments:
 a. Reconstructed samples of current leaf node: r
 b. Reconstructed samples of neighboring leaves: r'
 c. Predictor of the current leaf node: p
 d. Residual of the current leaf node: Re s
 e. Reconstructed residual of the current leaf node: Re c Res
 f. Scaling and Inverse transform: SIT
 g. Sharing flag: f As a first example of inheritance, the intra-prediction signalization at internal nodes may be described. To be more precise, it is described how to signalize intra-prediction modes at internal nodes of a tree-based block partitioning for the purpose of prediction. By traversing the tree from the root node to the leaf nodes, internal nodes (including the root node) may convey parts of side information that will be exploited by its corresponding child nodes. To be more specific, a sharing flag f is transmitted for internal nodes with the following meaning:

If f has a value of 1 ("true"), all child nodes of the given internal node share the same intra-prediction mode. In addition to the sharing flag f with a value of 1, the internal node also signals the intra-prediction mode parameter to be used for all child nodes. Consequently, all subsequent child nodes do not carry any prediction mode information as well as any sharing flags. For the reconstruction of all related leaf nodes, the decoder applies the intra-prediction mode from the corresponding internal node.

If f has a value of 0 ("false"), the child nodes of the corresponding internal node do not share the same intra-prediction mode and each child node that is an internal node carries a separate sharing flag.

Figure 12C:
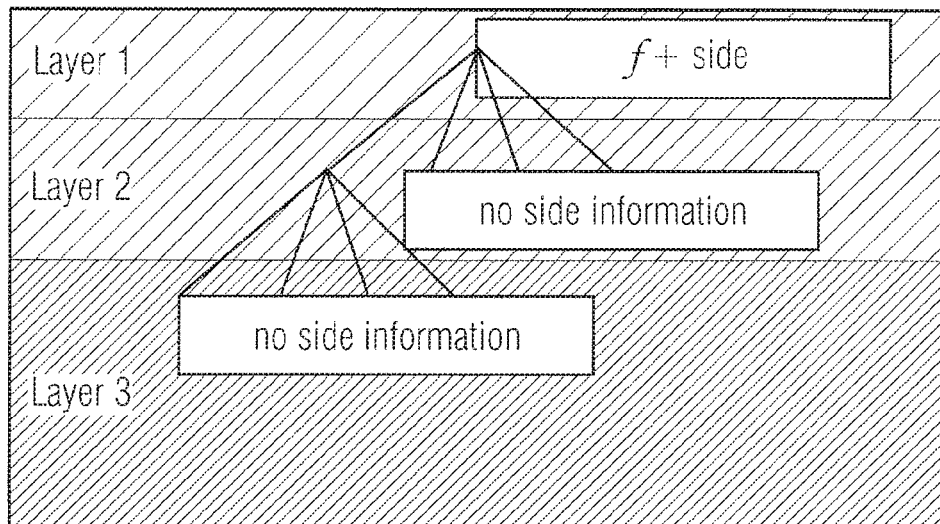
FIGS. 12*c* and 12*d* schematically illustrate a subtree structure in order to illustrate the inheritance scheme with adoption and prediction, respectively, in accordance with embodiments.

FIG. 12c illustrates the intra-prediction signalization at internal nodes as described above. The internal node in layer 1 conveys the sharing flag and the side information which is given by the intra-prediction mode information and the child nodes are not carrying any side information.

As a second example of inheritance, the inter-prediction refinement may be described. To be more precise, it is described how to signalize side information of inter-prediction modes at internal modes of a tree-based block partitioning for the purpose of refinement of motion parameters, as e.g., given by motion vectors. By traversing the tree from the root node to the leaf nodes, internal nodes (including the root node) may convey parts of side information that will be refined by its corresponding child nodes. To be more specific, a sharing flag f is transmitted for internal nodes with the following meaning:

If f has a value of 1 ("true"), all child nodes of the given internal node share the same motion vector reference. In addition to the sharing flag f with a value of 1, the internal node also signals the motion vector and the reference index. Consequently, all subsequent child nodes carry no further sharing flags but may carry a refinement of this inherited motion vector reference. For the reconstruction of all related leaf nodes, the decoder adds the motion vector refinement at the given leaf node to the inherited motion vector reference belonging to its corresponding internal parent node that has a sharing flag f with a value of 1. This means that the motion vector refinement at a given leaf node is the difference between the actual motion vector to be applied for motion-compensated prediction at this leaf node and the motion vector reference of its corresponding internal parent node.

If f has a value of 0 ("false"), the child nodes of the corresponding internal node do not necessarily share the same inter-prediction mode and no refinement of the motion parameters is performed at the child nodes by using the motion parameters from the corresponding internal node and each child node that is an internal node carries a separate sharing flag.

Figure 12D:
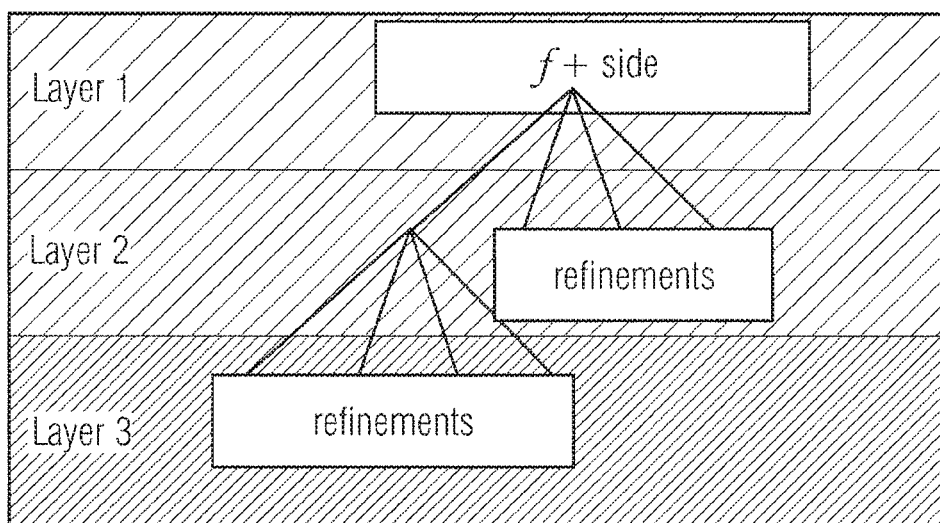

FIG. 12d illustrates the motion parameter refinement as described above. The internal node in layer 1 is conveying the sharing flag and side information. The child nodes which are leaf nodes carry only the motion parameter refinements and, e.g., the internal child node in layer 2 carries no side information.

Figure 13:
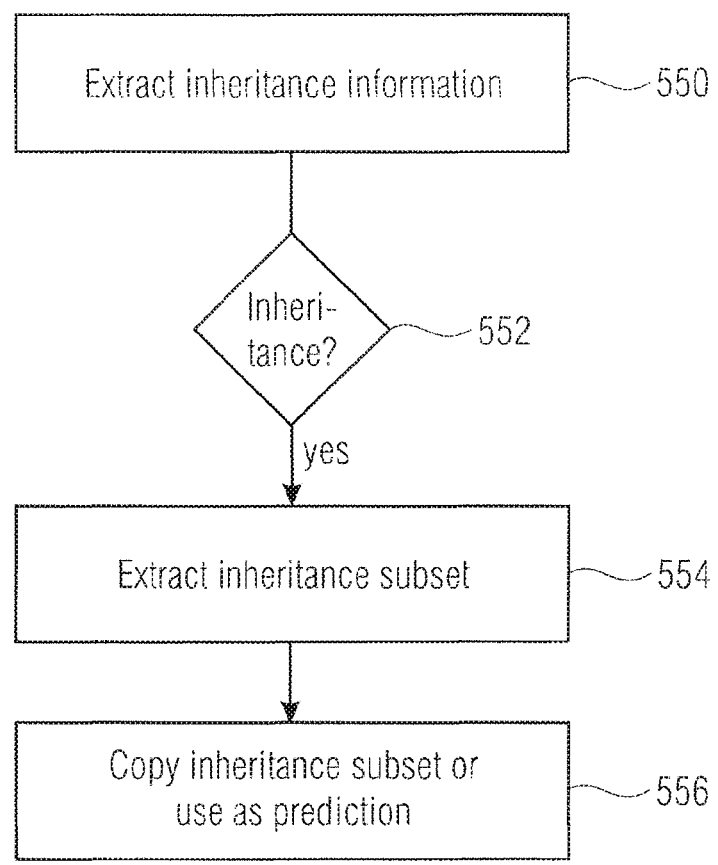
FIG. 13 shows a flow chart showing the steps performed by an encoder realizing an inheritance scheme in accordance with an embodiment.

Reference is made now to FIG. 13. FIG. 13 shows a flow diagram illustrating the mode of operation of a decoder such as the decoder of FIG. 2 in reconstructing an array of information samples representing a spatial example information signal, which is subdivided into leaf regions of different sizes by multi-tree subdivision, from a data stream. As has been described above, each leaf region has associated therewith a hierarchy level out of a sequence of hierarchy levels of the multi-tree subdivision. For example, all blocks shown in FIG. 12b are leaf regions. Leaf region 156c, for example, is associated with hierarchy layer 4 (or level 3). Each leaf region has associated therewith coding parameters. Examples of these coding parameters have been described above. The coding parameters are, for each leaf region, represented by a respective set of syntax elements. Each syntax element is of a respective syntax element type out of a set of syntax element types. Such syntax element type is, for example, a prediction mode, a motion vector component, an indication of an intra-prediction mode or the like. According to FIG. 13, the decoder performs the following steps.

In step 550, an inheritance information is extracted from the data stream. In case of FIG. 2, the extractor 102 is responsible for step 550. The inheritance information indicates as to whether inheritance is used or not for the current array of information samples. The following description will reveal that there are several possibilities for the inheritance information such as, inter alias, the sharing flag f and the signaling of a multitree structure divided into a primary and secondary part.

The array of information samples may already be a subpart of a picture, such as a treeblock, namely the treeblock 150 of FIG. 12b, for example. Thus, the inheritance information indicates as to whether inheritance is used or not for the specific treeblock 150. Such inheritance information may be inserted into the data stream for all tree blocks of the prediction subdivision, for example.

Further, the inheritance information indicates, if inheritance is indicated to be used, at least one inheritance region of the array of information samples, which is composed of a set of leaf regions and corresponds to an hierarchy level of the sequence of hierarchy levels of the multi-tree subdivision, being lower than each of the hierarchy levels with which the set of leaf regions are associated. In other words, the inheritance information indicates as to whether inheritance is to be used or not for the current sample array such as the treeblock 150. If yes, it denotes at least one inheritance region or subregion of this treeblock 150, within which the leaf regions share coding parameters. Thus, the inheritance region may not be a leaf region. In the example of FIG. 12b, this inheritance region may, for example, be the region formed by subblocks 156a to 156b. Alternatively, the inheritance region may be larger and may encompass also additionally the subblocks 154a,b and d, and even alternatively, the inheritance region may be the treeblock 150 itself with all the leaf blocks thereof sharing coding parameters associated with that inheritance region.

It should be noted, however, that more than one inheritance region may be defined within one sample array or treeblock 150, respectively. Imagine, for example, the bottom left subblock 152c was also partitioned into smaller blocks. In this case, subblock 152c could also form an inheritance region.

In step 552, the inheritance information is checked as to whether inheritance is to be used or not. If yes, the process of FIG. 13 proceeds with step 554 where an inheritance subset including at least one syntax element of a predetermined syntax element type is extracted from the data stream per inter-inheritance region. In the following step 556, this inheritance subset is then copied into, or used as a prediction for, a corresponding inheritance subset of syntax elements within the set of syntax elements representing the coding parameters associated with the set of leaf regions which the respective at least one inheritance region is composed of. In other words, for each inheritance region indicated within the inheritance information, the data stream comprises an inheritance subset of syntax elements. In even other words, the inheritance pertains to at least one certain syntax element type or syntax element category which is available for inheritance. For example, the prediction mode or inter-prediction mode or intra-prediction mode syntax element may be subject to inheritance. For example, the inheritance subset contained within the data stream for the inheritance region may comprise an inter-prediction mode syntax element. The inheritance subset may also comprise further syntax elements the syntax element types of which depend on the value of the afore-mentioned fixed syntax element type associated with the inheritance scheme. For example, in case of the inter-prediction mode being a fixed component of the inheritance subset, the syntax elements defining the motion compensation, such as the motion-vector components, may or may not be included in the inheritance subset by syntax. Imagine, for example, the top right quarter of treeblock 150, namely subblock 152b, was the inheritance region, then either the inter-prediction mode alone could be indicated for this inheritance region or the inter-prediction mode along with motion vectors and motion vector indices.

All the syntax elements contained in the inheritance subset is copied into or used as a prediction for the corresponding coding parameters of the leaf blocks within that inheritance region, i.e. leaf blocks 154a,b,d and 156a to 156d. In case of prediction being used, residuals are transmitted for the individual leaf blocks.

One possibility of transmitting the inheritance information for the treeblock 150 is the afore-mentioned transmission of a sharing flag f. The extraction of the inheritance information in step 550 could, in this case, comprise the following. In particular, the decoder could be configured to extract and check, for non-leaf regions corresponding to any of an inheritance set of at least one hierarchy level of the multi-tree subdivision, using an hierarchy level order from lower hierarchy level to higher hierarchy level, the sharing flag f from the data stream, as to whether the respective inheritance flag or share flag prescribes inheritance or not. For example, the inheritance set of hierarchy levels could be formed by hierarchy layers 1 to 3 in FIG. 12a. Thus, for any of the nodes of the subtree structure not being a leaf node and lying within any of layers 1 to 3 could have a sharing flag associated therewith within the data stream. The decoder extracts these sharing flags in the order from layer 1 to layer 3, such as in a depth-first or breadth first traversal order. As soon as one of the sharing flags equals 1, the decoder knows that the leaf blocks contained in a corresponding inheritance region share the inheritance subset subsequently extracted in step 554. For the child nodes of the current node, a checking of inheritance flags is no longer necessary. In other words, inheritance flags for these child nodes are not transmitted within the data stream, since it is clear that the area of these nodes already belongs to the inheritance region within which the inheritance subset of syntax elements is shared.

The sharing flags f could be interleaved with the afore-mentioned bits signaling the quadtree sub-division. For example, an interleave bit sequence including both sub-division flags as well as sharing flags could be:
1<u>0</u>001<u>1</u>01(0000)000,
which is the same sub-division information as illustrated in FIG. 6a with two interspersed sharing flags, which are highlighted by underlining, in order to indicate that in FIG. 3c all the sub-blocks within the bottom left hand quarter of tree block 150 share coding parameters.

Another way to define the inheritance information indicating the inheritance region would be the use of two sub-divisions defined in a subordinate manner to each other as explained above with respect to the prediction and residual sub-division, respectively. Generally speaking, the leaf blocks of the primary sub-division could form the inheritance region defining the regions within which inheritance subsets of syntax elements are shared while the subordinate sub-division defines the blocks within these inheritance regions for which the inheritance subset of syntax elements are copied or used as a prediction.

Consider, for example, the residual tree as an extension of the prediction tree. Further, consider the case where prediction blocks can be further divided into smaller blocks for the purpose of residual coding. For each prediction block that corresponds to a leaf node of the prediction-related quadtree, the corresponding subdivision for residual coding is determined by one or more subordinate quadtree(s).

In this case, rather than using any prediction signalization at internal nodes, we consider the residual tree as being interpreted in such a way that it also specifies a refinement of the prediction tree in the sense of using a constant prediction mode (signaled by the corresponding leaf node of the prediction-related tree) but with refined reference samples. The following example illustrates this case.

Figure 14A:
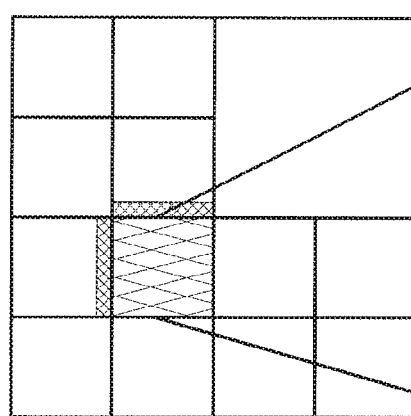
FIGS. 14*a* and 14*b* show a primary sub-division and a subordinate sub-division in order to illustrate a possibility to implement an inheritance scheme in connection with inter-prediction in accordance with an embodiment.
Figure 14B:
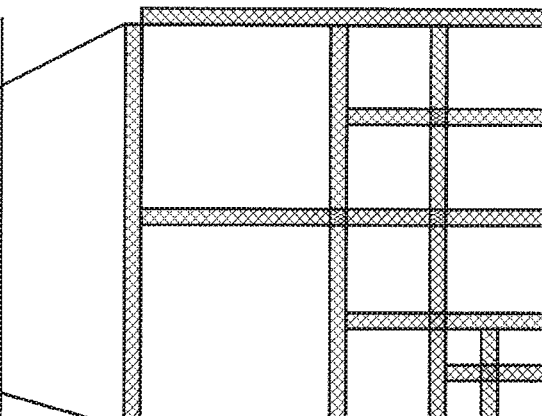

For example, FIGS. 14a and 14b show a quadtree partitioning for intra prediction with neighboring reference samples being highlighted for one specific leaf node of the primary sub-division, while FIG. 14b shows the residual quadtree sub-division for the same prediction leaf node with refined reference samples. All the subblocks shown in FIG. 14b share the same intra-prediction parameters contained within the data stream for the respective leaf block highlighted in FIG. 14a. Thus, FIG. 14a shows an example for the conventional quadtree partitioning for intra prediction, where the reference samples for one specific leaf node are depicted. In our advantageous embodiment, however, a separate intra prediction signal is calculated for each leaf node in the residual tree by using neighboring samples of already reconstructed leaf nodes in the residual tree, e.g., as indicated by the grey shaded stripes in FIG. 4(b). Then, the reconstructed signal of a given residual leaf node is obtained in the ordinary way by adding the quantized residual signal to this prediction signal. This reconstructed signal is then used as a reference signal for the following prediction process. Note that the decoding order for prediction is the same as the residual decoding order.

Figure 15:
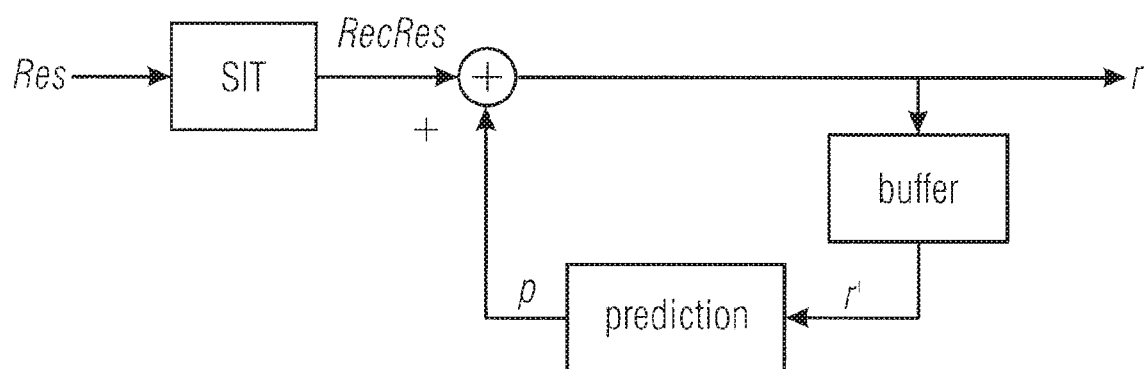
FIG. 15 shows a block diagram illustrating a decoding process in connection with the inheritance scheme in accordance with an embodiment.

In the decoding process, as shown in FIG. 15, for each residual leaf node, the prediction signal p is calculated according to the actual intra-prediction mode (as indicated by the prediction-related quadtree leaf node) by using the reference samples r'.

After the SIT process,

RecRes=SIT(Res)

the reconstructed signal r is calculated and stored for the next prediction calculation process:

r=RecRes+p

Figure 16:
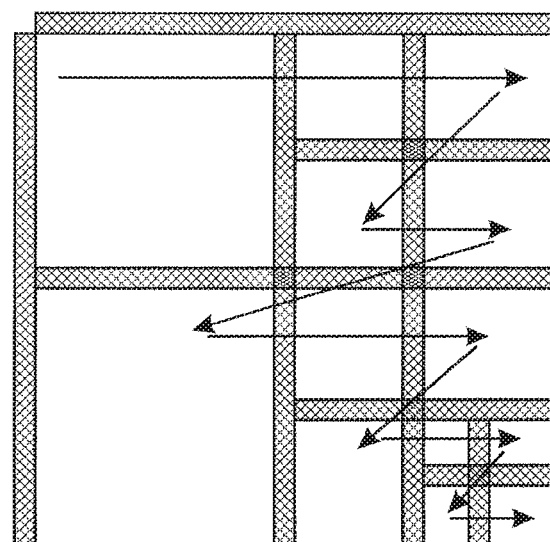
FIG. 16 shows a schematic diagram illustrating the scan order among subregions of a multitree subdivision in accordance to an embodiment, with the subregions being subject to an intra prediction.

The decoding order for prediction is the same as the residual decoding order, which is illustrated in FIG. 16.

Each residual leaf node is decoded as described in the previous paragraph. The reconstructed signal r is stored in a buffer as shown in FIG. 16. Out of this buffer, the reference samples r' will be taken for the next prediction and decoding process.

After having described specific embodiments with respect to FIGS. 1 to 16 with combined distinct subsets of the above-outlined aspects, further embodiments of the present application are described which focus on certain aspects already described above, but which embodiments represent generalizations of some of the embodiments described above. In particular, the embodiments described above with respect to the framework of FIGS. 1 and 2 mainly combined many aspects of the present application, which would also be advantageous when employed in other applications or other coding fields. As frequently mentioned during the above discussion, the multitree subdivision, for example, may be used without merging and/or without inter-plane adoption/prediction and/or without inheritance. For example, the transmission of the maximum block size, the use of the depth-first traversal order, the context adaptation depending on the hierarchy level of the respective subdivision flag and the transmission of the maximum hierarchy level within the bitstream in order to save side information bitrate, all these aspects are advantageous independent from each other. This is also true when considering the inheritance scheme. Inheritance of coding parameters is advantageously independent from the exact multitree subdivision used in order to subdivide a picture into simply connected regions and is advantageously independent from the existence of more than one sample array or the use of inter-plane adoption/prediction. The same applies for the advantages involved with inter-plane adoption/prediction and inheritance.

Figure 17A:
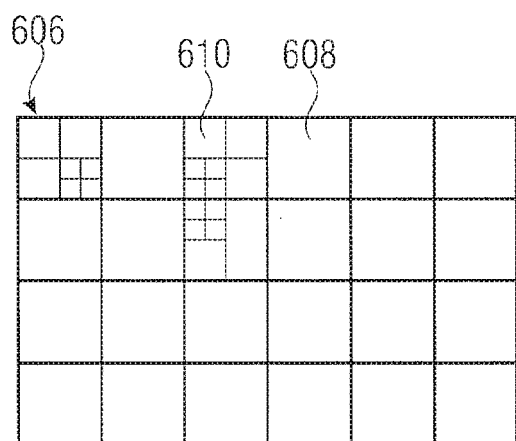
FIG. 17*a*,*b* show a schematic diagrams illustrating different possibilities of subdivisions in accordance with further embodiments.
Figure 17B:
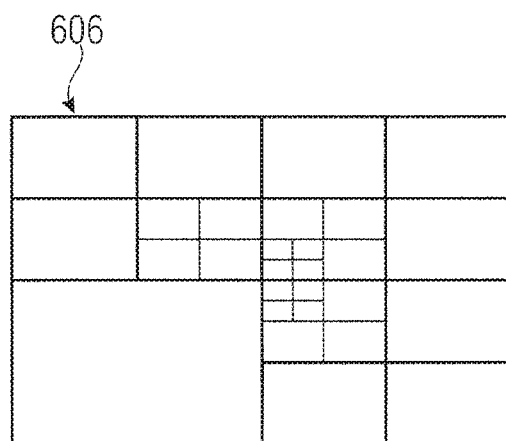

Accordingly, generalizing the embodiments, the coding scheme using the above-outlined inheritance scheme is not restricted to hybrid coding environments. That is, the reconstruction could be performed without prediction. The coding parameters inherited could pertain to other coding parameters such as indications of filter details or the like. As described above, the simply connected regions into which the array of information samples is subdivided may stem from a quadtree-subdivision and may be quadratic or rectangular shaped. Further, the specifically described embodiments for subdividing a sample array are merely specific embodiments and other subdivisions may be used as well. Some possibilities are shown in FIGS. 17a and b. FIG. 17a, for example, shows the subdivision of a sample array 606 into a regular two-dimensional arrangement of non-overlapping treeblocks 608 abutting each other with some of which being subdivided in accordance with a multitree structure into subblocks 610 of different sizes. As mentioned above, although a quadtree subdivision is illustrated in FIG. 17a, a partitioning of each parent node in any other number of child nodes is also possible. FIG. 17b shows an embodiment according to which a sample array 606 is sub-divided into subblocks of different sizes by applying a multitree subdivision directly onto the whole pixel array 606. That is, the whole pixel array 606 is treated as the treeblock. Both subdivisions of FIGS. 17a and 17b lead to a subdivision of the sample array 606 into simply connected regions which are exemplarily, in accordance with the embodiments of FIGS. 17a and 17b, non-overlapping. However, several alternatives are possible. For example, the blocks may overlap each other. The overlapping may, however, be restricted to such an extent that each block has a portion not overlapped by any neighboring block, or such that each sample of the blocks is overlapped by, at the maximum, one block among the neighboring blocks arranged in juxtaposition to the current block along a predetermined direction. That latter would mean that the left and right hand neighbor blocks may overlap the current block so as to fully cover the current block but they may not overlay each other, and the same applies for the neighbors in vertical and diagonal direction.

As described above with respect to FIGS. 1 to 16, the array of information samples do not necessarily represent a picture of a video or a still picture. The sample array could also represent a depth map or a transparency map of some scene.

The determination of the coding parameters and the inheritance information may be an iterative process. For example, if previously preliminarily, in rate/distortion sense optimally determined coding parameters of neighboring simply connected regions belonging to a previously preliminarily, in rate/distortion sense optimally determined parent region similar, an iterative process may determine that giving up the small differences between these coding parameters may be advantageous as compared to signaling these difference to the decoder when considering that the inheritance enables to suppress the explicit transmission of the coding parameters of all of these simply connected regions completely and to replace the submission of these coding parameters in full by the submission of a residual only or by merely the transmission of the shared coding parameters.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive encoded/compressed signals can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A decoder for reconstructing an array of information samples from a data stream, the array of information samples representing a spatially sampled information signal, the decoder comprising:
    an extractor configured to extract, from the data stream, first subdivision information, second subdivision information, and a maximum size;
    a divider configured to:
    subdivide the array of information samples into prediction blocks associated with prediction coding according to the first subdivision information,
    subdivide at least one of the prediction blocks that is greater than the maximum size into a root block of the maximum size, wherein the root block is associated with transform coding,
    determine whether the root block is to be subdivided based on the second subdivision information, and
    responsive to a determination that the root block is to be subdivided, subdivide the root block into the residual blocks associated with transform coding;
    wherein the extractor is configured to:
    extract, for each of the prediction blocks that is greater than the maximum size, inheritance information from the data stream, the inheritance information indicating whether inheritance is used or not and,
    if inheritance is indicated to be used, share a coding parameter among the residual blocks corresponding to the respective prediction block; and
    a reconstructor configured to:
    determine each of residual signals for each of the residual blocks based on the respective coding parameter in transform coding,
    determine prediction signals for the prediction blocks using prediction coding, and
    reconstruct the array of information samples based on a combination of the prediction signals and the residual signals.

2. The decoder according to claim 1, wherein the spatially sampled information signal is a video accompanied with depth information.

3. The decoder according to claim 1, wherein the spatially sampled information signal is a sequence of pictures with each picture comprising an array of luma samples along with two arrays of chroma samples per frame, wherein a scaling factor for a spatial resolution of the arrays of chroma samples relative to the array of luma samples in the horizontal direction differs from a scaling factor for a spatial resolution vertical direction.

4. The decoder according to claim 1, wherein the array of information samples is one of samples arrays related to different color components and forming color planes of a picture, and the decoder is configured to decode the different color planes of the picture independently.

5. The decoder according to claim 1, wherein the extractor is configured to, if inheritance is indicated not to be used, extract the coding parameter from the data stream for each of the residual blocks corresponding to the respective prediction block.

6. The decoder according to claim 1, wherein the decoder is configured to reconstruct the array information samples by prediction using a prediction mode which is extracted and decoded from the data stream.

7. The decoder according to claim 1, wherein subdivision into the prediction blocks, subdivision into the residual blocks, or both is based on a quadtree partitioning technique.

8. A method for reconstructing an array of information samples from a data stream, the array of information samples representing a spatially sampled information signal, the method comprising:
   extracting, from the data stream, first subdivision information, second subdivision information, and a maximum size;
   subdividing the array of information samples into prediction blocks associated with prediction coding according to the first subdivision information;
   subdividing at least one of the prediction blocks that is greater than the maximum size into a root block of the maximum size, wherein the root block is associated with transform coding;
   determining whether the root block is to be subdivided based on the second subdivision information,
   responsive to a determination that the root block is to be subdivided, subdividing the root block into the residual blocks associated with transform coding;
   extracting, for each of the prediction blocks that is greater than the maximum size, inheritance information from the data stream, the inheritance information indicating whether inheritance is used or not and, if inheritance is indicated to be used, sharing a coding parameter among the residual blocks corresponding to the respective prediction block;
   determining each of residual signals for each of the residual blocks based on the respective coding parameter in transform coding;
   determining prediction signals for the prediction blocks using prediction coding; and
   reconstructing the array of information samples based on a combination of the prediction signals and the residual signals.

9. The method according to claim 8, wherein the spatially sampled information signal is a video accompanied with depth information.

10. The method according to claim 8, wherein the spatially sampled information signal is a sequence of pictures with each picture comprising an array of luma samples along with two arrays of chroma samples per frame, wherein a scaling factor for a spatial resolution of the arrays of chroma samples relative to the array of luma samples in the horizontal direction differs from a scaling factor for a spatial resolution vertical direction.

11. The method according to claim 8, wherein the array of information samples is one of samples arrays related to different color components and forming color planes of a picture, and the decoder is configured to decode the different color planes of the picture independently.

12. The method according to claim 8, further comprising:
   if inheritance is indicated not to be used, extracting the coding parameter from the data stream for each of the residual blocks corresponding to the respective prediction block.

13. The method according to claim 8, wherein the array information samples is reconstructed by prediction using a prediction mode which is extracted and decoded from the data stream.

14. The method according to claim 8, wherein subdivision into the prediction blocks, subdivision into the residual blocks, or both is based on a quadtree partitioning technique.

15. An encoder for encoding an array of information samples into a data stream, the array of information samples representing a spatially sampled information signal, the encoder comprising:
   an inserter configured to insert, into the data stream, first subdivision information, second subdivision information, and a maximum size; and
   a divider configured to:
   subdivide the array of information samples into prediction blocks associated with prediction coding according to the first subdivision information,
   subdivide at least one of the prediction blocks that is greater than the maximum size into a root block of the maximum size, wherein the root block is associated with transform coding,
   determine whether the root block is to be subdivided based on the second subdivision information, and
   responsive to a determination that the root block is to be subdivided, subdivide the root block into the residual blocks associated with transform coding;
   wherein the inserter is configured to:
   insert, for each of the prediction blocks that is greater than the maximum size, inheritance information into the data stream, the inheritance information indicating whether inheritance is used or not and,
   if inheritance is indicated to be used, share a coding parameter among the residual blocks corresponding to the respective prediction block.

16. The encoder according to claim 15, wherein the spatially sampled information signal is a video accompanied with depth information.

17. The encoder according to claim 15, wherein the spatially sampled information signal is a sequence of pictures with each picture comprising an array of luma samples along with two arrays of chroma samples per frame, wherein a scaling factor for a spatial resolution of the arrays of chroma samples relative to the array of luma samples in the horizontal direction differs from a scaling factor for a spatial resolution vertical direction.

18. The encoder according to claim 15, wherein the array of information samples is one of samples arrays related to different color components and forming color planes of a picture, and the decoder is configured to decode the different color planes of the picture independently.

19. The encoder according to claim 15, wherein the inserter is configured to, if inheritance is indicated not to be used, insert the coding parameter into the data stream for each of the residual blocks corresponding to the respective prediction block.

20. The encoder according to claim 15, wherein the encoder is configured to encode the array information samples by prediction using a prediction mode which is inserted into the data stream.

21. The encoder according to claim 15, wherein subdivision into the prediction blocks, subdivision into the residual blocks, or both is based on a quadtree partitioning technique.

22. The encoder according to claim 21, wherein, according to the quadtree partitioning technique, the array of information samples is subdivided into prediction blocks such that a plurality of hierarchical levels are created, wherein each of the prediction blocks is associated with one of the plurality of hierarchical levels.

23. A non-transitory computer-readable medium for storing data, comprising:
a data stream stored in the non-transitory computer-readable medium, the data stream comprising encoded information associated with an array of information samples representing a spatially sampled information signal, the encoded information including first subdivision information, second subdivision information, a maximum size, and inheritance information, wherein the array of information samples is reconstructed based on a plurality of instructions including:
subdividing the array of information samples into prediction blocks associated with prediction coding according to the first subdivision information;
subdividing at least one of the prediction blocks that is greater than the maximum size into a root block of the maximum size, wherein the root block is associated with transform coding;
determining whether the root block is to be subdivided based on the second subdivision information,
responsive to a determination that the root block is to be subdivided, subdividing the root block into the residual blocks associated with transform coding;
extracting, for each of the prediction blocks that is greater than the maximum size, inheritance information from the data stream, the inheritance information indicating whether inheritance is used or not and, if inheritance is indicated to be used, sharing a coding parameter among the residual blocks corresponding to the respective prediction block;
determining each of residual signals for each of the residual blocks based on the respective coding parameter in transform coding;
determining prediction signals for the prediction blocks using prediction coding; and
reconstructing the array of information samples based on a combination of the prediction signals and the residual signals.

24. The computer-readable medium of claim 23, wherein the spatially sampled information signal is a video accompanied with depth information.

25. The computer-readable medium of claim 23, wherein the spatially sampled information signal is a sequence of pictures with each picture comprising an array of luma samples along with two arrays of chroma samples per frame, wherein a scaling factor for a spatial resolution of the arrays of chroma samples relative to the array of luma samples in the horizontal direction differs from a scaling factor for a spatial resolution vertical direction.

26. The computer-readable medium of claim 23, wherein the array of information samples is one of samples arrays related to different color components and forming color planes of a picture, and the decoder is configured to decode the different color planes of the picture independently.

27. The computer-readable medium of claim 23, the plurality of instructions including further including: if inheritance is indicated not to be used, extracting the coding parameter from the data stream for each of the residual blocks corresponding to the respective prediction block.

28. The computer-readable medium of claim 23, wherein the array information samples is reconstructed by prediction using a prediction mode which is extracted and decoded from the data stream.

29. The computer-readable medium of claim 23, wherein subdivision into the prediction blocks, subdivision into the residual blocks, or both is based on a quadtree partitioning technique.

30. The computer-readable medium of claim 29, wherein, according to the quadtree partitioning technique, the array of information samples is subdivided into prediction blocks such that a plurality of hierarchical levels are created, wherein each of the prediction blocks is associated with one of the plurality of hierarchical levels.

* * * * *